United States Patent
Duenckel et al.

(10) Patent No.: US 11,739,260 B2
(45) Date of Patent: Aug. 29, 2023

(54) INFUSED AND COATED PROPPANT CONTAINING CHEMICAL TREATMENT AGENTS AND METHODS OF USING SAME

(71) Applicant: CARBO Ceramics Inc., Houston, TX (US)

(72) Inventors: Robert Duenckel, Colorado Springs, CO (US); Mark Conner, Coraopolis, PA (US); Chad Cannan, Lancaster, NY (US); Todd Roper, Katy, TX (US); Joshua Leasure, Houston, TX (US); Thu Lieng, Richmond, TX (US); Daniel Cady, Houston, TX (US); Peter A. Read, Dorchester (GB)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 17/480,130

(22) Filed: Sep. 20, 2021

(65) Prior Publication Data
US 2022/0073813 A1 Mar. 10, 2022

Related U.S. Application Data

(63) Continuation of application No. 15/960,395, filed on Apr. 23, 2018, now Pat. No. 11,124,697, which is a (Continued)

(51) Int. Cl.
*C09K 8/80* (2006.01)
*E21B 43/267* (2006.01)
(Continued)

(52) U.S. Cl.
CPC .............. *C09K 8/805* (2013.01); *C09K 8/524* (2013.01); *C09K 8/528* (2013.01); *C09K 8/602* (2013.01);
(Continued)

(58) Field of Classification Search
None
See application file for complete search history.

(56) References Cited

U.S. PATENT DOCUMENTS

| 2,378,817 A | 6/1945 | Wrightsman et al. |
| 2,675,335 A | 4/1954 | Rankin et al. |
| (Continued) | | |

FOREIGN PATENT DOCUMENTS

| CN | 88100379 A | 11/1988 |
| CN | 101115906 A | 1/2008 |
| (Continued) | | |

OTHER PUBLICATIONS

Canadian Office Action dated Mar. 21, 2022 for Application No. 2,961,502.
(Continued)

*Primary Examiner* — Jeffrey D Washville
(74) *Attorney, Agent, or Firm* — Patterson + Sheridan, LLP

(57) ABSTRACT

Proppant compositions and methods for using same are disclosed herein. In particular, a proppant composition for use in hydraulic fracturing is disclosed herein. The proppant composition can contain a plurality of particulates and at least one particulate of the plurality of particulates containing a chemical treatment agent. The at least one particulate having a long term permeability measured in accordance with ISO 13503-5 at 7,500 psi of at least about 10 D. The at least one chemical treatment agent can separate from the at least one particulate when located inside a fracture of a subterranean formation after a period of time.

21 Claims, 9 Drawing Sheets

Related U.S. Application Data continuation of application No. 14/857,564, filed on Sep. 17, 2015, now Pat. No. 9,951,267.

(60) Provisional application No. 62/051,719, filed on Sep. 17, 2014.

(51) Int. Cl.

| | | |
|---|---|---|
| *C09K 8/524* | (2006.01) | |
| *C09K 8/528* | (2006.01) | |
| *C09K 8/60* | (2006.01) | |
| *C09K 8/70* | (2006.01) | |
| *C09K 8/92* | (2006.01) | |
| *E21B 43/08* | (2006.01) | |
| *C09K 8/66* | (2006.01) | |
| *C09K 8/64* | (2006.01) | |
| *E21B 47/11* | (2012.01) | |

(52) U.S. Cl.
CPC .............. *C09K 8/605* (2013.01); *C09K 8/64* (2013.01); *C09K 8/665* (2013.01); *C09K 8/70* (2013.01); *C09K 8/92* (2013.01); *E21B 43/088* (2013.01); *E21B 43/267* (2013.01); *E21B 47/11* (2020.05); *C09K 2208/10* (2013.01); *C09K 2208/12* (2013.01); *C09K 2208/20* (2013.01); *C09K 2208/24* (2013.01); *C09K 2208/26* (2013.01); *C09K 2208/32* (2013.01)

(56) References Cited

U.S. PATENT DOCUMENTS

| | | |
|---|---|---|
| 4,068,718 A | 1/1978 | Cooke, Jr. et al. |
| 4,179,429 A | 12/1979 | Hanauye et al. |
| 4,427,068 A | 1/1984 | Fitzgibbon |
| 4,440,866 A | 4/1984 | Lunghofer et al. |
| 4,873,145 A | 10/1989 | Okada et al. |
| 4,888,240 A | 12/1989 | Graham et al. |
| 5,188,175 A | 2/1993 | Sweet |
| 5,218,038 A | 6/1993 | Johnson et al. |
| 5,591,700 A | 1/1997 | Harris et al. |
| 5,964,291 A | 10/1999 | Bourne et al. |
| 6,444,316 B1 | 9/2002 | Reddy et al. |
| 6,527,051 B1 | 3/2003 | Reddy et al. |
| 7,036,591 B2 | 5/2006 | Cannan et al. |
| 7,216,705 B2 | 5/2007 | Saini et al. |
| 7,598,209 B2 | 10/2009 | Kaufman et al. |
| 8,399,597 B2 | 3/2013 | Pullichola et al. |
| 8,664,168 B2 | 3/2014 | Steiner |
| 8,865,631 B2 | 10/2014 | Eldred et al. |
| 8,883,693 B2 | 11/2014 | Eldred et al. |
| 9,670,400 B2 | 6/2017 | Eldred et al. |
| 11,124,697 B2 | 9/2021 | Duenckel et al. |
| 2003/0147821 A1 | 8/2003 | Victor |
| 2005/0002996 A1 | 1/2005 | Sojka |
| 2005/0059558 A1 | 3/2005 | Blauch et al. |
| 2005/0129759 A1 | 6/2005 | Sojka |
| 2005/0245416 A1 | 11/2005 | Veening et al. |
| 2008/0078547 A1 | 4/2008 | Sinclair et al. |
| 2010/0096342 A1 | 4/2010 | Roberts |
| 2010/0307744 A1 | 12/2010 | Cochet et al. |
| 2012/0067532 A1 | 3/2012 | Lee |
| 2012/0122741 A1 | 5/2012 | Welton |
| 2012/0227968 A1 | 9/2012 | Eldred et al. |
| 2012/0279703 A1 | 11/2012 | McDaniel et al. |
| 2013/0056204 A1 | 3/2013 | McDaniel et al. |
| 2013/0126158 A1 | 5/2013 | Gupta et al. |
| 2013/0295319 A1 | 11/2013 | Yeager et al. |
| 2014/0162911 A1 | 6/2014 | Monastiriotis et al. |
| 2014/0262247 A1 | 9/2014 | Duenckel et al. |
| 2015/0119301 A1* | 4/2015 | McDaniel ............ E21B 43/267 507/224 |
| 2016/0017214 A1 | 1/2016 | Eldred et al. |
| 2016/0032177 A1* | 2/2016 | Howe ...................... C09K 8/80 507/202 |
| 2017/0074072 A1 | 3/2017 | Peters et al. |

FOREIGN PATENT DOCUMENTS

| | | |
|---|---|---|
| EP | 2047061 B1 | 3/2014 |
| WO | 2012136734 A1 | 10/2012 |
| WO | 2014052459 A1 | 4/2014 |
| WO | 2014144464 A2 | 9/2014 |
| WO | 2015097116 A1 | 7/2015 |
| WO | 2016085559 A2 | 6/2016 |

OTHER PUBLICATIONS

International Search Report and Written Opinion for International Application No. PCT/US15/50759 dated Jul. 12, 2016.
Supplementary European Search Report dated May 14, 2018 for Application No. 15863889.0.
Tianping, Huang et al., "SPE 135088 Field Case Study on Formation Fines Control With Nanoparticles in Offshore Wells", Society of Petroleum Engineers, Jan. 1, 2010, pp. 2-3.
Full Examination Report No. 1 for Australian Application No. 2015354717 dated Oct. 24, 2018.
Full Examination Report No. 2 for Australian Application No. 2015354717 dated Oct. 24, 2018.
Office Action for Eurasian Application No. 201790633 dated Jan. 11, 2019.
Chinese Office Action dated Jul. 1, 2019 for Application No. 201580056874.1.
Chinese Office Action dated Jan. 19, 2020 for Application No. 201580056874.1.
European Office Action dated May 27, 2020 for Application No. 15863889.0.
Brazilian Office Action dated Jul. 14, 2020 for Application No. BR112017005316-0.
Canadian Office Action dated Nov. 9, 2020 for Application No. 2,961,502.
European Office Action dated Feb. 22, 2023 for Application No. 15863889.0.
Duenckel, Robert J. et al., "Improvements in Downhole Chemical Delivery: Development of Multifunctional Proppants", SPE Hydraulic Fracturing Technology Conference, Jan. 1, 2014.
Mexican Office Action dated Mar. 31, 2023 for Application No. MX/a/2017/003462.

* cited by examiner

INFUSED AND COATED PROPPANT CONTAINING CHEMICAL TREATMENT AGENTS AND METHODS OF USING SAME

CROSS-REFERENCE TO RELATED APPLICATIONS

The present application is a continuation application that claims priority to, and the benefit of the filing date of, U.S. patent application Ser. No. 15/960,395 filed Apr. 23, 2018, which is a continuation of U.S. Pat. No. 9,951,267, filed Sep. 17, 2015, which claims priority to, and the benefit of the filing date of, U.S. Patent Application No. 62/051,719, filed Sep. 17, 2014, the entire disclosures of which are incorporated herein by reference.

TECHNICAL FIELD

The present invention relates to proppant containing a chemical treatment agent to improve the production rates and ultimate recovery from an oil or gas well.

The present invention also relates to methods for evaluating the effectiveness and performance of a hydraulic fracturing stimulation treatment in an oil or gas well with proppant containing a tracer.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the oil or gas is held in a formation having insufficient permeability for economic recovery of the oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

In the course of production, oil and gas wells oftentimes exhibit scale formation and/or paraffin deposition that can reduce well production. Many types of chemical treatment agents have been used to prevent scale formation and/or paraffin deposition. One technique for delivering such chemical treatment agents downhole includes infusing porous ceramic proppant particulates with the chemical treat agent. In many instances, the chemical treatment agent must first be dissolved in an aqueous, organic or inorganic solvent to enable the infusion of the chemical treatment agent into the porous ceramic proppant particulates. If the chemical treatment agent is too viscous, however, this can result in lower effective amounts of the chemical treatment agent being present in the infused proppant than desired or uneven or ineffective infusion altogether. Dissolving the chemical treatment agent in the solvent is also an additional step that can be costly and time consuming.

Tracers have also been used in connection with hydraulic fracturing, to provide certain types of diagnostic information about the location and orientation of the fracture. Tracers for hydraulic fracturing have been associated with various carrier materials as particles from which the tracer itself is released after placement in the created hydraulic fracture. These tracer particles are oftentimes composed of a tracer substance and a carrier wherein the carrier is comprised of starch or polymeric materials. Carriers such as starch or polymeric materials are weak materials which if added to proppant in a hydraulic fracture can negatively affect conductivity. Further, the densities of starch or polymeric carrier materials are not similar to proppants typically used in hydraulic fracturing resulting in density segregation which can lead to non-uniform distribution of the tracer chemicals in the created fracture.

Therefore, what is needed is a method to add a chemical treatment agent to proppant particles without the need for a solvent. Also, what is needed is a tracer carrier that does not segregate from proppant when added to a subterranean environment and that does not negatively impact conductivity.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
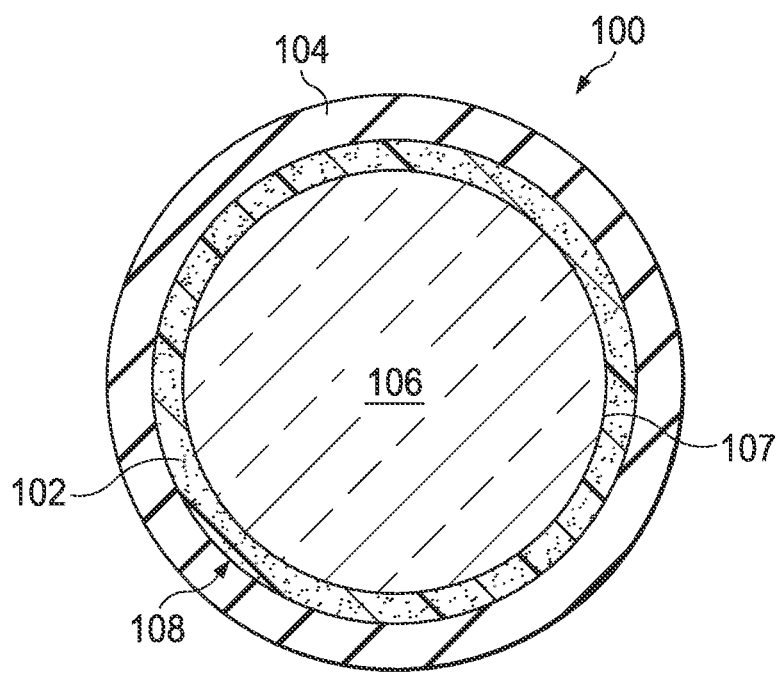
FIG. 1 is a cross sectional view of a coated proppant containing a chemical treatment agent disposed between a coating and a proppant particulate in accordance with several exemplary embodiments described herein.

In the following description, numerous specific details are set forth. However, it is understood that embodiments of the invention may be practiced without these specific details. In other instances, well-known structures and techniques have not been shown or described in detail in order not to obscure the understanding of this description. Additionally, as used herein, the term "exemplary" is intended to mean serving as an illustration or example, and is not intended to indicate a preference.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples. Additionally, as used herein, the term "exemplary" is intended to mean serving as an illustration or example, and is not intended to indicate a preference.

The term "conductivity," as used herein, is defined as the product of the width of the created fracture and the permeability of the proppant that remains in the fracture.

The term "high density proppant," as used herein, means a proppant having an apparent specific gravity of greater than 3.4 $g/cm^3$.

The term "intermediate density proppant," as used herein, means a proppant having an apparent specific gravity of from about 3.1 to 3.4 $g/cm^3$.

The term "internal interconnected porosity," as used herein, is defined as a percentage of the pore volume, or void volume space, over the total volume of a porous ceramic particulate.

The term "light weight proppant," as used herein, means a proppant having an apparent specific gravity of less than 3.0 $g/cm^3$.

The term "degradable," as used herein, means the ability of a chemical or coating to react to dissolve or breakdown into smaller components under one or more downhole conditions.

The term "infuse," as used herein, means to inject, attach, introduce, or otherwise include a material into a porous substrate, such as a porous ceramic.

The term "ceramic," as used herein, means any non-metallic, inorganic solid material.

The term "ceramic proppant," as used herein, means any man-made or synthetic ceramic particulate(s).

The term "proppant," as used herein, means material that includes one or more (e.g., tens, hundreds, thousands, millions, or more) of individual proppant particulates or elements.

A proppant particulate containing one or more chemical treatment agents for use in hydraulic fracturing is disclosed. The one or more chemical treatment agents can be disposed on, attached to, coated on, infused into, combined with, or otherwise contained on or in the proppant particulate to produce the proppant containing the one or more chemical treatment agents, also referred to as a chemical treatment agent containing proppant particulate. The proppant particulate can be or include a ceramic particulate. The ceramic particulate can include sand, porous ceramic proppant, and non-porous ceramic proppant. The chemical treatment agent containing proppant particulate can be coated with a resin material. The chemical treatment agent containing proppant particulate can also be uncoated.

An encapsulated proppant particulate containing one or more chemical treatment agents for use in hydraulic fracturing is also disclosed herein. In one or more exemplary embodiments, the encapsulated proppant particulate can include a chemical treatment agent containing proppant particulate that is coated or encapsulated with a degradable outer coating, layer, or shell. This degradable outer shell, or degradable shell, can temporarily isolate the chemical treatment agent proppant particulate from a surrounding fluid, such as a fracturing fluid, to prevent premature release of the chemical treatment agent into the fracturing fluid, for example.

A composite proppant composition for use in hydraulic fracturing is also disclosed. The composite ceramic proppant can contain a coated particulate part and a non-coated particulate part, wherein the coated particulate part contains a chemical treatment agent. In one or more exemplary embodiments, the permeability and conductivity of the composite proppant composition is at least equal to the permeability and conductivity of the coated particulate part alone. Furthermore, in one or more exemplary embodiments, the permeability and conductivity of the coated particulate part alone is, at the very least, equal to the permeability and conductivity of the composite proppant composition. The composite ceramic proppant can also contain an encapsulated proppant particulate part and a non-chemical treatment agent containing proppant particulate part, wherein the encapsulated proppant particulate part contains a chemical treatment agent. In one or more exemplary embodiments, the permeability and conductivity of the composite proppant composition is at least equal to the permeability and conductivity of the encapsulated proppant particulate part alone. Furthermore, in one or more exemplary embodiments, the permeability and conductivity of the encapsulated proppant particulate part alone is, at the very least, equal to the permeability and conductivity of the composite proppant composition.

In one or more exemplary embodiments, another composite ceramic proppant composition for use in hydraulic fracturing is disclosed. In one or more exemplary embodiments, the composite ceramic proppant contains a non-porous particulate part and a porous ceramic particulate part, wherein the porous ceramic particulate is infused with or otherwise contains a chemical treatment agent. Furthermore, in one or more exemplary embodiments, the permeability and conductivity of the composite ceramic proppant composition is at least equal to the permeability and conductivity of the non-porous particulate part alone.

The particulate part, or proppant particulate, can be ceramic proppant, sand, resin coated sand, plastic beads, glass beads, and other ceramic or resin coated proppants. Such proppant particulates can be manufactured according to any suitable process including, but not limited to continuous spray atomization, spray fluidization, drip casting, spray drying, or compression. Suitable proppant particulates and methods for manufacture are disclosed in U.S. Pat. Nos. 4,068,718, 4,427,068, 4,440,866, 5,188,175, 7,036,591, 8,865,631 and 8,883,693, U.S. Patent Application Publication No. 2012/0227968, and U.S. patent application Ser. Nos. 14/502,483 and 14/802,761, the entire disclosures of which are incorporated herein by reference, the entire disclosures of which are incorporated herein by reference.

FIG. 1 is a cross sectional view of a coated proppant 100 containing a chemical treatment agent 102 disposed between a coating 104 and a proppant particulate 106 in accordance with one or more embodiments. A layer 108 of chemical treatment agent 102 can be formed between the coating 104 and the proppant particulate 106. For example, the layer 108 of chemical treatment agent 102 can surround and/or be deposited on an outer surface 107 of the proppant particulate 106. The layer 108 of chemical treatment agent 102 can coat or cover at least about 10%, at least about 30%, at least about 50%, at least about 70%, at least about 90%, at least about 95%, or at least about 99% of the entire outer surface area of the proppant particulate 106. For example, the layer 108 of chemical treatment agent 102 can coat or cover about 100% of the entire outer surface area of the proppant particulate 106. The coating 104 can coat or cover at least about 10%, at least about 30%, at least about 50%, at least about 70%, at least about 90%, at least about 95%, or at least about 99% of the entire outer surface area of the layer 108 of chemical treatment agent 102 disposed on the proppant particulate 106. For example, the coating 104 can coat or cover about 100% of the entire outer surface area of the proppant particulate 106 that is coated or covered by the layer 108 of chemical treatment agent 102 such that the layer 108 is disposed between the particulate 106 and the coating 104. The coating 104 can include any suitable resin material and/or epoxy resin material as disclosed herein. The coating 104 can be degradable or non-degradable.

According to several exemplary embodiments, the chemical treatment agent 102 is present on the proppant particulate 106 in any suitable amount. According to several exemplary embodiments, the coated proppant 100 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the coated proppant 100. According to several exemplary embodiments, the coating 104 is present on the proppant particulate 106 in any suitable amount. According to several exemplary embodiments, the coated proppant 100 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the coated proppant 100.

The layer 108 of the chemical treatment agent 102 can have any suitable thickness. The layer 108 can have thickness of at least about 0.1 nm, at least about 0.5 nm, at least about 1 nm, at least about 2 nm, at least about 4 nm, at least about 8 nm, at least about 20 nm, at least about 60 nm, at least about 100 nm, or at least about 200 nm. For example, the layer 108 can have thickness from about 1 nm, about 5 nm, about 10 nm, about 25 nm, about 50 nm, about 100 nm, or about 150 nm to about 200 nm, about 300 nm, about 500 nm, or about 1,000 nm or more.

Figure 2:
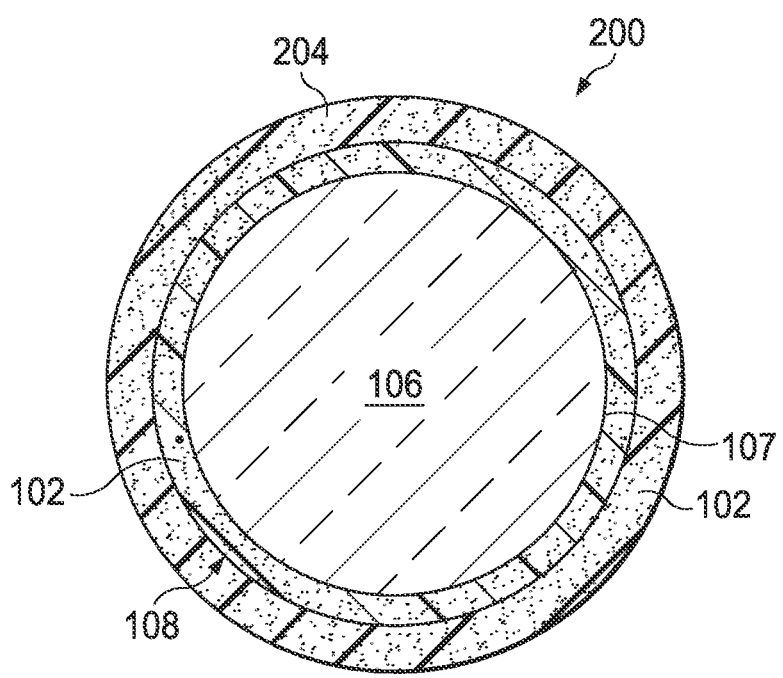
FIG. 2 is a cross sectional view of a coated proppant containing a chemical treatment agent dispersed within a coating in accordance with several exemplary embodiments described herein.

FIG. 2 is a cross sectional view of a coated proppant 200 containing the chemical treatment agent 102 dispersed within a coating 204 in accordance with one or more embodiments. The chemical treatment agent 102 can be homogenously or substantially homogeneously dispersed throughout the coating 204. The coating 204 can contain the chemical treatment agent 102 in any suitable amounts. For example, the coating 204 can have a chemical treatment agent 102 concentration of about at least about 0.01 wt %, at least about 0.1 wt %, at least about 0.5 wt %, at least about 1 wt %, at least about 2 wt %, at least about 4 wt %, at least about 6 wt %, or at least about 10 wt % based on the weight of the coating 104. The coating 204 can include any suitable resin material and/or epoxy resin material as disclosed herein. The coating 204 can be degradable or non-degradable.

In one or more exemplary embodiments, the layer 108 of chemical treatment agent 102 can be formed between the coating 204 and the proppant particulate 106. For example, the layer 108 of chemical treatment agent 102 can surround and/or be deposited on an outer surface 107 of the proppant particulate 106 in any suitable manner as disclosed in reference to FIG. 1 above. The coated proppant 200 can contain the chemical treatment agent 102 in any suitable amounts. According to several exemplary embodiments, the coated proppant 200 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the coated proppant 200. The coated proppant 200 can contain the resin material in any suitable amounts. According to several exemplary embodiments, the coated proppant 200 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the coated proppant 200.

Figure 3:
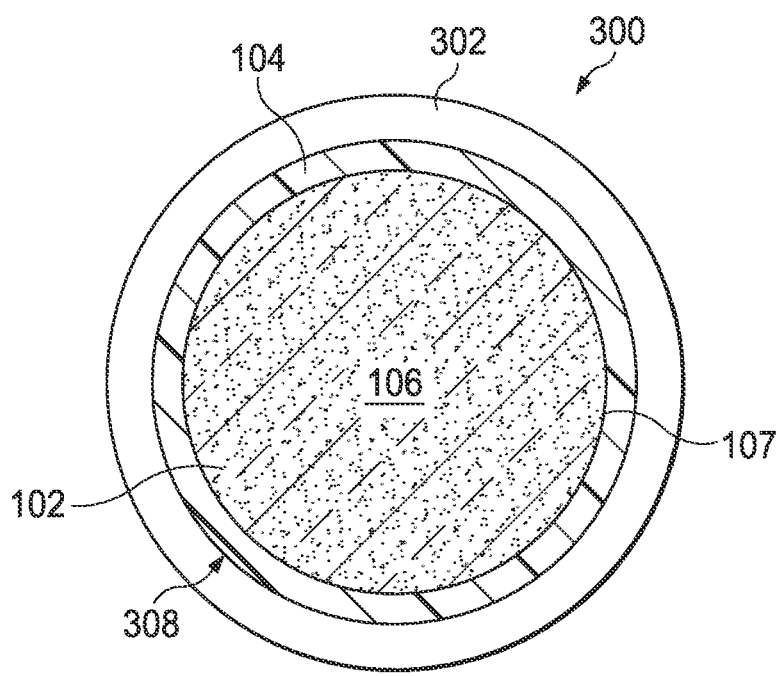
FIG. 3 is a cross sectional view of an encapsulated proppant having a degradable, non-permeable shell encapsulating a coated proppant, the coated proppant containing a chemical treatment agent infused into a porous proppant particulate in accordance with several exemplary embodiments described herein.

FIG. 3 is a cross sectional view of an encapsulated proppant 300 having a degradable, non-permeable shell 302 encapsulating a coated proppant, the coated proppant including the chemical treatment agent 102 infused into a porous proppant particulate 106 and surrounded by the resin coating 104. The resin coating 104 can be coated onto the porous proppant particulate 106. The degradable shell 302 can be directly or indirectly coated onto an outer surface 308 of the resin coating 104. The degradable shell 302 can coat or cover at least about 10%, at least about 30%, at least about 50%, at least about 70%, at least about 90%, at least about 95%, or at least about 99% of the entire outer surface area of the coated proppant. For example, the degradable shell 302 can coat or cover about 100% of the entire outer surface area of the coated proppant. The degradable shell 302 can coat or cover at least about 10%, at least about 30%, at least about 50%, at least about 70%, at least about 90%, at least about 95%, or at least about 99% of the entire outer surface 308 of the resin coating 104. For example, the coating can coat or cover about 100% of the entire outer surface area of the coated proppant such that the resin coating 104 is disposed between the porous proppant particulate 106 and the degradable shell 302.

The encapsulated proppant 300 can contain the chemical treatment agent 102 in any suitable amounts. According to several exemplary embodiments, the encapsulated proppant 300 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated proppant 300. The encapsulated proppant 300 can contain the resin coating 104 in any suitable amounts. According to several exemplary embodiments, the encapsulated proppant 300 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the encapsulated proppant 300.

Figure 4:
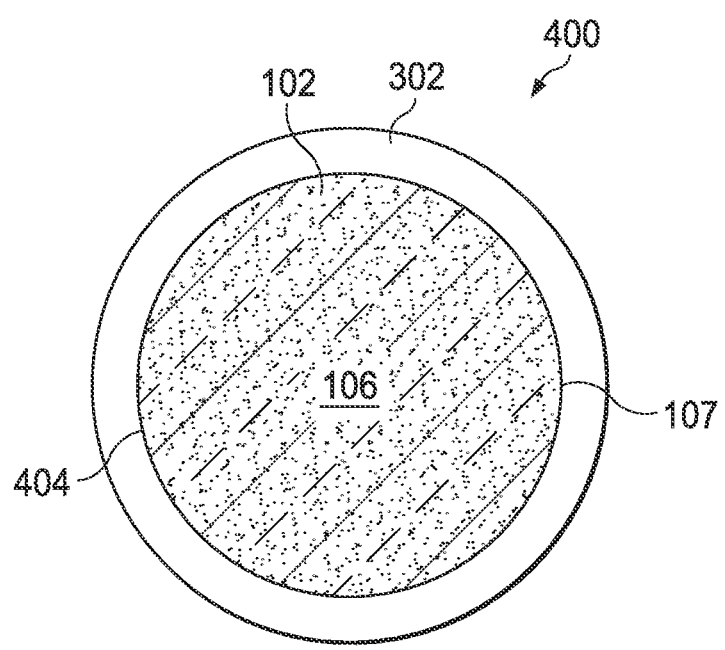
FIG. 4 is a cross sectional view of an encapsulated proppant having a degradable, non-permeable shell encapsulating an uncoated proppant, the uncoated proppant containing a chemical treatment agent infused into a porous proppant particulate in accordance with several exemplary embodiments described herein.

The degradable shell 302 can also encapsulate any suitable configuration of proppant particulate. For example, FIG. 4 is a cross sectional view of an encapsulated proppant 400 having the degradable, non-permeable shell 302 encapsulating an uncoated proppant 404, the uncoated proppant 404 containing the chemical treatment agent 102 infused into a porous proppant particulate 106. The degradable shell 302 can be directly or indirectly coated onto an outer surface 107 of the porous proppant particulate 106. The degradable shell 302 can coat or cover at least about 10%, at least about 30%, at least about 50%, at least about 70%, at least about 90%, at least about 95%, or at least about 99% of the entire outer surface area of the porous proppant particulate 106. For example, the degradable shell 302 can coat or cover about 100% of the entire outer surface area of the uncoated proppant 404. The encapsulated proppant 400 can contain the chemical treatment agent 102 in any suitable amounts. According to several exemplary embodiments, the encapsulated proppant 400 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated proppant 400.

Figure 5:
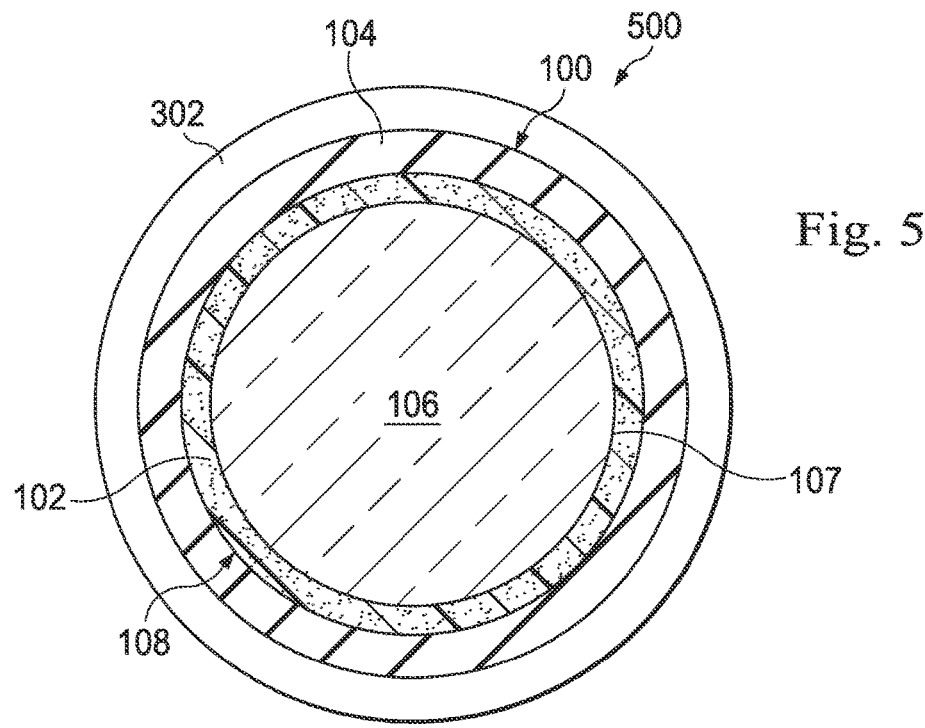
FIG. 5 is a cross sectional view of an encapsulated proppant having a degradable, non-permeable shell encapsulating a coated proppant, the coated proppant containing a chemical treatment agent disposed between a resin coating and a proppant particulate in accordance with several exemplary embodiments described herein.

FIG. 5 is a cross sectional view of an encapsulated proppant 500 having the degradable, non-permeable shell 302 encapsulating the coated proppant 100 discussed above. For example, the degradable shell 302 can be directly or indirectly coated onto an outer surface of the resin coating 104 of the coated proppant 100. The degradable shell 302 can coat or cover at least about 10%, at least about 30%, at least about 50%, at least about 70%, at least about 90%, at least about 95%, or at least about 99% of the entire outer surface area of the resin coating 104 of the coated proppant 100. For example, the degradable shell 302 can coat or cover about 100% of the entire outer surface area of the resin coating 104. The degradable shell 302 can also cover, surround, and/or encapsulate the coated proppant 200.

According to several exemplary embodiments, the degradable shell 302 is present in the encapsulated proppant 300, 400, 500 in any suitable amount. According to several exemplary embodiments, the encapsulated proppant 300, 400, 500 contains at least about 0.01 wt %, at least about 0.1 wt %, at least about 0.5 wt %, at least about 1 wt %, at least about 2 wt %, at least about 4 wt %, at least about 6 wt %, or at least about 10 wt % degradable shell 302 based on the total weight of the encapsulated proppant 300, 400, 500. According to several exemplary embodiments, the encapsulated proppant 300, 400, 500 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % degradable shell 302, based on the total weight of the encapsulated proppant 300, 400, 500.

According to several exemplary embodiments, the chemical treatment agent 102 is present in the encapsulated proppant 300, 400, 500 in any suitable amount. According to several exemplary embodiments, the encapsulated proppant 300, 400, 500 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated proppant 300, 400, 500. According to several exemplary embodiments, the encapsulated proppant 300, 400, 500 contains about 0.01 wt %, about 0.2 wt %, about 0.8 wt %, about 1.5 wt %, about 2.5 wt %, or about 3.5 wt % to about 5 wt %, about 8 wt %, about 12 wt %, or about 20 wt % chemical treatment agent 102, based on the total weight of the coated proppant 300, 400, 500.

The degradable shell 302 of the encapsulated proppant 300, 400, 500 can have any suitable thickness. The degradable shell 302 can have thickness of at least about 0.1 nm, at least about 0.5 nm, at least about 1 nm, at least about 4 nm, at least about 8 nm, at least about 15 nm, at least about 30 nm, at least about 60 nm, at least about 100 nm, at least about 200 nm, or at least about 500 nm. For example, the degradable shell 302 can have thickness from about 1 nm, about 10 nm, about 20 nm, about 50 nm, about 100 nm, about 150 nm, or about 200 nm to about 300 nm, about 500 nm, about 750 nm, or about 1,000 nm or more.

In one or more exemplary embodiments, the proppant particulate 106 can be or include natural sand. In one or more exemplary embodiments, the proppant particulate 106 can be or include ceramic proppant. The ceramic proppant can be or include porous ceramic proppant and non-porous ceramic proppant.

The proppant particulates 106 can be or include silica and/or alumina in any suitable amounts. According to several exemplary embodiments, the proppant particulate 106 include less than 80 wt %, less than 60 wt %, less than 40 wt %, less than 30 wt %, less than 20 wt %, less than 10 wt %, or less than 5 wt % silica based on the total weight of the proppant particulates 106, 206. According to several exemplary embodiments, the proppant particulate 106 include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulate 106 include at least about 30 wt %, at least about 50 wt %, at least about 60 wt %, at least about 70 wt %, at least about 80 wt %, at least about 90 wt %, or at least about 95 wt % alumina based on the total weight of the proppant particulate 106. According to several exemplary embodiments, the proppant particulate includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant compositions disclosed herein include proppant particulates 106 that are substantially round and spherical having a size in a range between about 6 and 270 U.S. Mesh. For example, the size of the particulate 106 can be expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The proppant compositions disclosed herein include proppant particulates having any suitable size. For example, the proppant particulate 106 can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particulate 106 has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particulate 106 has a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant compositions disclosed herein include porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). A pack of the proppant particulate 106, having a 20/40 mesh size range, can have a long term permeability at 7,500 psi of at least about 1 D, at least about 2 D, at least about 5 D, at least about 10 D, at least about 20 D, at least about 40 D, at least about 80 D, at least about 120 D, at least about 150 D, at least about 200 D, or at least about 250 D. The pack of the proppant particulate 106, having a 20/40 mesh size range, can have a long term permeability at 12,000 psi of at least about 1 D, at least about 2 D, at least about 3 D, at least about 4 D, at least about 5 D, at least about 10 D, at least about 25 D, at least about 50 D, at least about 100 D, at least about 150 D, or at least about 200 D. The pack of the proppant particulate 106, having a 20/40 mesh size range, can have a long term permeability at 15,000 psi of at least about 1 D, at least about 2 D, at least about 3 D, at least about 4 D, at least about 5 D, at least about 10 D, at least about 25 D, at least about 50 D, at least about 75 D, at least about 100 D, or at least about 150 D. The pack of the proppant particulate 106, having a 20/40 mesh size range, can have a long term permeability at 20,000 psi of at least about 1 D, at least about 2 D, at least about 3 D, at least about 4 D, at least about 5 D, at least about 10 D, at least about 25 D, at least about 50 D, at least about 75 D, or at least about 100 D.

A pack of the proppant particulate 106 can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, a pack of the proppant particulate 106 can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

The proppant compositions disclosed herein include proppant particulates 106 having any suitable shape. The proppant particulate 106 can be substantially round, cylindrical, square, rectangular, elliptical, oval, egg-shaped, or pill-shaped. As shown, the proppant particulate 106 can be substantially round and spherical. According to several exemplary embodiments, the proppant particulates 106 of the proppant compositions disclosed herein have an apparent specific gravity of less than 3.1 $g/cm^3$, less than 3.0 $g/cm^3$, less than 2.8 $g/cm^3$, or less than 2.5 $g/cm^3$. According to several exemplary embodiments, the proppant particulate 106 has an apparent specific gravity of from about 3.1 to 3.4 $g/cm^3$, from about 1.5 to about 2.2 $g/cm^3$, from about 1.9 to about 2.5 $g/cm^3$, or from about 2.6 to about 3.2 $g/cm^3$. According to several exemplary embodiments, the proppant particulate 106 has an apparent specific gravity of greater than 3.4 $g/cm^3$, greater than 3.6 $g/cm^3$, greater than 4.0 $g/cm^3$, or greater than 4.5 $g/cm^3$.

The proppant particulate 106 can have any suitable specific gravity. The proppant particulate 106 can have a specific gravity of at least about 2.5, at least about 2.7, at least about 3, at least about 3.3, or at least about 3.5. For example, the proppant particulate 106 can have a specific gravity of about 2.5 to about 4.0, about 2.7 to about 3.8, about 3.5 to about 4.2, about 3.8 to about 4.4, or about 3.0 to about 3.5. In one or more exemplary embodiments, the proppant particulate 106 can have a specific gravity of less than 4 g/cc, less than 3.5 g/cc, less than 3 g/cc, less than 2.75 g/cc, less than 2.5 g/cc, less than 2.25 g/cc, less than 2 g/cc, less than 1.75 g/cc, or less than 1.5 g/cc. For example, the proppant particulate 106 can have a specific gravity of about 1.3 g/cc to about 3.5 g/cc, about 1.5 g/cc to about 3.2 g/cc, about 1.7 g/cc to about 2.7 g/cc, about 1.8 g/cc to about 2.4 g/cc, or about 2.0 g/cc to about 2.3 g/cc.

The proppant particulate 106 can have any suitable bulk density. In one or more exemplary embodiments, the proppant particulate 106 have a bulk density of less than 3 g/cc, less than 2.5 g/cc, less than 2.2 g/cc, less than 2 g/cc, less than 1.8 g/cc, less than 1.6 g/cc, or less than 1.5 g/cc. The proppant particulate 106 can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the proppant particulate 106 can have a bulk density of about 1.3 g/cc to about 1.8 g/cc, about 1.35 g/cc to about 1.65 g/cc, or about 1.5 g/cc to about 1.9 g/cc.

The proppant particulate 106 can have any suitable surface roughness. The proppant particulate 106 can have a surface roughness of less than 5 µm, less than 4 µm, less than 3 µm, less than 2.5 µm, less than 2 µm, less than 1.5 µm, or less than 1 µm. For example, the proppant particulate 106 can have a surface roughness of about 0.1 µm to about 4.5 µm, about 0.4 µm to about 3.5 µm, or about 0.8 µm to about 2.8 µm.

The proppant particulate 106 can have any suitable pore size distribution. For example, the proppant particulate 106 can have a standard deviation in pore size of less than 6 µm, less than 4 µm, less than 3 µm, less than 2.5 µm, less than 2 µm, less than 1.5 µm, or less than 1 µm. The proppant particulate 106 can have any suitable average maximum or largest pore size. For example, the proppant particulate 106 can have an average largest pore size of less than about 25 µm, less than about 20 µm, less than about 18 µm, less than about 16 µm, less than about 14 µm, or less than about 12 µm. The proppant particulate 106 can have any suitable concentration of pores. For example, the proppant particulate 106 can have less than 5,000, less than 4,500, less than 4,000, less than 3,500, less than 3,000, less than 2,500, or less than 2,200 visible pores at a magnification of 500× per square millimeter of the proppant particulate 106.

The proppant particulate 106 can have any suitable porosity. According to several exemplary embodiments, the proppant particulate 106 can be or include porous ceramic proppant having any suitable porosity. The porous ceramic proppant can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous ceramic proppant is from about 5% to about 75%, about 5% to about 15%, about 10% to about 30%, about 15% to about 35%, about 25% to about 45%, about 30% to about 55%, or about 35% to about 70%. According to several exemplary embodiments, the porous ceramic proppant can have any suitable average pore size. For example, the porous ceramic proppant can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous ceramic proppant can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

As discussed herein, the proppant particulates 106 can contain the chemical treatment agents 102 in any suitable manner. In one or more exemplary embodiments, the proppant particulates 106 are infused with, coated with, and/or encapsulated with the one or more chemical treatment agents 102. Suitable chemical treatment agents 102 can be or include any one or more of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants, combinations thereof, or any other oilfield chemical that can be helpful in the hydraulic fracturing process. In one or more exemplary embodiments, the scale inhibitor can inhibit scales of calcium, barium, magnesium salts and the like, including barium sulfate, calcium sulfate, and calcium carbonate scales. The composites can further have applicability in the treatment of other inorganic scales, such as zinc sulfide, iron sulfide, etc. In one or more exemplary embodiments, the scale inhibitors are anionic scale inhibitors. The scale inhibitors can include strong acids such as a phosphonic acid, phosphoric acid, phosphorous acid, phosphate esters, phosphonate/phosphonic acids, aminopoly carboxylic acids, chelating agents, and polymeric inhibitors and salts thereof. The scale inhibitors can also include organo phosphonates, organo phosphates and phosphate esters as well as the corresponding acids and salts thereof. The scale inhibitors can also include polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS). In one or more exemplary embodiments, the scale inhibitors can include DTPA, (also known as diethylenetriaminepentaacetic acid; diethylenetriamine-N,N,N',N',N"-pentaacetic acid; pentetic acid; N,N-Bis(2-(bis-(carboxymethyl)amino)ethyl)-glycine; diethylenetriamine pentaacetic acid, [[(Carboxymethyl)imino]bis(ethylenenitrilo)]-tetra-acetic acid); EDTA: (also known as edetic acid; ethylenedinitrilotetraacetic acid; EDTA free base; EDTA free acid; ethylenediamine-N,N,N', N'-tetraacetic acid; hampene; Versene; N,N'-1,2-ethane diylbis-(N-(carboxymethyl)glycine); ethylenediamine tetra-acetic acid); NTA, (also known as N,N-bis(carboxymethyl) glycine; triglycollamic acid; trilone A; alpha,alpha',alpha"-trimethylaminetricarboxylic acid; tri(carboxymethyl)amine; aminotriacetic acid; Hampshire NTA acid; nitrilo-2,2',2"-triacetic acid; titriplex i; nitrilotriacetic acid); APCA (aminopolycarboxylic acids); phosphonic acids; EDTMP (ethylenediaminetetramethylene-phosphonic acid); DTPMP (diethylene triaminepentamethylenephosphonic acid); NTMP (nitrilotrimethylenephosphonic acid); polycarboxylic acids, gluconates, citrates, polyacrylates, and polyaspartates or any combination thereof. The scale inhibitors can also include any of the ACCENT™ scale inhibitors, commercially available from The Dow Chemical Company. The scale inhibitors can also include potassium salts of maleic acid copolymers. In one or more exemplary embodiments, the chemical treatment agent 102 is DTPMP.

In one or more exemplary embodiments, the chemical treatment agent 102 can be or include any one or more salt inhibitors. In one or more exemplary embodiments, the salt inhibitor can include any suitable salt inhibitor, including, but not limited to Na-Minus®, Na-Minus®-55, and WFT 9725, each commercially available from Weatherford International Ltd., Desalt Liquid salt inhibitor commercially available from JACAM Chemicals, LLC, and potassium ferricyanide and any combination thereof.

In one or more exemplary embodiments, the chemical treatment agent 102 can be or include any one or more demulsifying agents. The demulsifying agents can include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of same. The demulsifying agents can also include oxyalkylated phenol formaldehyde resins, oxyalkylated amines and polyamines, di-epoxidized oxyalkylated polyethers, poly triethanolamine methyl chloride quaternary, melamine acid colloid, and aminomethylated polyacrylamide.

In one or more exemplary embodiments, the chemical treatment agent 102 can be or include any one or more corrosion inhibitors. Suitable corrosion inhibitors can include, but are not limited to, fatty imidazolines, alkyl pyridines, alkyl pyridine quaternaries, fatty amine quaternaries and phosphate salts of fatty imidazolines. In one or more exemplary embodiments, the chemical treatment agent 102 can be or include any one or more suitable foaming agents. Suitable foaming agents can include, but are not limited to, oxyalkylated sulfates or ethoxylated alcohol sulfates, or mixtures thereof. In one or more exemplary embodiments, the chemical treatment agent 102 can be or include any one or more suitable oxygen scavengers. Suitable oxygen scavengers can include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

In one or more exemplary embodiments, the chemical treatment agent 102 can be or include any one or more paraffin inhibitors. Suitable paraffin inhibitors can include, but are not limited to, ethylene/vinyl acetate copolymers, acrylates (such as polyacrylate esters and methacrylate esters of fatty alcohols), and olefin/maleic esters. In one or more exemplary embodiments, the chemical treatment agent 102 can be or include any one or more asphaltene inhibitors. Suitable asphaltene inhibitors can include, but are not limited to, asphaltene treating chemicals include but are not limited to fatty ester homopolymers and copolymers (such as fatty esters of acrylic and methacrylic acid polymers and copolymers) and sorbitan monooleate.

In one or more exemplary embodiments, the chemical treatment agent 102 can be or include a thermal neutron absorbing material. In one or more exemplary embodiments, the thermal neutron absorbing material is boron, cadmium, gadolinium, iridium, samarium, or mixtures thereof. The thermal neutron absorbing material can leach, elute, diffuse, bleed, discharge, desorb, dissolve, drain, seep, and leak from any of the proppant 100, 200, 300, 400, 500 and into a fracture, a formation, and/or a wellbore. A downhole tool emitting thermal neutrons can detect the presence of the thermal neutron absorbing material to detect proppant placement, producing and non-producing zones, and fracture size, shape, and location.

In one or more exemplary embodiments, the chemical treatment agent 102 can be or include any suitable radioactive material. In one or more exemplary embodiments, the radioactive material can include radioactive isotopes, or gamma-ray emitting isotopes, of gold, iodine, iridium, scandium, antimony, silver, hafnium, zirconium, rubidium, chromium, iron, strontium, cobalt, zinc, or mixtures thereof. The radioactive material can leach, elute, diffuse, bleed, discharge, desorb, dissolve, drain, seep, and leak from any of the proppant 100, 200, 300, 400, 500 and into a fracture, a formation, and/or a wellbore. A downhole tool can detect the presence of the radioactive material to detect proppant placement, producing and non-producing zones, and fracture size, shape, and location.

In one or more exemplary embodiments, the chemical treatment agent 102 can be or include any one or more suitable surfactants. The one or more suitable surfactants can be selected based on the necessary adjustment in wetting characteristics of the proppant for the desired production enhancement. For example, suitable surfactants can be found in U.S. Patent Application Publication No. 2005/0244641, incorporated by reference herein in its entirety. The surfactants can also be selected from any number of surfactants known to those of ordinary skill in the art, including, for example, anionic, cationic, nonionic, and amphoteric surfactants, or combinations thereof. According to several exemplary embodiments, suitable surfactants include but are not limited to saturated or unsaturated long-chain fatty acids or acid salts, long-chain alcohols, polyalcohols, dimethylpolysiloxane and polyethylhydrosiloxane. According to several exemplary embodiments, suitable surfactants include but are not limited to linear and branched carboxylic acids and acid salts having from about 4 to about 30 carbon atoms, linear and branched alkyl sulfonic acids and acid salts having from about 4 to about 30 carbon atoms, linear alkyl benzene sulfonate wherein the linear alkyl chain includes from about 4 to about 30 carbon atoms, sulfosuccinates, phosphates, phosphonates, phospholipids, ethoxylated compounds, carboxylates, sulfonates and sulfates, polyglycol ethers, amines, salts of acrylic acid, pyrophosphate and mixtures thereof. Cationic surfactants can include those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group can include quaternary ammonium halide or quaternary amine, such as quaternary ammonium chloride or a quaternary ammonium bromide. Amphoteric surfactants can include glycinates, amphoacetates, propionates, betaines and mixtures thereof. Anionic surfactants can include sulfonates (like sodium xylene sulfonate and sodium naphthalene sulfonate), phosphonates, ethoxysulfates and mixtures thereof. According to several exemplary embodiments, suitable surfactants include but are not limited to sodium stearate, octadecanoic acid, hexadecyl sulfonate, lauryl sulfate, sodium oleate, ethoxylated nonyl phenol, sodium dodecyl sulfate, sodium dodecylbenzene sulfonate, laurylamine hydrochloride, trimethyl dodecylammonium chloride, cetyl trimethyl ammonium chloride, polyoxyethylene alcohol, alkylphenolethoxylate, Polysorbate 80, propylene oxide modified polydimethylsiloxane, dodecyl betaine, lauramidopropyl betaine, cocamido-2-hydroxy-propyl sulfobetaine, alkyl aryl sulfonate, fluorosurfactants and perfluoropolymers and terpolymers, castor bean adducts and combinations thereof. According to several exemplary embodiments, the surfactant is sodium dodecylbenzene sulfonate or sodium dodecyl sulfate. According to several exemplary embodiments, the surfactants are used at a concentration below the critical micelle concentration (CMC) in aqueous and hydrocarbon carrier fluids. Further, surfactants as production enhancement additives are commercially available from CESI Chemical, Inc., as SG-400N, SG-401N, and LST-36.

In one or more exemplary embodiments, the chemical treatment agent 102 can be or include any suitable nanoparticle dispersion. The nanoparticle dispersion can be coated on and/or infused in the proppant particulate 106 so that the proppant particulate 106 can act as a carrier for the nanoparticle dispersion in a hydraulic fracturing operation. The inclusion of the nanoparticle dispersion into and/or underneath the coating 104, 204 of a coated proppant or into the internal porosity of porous ceramic proppant, rather than simply injecting or pumping the nanoparticle dispersion into a well formation in fluid form, improves not only the wetting characteristics of the formation surfaces but also of the proppant itself. The nanoparticle dispersion interacts with the surface of the proppant to alter its wetting characteristics. Further, as fluids flow through the proppant pack in the formation, some of the nanoparticle dispersion may be released into the fracture and adhere to and improve the wettability, or fluid affinity, of the formation surfaces. Thus, the use of nanoparticle dispersions that are coated on and/or infused into proppant offers benefits similar to those obtained by pumping the nanoparticle dispersion into the formation in fluid form, but the increased interaction of the nanoparticle dispersion with the proppant offers the additional benefit of improved wettability of the proppant.

The nanoparticle dispersions can include a number of different nanoparticle materials known to those of ordinary skill in the art, including polymers, silica, metals, metal oxides, and other inorganic materials, that are suspended in an aqueous or non-aqueous solvent fluid. According to several exemplary embodiments, suitable materials include but are not limited to nanoparticles such as silicon dioxide, zirconium dioxide, antimony dioxide, zinc oxide, titanium dioxide, aluminum dioxide, particles derived from natural minerals, synthetic particles, and combinations thereof. According to several exemplary embodiments, one or more of silicon dioxide, zirconium dioxide and antimony dioxide are added at about 65 nanometers or less in diameter (in several exemplary embodiments 1-10 nm) and have a polydispersity of less than about 20%.

The selection of a specific nanoparticle dispersion or surfactant to be coated on and/or infused into the proppant particulate 106 depends on the necessary adjustment in wetting characteristics of the proppant for the desired production enhancement. Suitable nanoparticle dispersions or surfactants may be selected from any number of commercially available products. For example, nanoparticle dispersion products are commercially available from FTS International® as NPD 2000® and NPD 3000®. Nanoparticle dispersions are also commercially available from CESI Chemical, Inc., a subsidiary of Flotek Industries, Inc., as MA-844W, MA-845, StimOil® FBA M, StimOil® FBA Plus, and StimOil® FBA Plus Enviro.

In one or more exemplary embodiments, the chemical treatment agent 102 can be or include any one or more suitable gel breakers. Suitable gel breakers can be or include oxidizers such as bleach, hypochlorites, percarbonates, perborates, permanganates, peroxides, and halogens. In one or more exemplary embodiments, the chemical treatment agent 102 can be or include any one or more suitable biocides. Suitable biocides can be or include bronopol, dazomet, glutaraldehyde, quartenary ammonium salts, and bleach.

In one or more exemplary embodiments, the chemical treatment agent 102 can be or include any suitable tracer, such as one or more metallic or non-metallic elements, one or more nanoparticles, and/or one or more biological markers. According to several exemplary embodiments, the biological marker is DNA. DNA, or deoxyribose nucleic acid, is sometimes a double-stranded helical molecule that encodes the genetic information of almost all living systems. Each DNA molecule can be unique as a result of a particular sequence of nitrogenous bases—adenine ("A"), thymine ("T"), cytosine ("C") and guanine ("G")—contained with the molecule. The double helix structure is formed and maintained by the pairing of a nitrogenous base on one phosphate/sugar backbone carrier chain with a nitrogenous base on the other phosphate/sugar backbone carrier chain through hydrogen bonding. Specifically, an adenine base will pair with a thymine base (an "AT" base pair), and a cytosine base will pair with a guanine base (a "GC" base pair). Probability terms can be calculated for the frequency of a given sequence of bases, and as long as a large enough DNA molecule is used, the "uniqueness" of a particular molecule of DNA can be known with sufficient certainty. The DNA molecule may be naturally occurring or a manufactured (synthetic) DNA and can be double stranded or single stranded. Synthetic DNA is commercially available and may be manufactured to order by several specialized DNA manufacturers, such as GenScript, Synthetic Genomics, DNA 2.0, Genewiz, Inc., Life Technologies, and Cambrian Genomics. Further, the DNA can be "encapsulated" to enhance its survivability at downhole reservoir conditions and to otherwise alter its interaction with formation fluids. Additionally, specific DNA sequences may be selected for use based on compatibility with the thermal environment of a specific well.

DNA alone can be used as the biological marker. DNA is typically water-soluble and can be infused into, coated onto, and/or mixed with the coating 104, 204 on the proppant particulate 106 without any modification in order to function as a water-soluble biological marker. According to several exemplary embodiments, the DNA can be formulated in such a way that it is hydrocarbon-soluble and will separate into hydrocarbon fluids as well. For example, the water-solubility of DNA is due to the negative charges associated with the phosphodiester groups of the DNA. The negative charges of the phosphodiester structures can be removed by methylation. Methylation of this region of the DNA molecule will ensure that this part of the molecule becomes hydrophobic, i.e., hydrocarbon-soluble, thereby ensuring that the DNA molecule is soluble in the hydrocarbon phase. Other procedures for formulating hydrocarbon-soluble DNA can be found in U.S. Pat. No. 5,665,538, the entire disclosure of which is herein incorporated by reference.

While DNA itself can be used as a biological marker, the reservoir conditions in which the DNA is placed may not be optimal for the long term survivability of the DNA. These conditions include reservoir temperatures exceeding 200° F. and sometimes up to 400° F., as well as highly saline formation waters. However, numerous DNA encapsulation techniques are well known to those of ordinary skill in the art and by encapsulating the DNA, its survivability in harsh conditions is greatly enhanced. The partitioning of the DNA, whether into the hydrocarbon or water phase, can be tailored by tailoring the encapsulation material. In particular, the wettability or fluid affinity of the encapsulation material can be tailored to favor water or hydrocarbons.

Additionally, molecules containing specific nucleotide sequences can be selectively used to enhance compatibility with the harsh wellbore and formation temperatures and pressures based on the improved thermal stability displayed by DNA molecules having higher concentrations of certain base pairs. Specifically, the DNA molecules having the greatest thermal resistance are those which include higher levels of GC base pairs and lower levels of AT base pairs. For example, the sequence GCAT (with corresponding base pair sequence CGTA) shows thermal stability at temperatures of from about 186 to 221° F. The sequence GCGC (with corresponding base pair sequence CGCG) is thermally resistant at temperatures of up to about 269 to 292° F. Conversely, the inclusion of higher levels of AT base pairs reduces thermal stability. For example, some thymine in the combination reduces the stability such that the sequence ATCG (with corresponding base pair sequence TAGC) only survives at temperatures of up to about 222 to 250° F., while the sequence TATA (with corresponding base pair sequence ATAT) is thermally stable at temperatures of up to only about 129 to 175° F. In addition, if the DNA molecules that include the sequence ATCG (with corresponding base pair sequence TAGC) are manipulated to include a modification known as G-clamp, the thermal stability increases by an additional 32° F. or from temperatures of up to about 254 to 282° F. As shown below, the G-clamp modification involves adding a tricyclic analogue of cytosine giving the duplex base pair (G-C) an additional hydrogen bond.

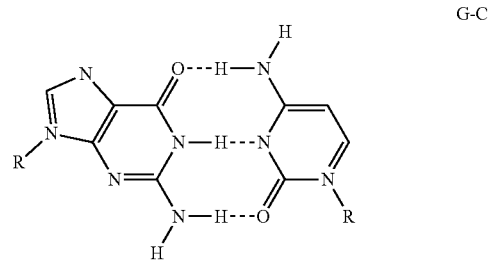

-continued

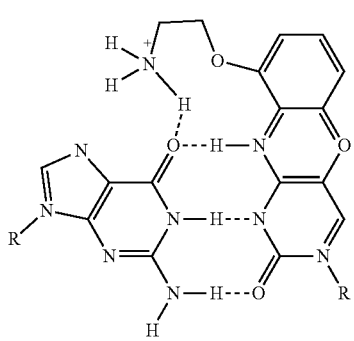

G-G-clamp

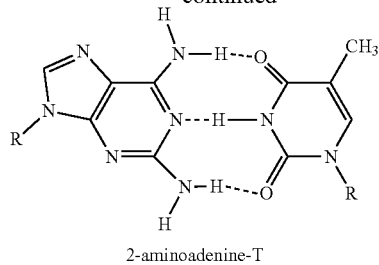

2-aminoadenine-T

By increasing the hydrogen bonding of the duplex base pair from 3 to 4, the thermal stability increases by an additional 32° F.

The DNA can be either single stranded or double stranded. The natural orientation of DNA in the double stranded version is the Watson-Crick pairing. Synthetic DNA, however, is not constrained in the same way as natural DNA. Still, the indicator of thermal stability is a thermodynamic reorientation of the strands and consists primarily of the strands separating into two single strands. This is known as melting and happens over a narrow temperature range. What has been observed is that the DNA of some organisms resists this thermal collapse, examples being certain thermophilic organisms. Analysis of their genomes gives a direct correlation between the levels of G-C DNA in the sequences. Thermal stability is directly or indirectly related to the number of hydrogen bonds between the bases in the duplex pairs. However, the stacking (pairing in the double strands) is also a factor. It has been determined that an important feature of thermal stability in natural DNA relies heavily upon the molar ratio of G-C pairing since this gives the highest density of hydrogen bonds. Thermal stability ultimately depends upon the so-called melting point where the strands of a double stranded DNA separate. This has no significance to single stranded synthetic DNA, however, which is already separated. The separation of the strands of double stranded DNA which occurs at the melting point is to some extent reversible. The strands can re-join once the temperature drops sufficiently. The thermal stability depends upon the thermal resistance of the base pairs or duplex units as well as the stacking forces which join the strands of double stranded DNA. As noted above, thermal stability can also be improved by modifying the molecular arrangement within a particular base pair. For instance, in addition to the G-G-Clamp modification noted above, the thermal stability of an A-T base pair can be improved, as shown below, by modifying the adenine-thymine base pair to include a 2-aminoadenine-T complex which increases the hydrogen bonding in the complex from 2 to 3 and increases its thermal stability by about 5° F.

A-T

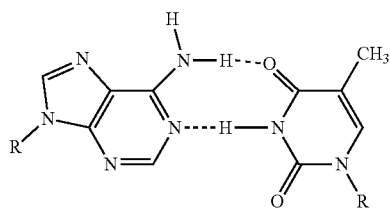

The thermal stability of specific base pairs can be used to generate a thermodynamic assessment of potential. As noted above, reasonable chemical modifications can extend this thermal range and retain the essential features of DNA for the purposes of measurement. The chemical nature of DNA means that it is susceptible to hydrolysis and the rate of hydrolysis increases with increasing temperature. Hydrolysis is another route for the decomposition of DNA in addition to decomposition due to its melting behavior as discussed above. That said, it is known that a number of organisms survive extremes of temperature which means that their genetic material must have some inherent thermal stability. This response has been directly correlated to the molar fraction of G-C base pairs irrespective of whether such base pairs are present as single or double strands. Natural DNA, however, is chromosomal and so must be double stranded.

Also it has been shown that the repetition of the G-C duplex appears to impart more stability since it has a direct effect upon the thermal resistance of the DNA. This shows how various organisms cope with high temperature by incorporating a larger G-C molar fraction into their genome. It appears that the molar fraction of G-C is the key rather than any weak link, which might be incorporated into the sequence. Chain terminators appear to have little overall effect on the thermal stability of the DNA. Essentially, what this means is that the molar fraction of certain base pairs in the DNA sequence can be varied according to the temperature range required. Getting down to the detail of destruction reactions for the DNA sequence will depend upon the environment to which a particular DNA sequence will be subjected and the exposure to hydrolysis reactions are an area of concern. However the modifications of the base pairs discussed above which can be introduced while still retaining the inherent features which make DNA an ideal tracer offer clear routes for tailor-made tracers for oilfield use.

Selectively using a specific DNA molecule as a biological marker based on its thermal stability properties allows for the use of DNA as a biological marker over a far wider range of conditions than is currently possible. Further, the survival of the DNA molecules at higher temperatures allows for accurate detection even with very low levels of DNA present in the formation by avoiding degradation of the DNA. Additionally, the diverse number of unique DNA molecules vastly adds to the number of unique tracers which can be applied in the oilfield, thereby greatly increasing both the range and diversity of oilfield operations to which biological markers can be applied and greatly improving the knowledge and understanding of increasingly complex wells and their behavior. This knowledge will lead to better completion and stimulation practices resulting in cost savings and improved well performance.

In several exemplary embodiments, a DNA molecule exhibiting specific thermostability properties, based on its specific nitrogenous base composition that are compatible with the thermal environment of a specific well, can be selectively infused into and/or coated onto the proppant particulate 106 to be used in the well operations according to the methods and embodiments described herein. For example, for wells exhibiting temperatures of up to about 269 to 292° F., a DNA molecule containing the GCGC sequence could be synthesized and infused into and/or coated onto the proppant particulates 106 to be injected into the well formation. This DNA molecule would better withstand the thermal conditions of the well, thereby allowing it to be more effectively used as a biological marker that conveys information regarding well formation and production.

According to several exemplary embodiments, the chemical treatment agent 102, such as a biological marker separates from the proppant particulates 106 continuously over a period of up to about one year, up to about five years, or up to about ten years after placement of the proppant in the hydraulically created fracture. Systems, techniques and compositions for providing for the sustained release of DNA are well known to those of ordinary skill in the art. For example, European Patent No. 1,510,224, the entire disclosure of which is incorporated herein by reference, discloses several methods for enabling the sustained release of DNA over a period of time. According to several exemplary embodiments, DNA is encapsulated with a polymer or a material infused with DNA is coated with a permeable nondegradeable coating. In several exemplary embodiments, the encapsulating polymer includes one or more of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels, silicas, or other suitable encapsulating materials. Additionally, the encapsulating polymer may include an encapsulating material that includes a linear polymer containing degradable co-monomers or a cross-linked polymer containing degradable cross-linkers.

In one or more exemplary embodiments, the internal interconnected porosity of the porous ceramic proppant can be infused with a chemical treatment agent 102 such as a biological marker so that the porous ceramic proppant acts as a carrier for the biological marker in a hydraulic fracturing operation. According to several exemplary embodiments, the biological marker is DNA. DNA, or deoxyribose nucleic acid, is sometimes a double-stranded helical molecule that encodes the genetic information of almost all living systems. Each DNA molecule can be unique as a result of a particular sequence of nitrogenous bases—adenine ("A"), thymine ("T"), cytosine ("C") and guanine ("G")—contained with the molecule. The double helix structure is formed and maintained by the pairing of a nitrogenous base on one phosphate/sugar backbone carrier chain with a nitrogenous base on the other phosphate/sugar backbone carrier chain through hydrogen bonding. Specifically, an adenine base will pair with a thymine base (an "AT" base pair), and a cytosine base will pair with a guanine base (a "GC" base pair). Probability terms can be calculated for the frequency of a given sequence of bases, and as long as a large enough DNA molecule is used, the "uniqueness" of a particular molecule of DNA can be known with sufficient certainty. The DNA molecule may be naturally occurring or a manufactured (synthetic) DNA and can be double stranded or single stranded. Synthetic DNA is commercially available and may be manufactured to order by several specialized DNA manufacturers, such as GenScript, Synthetic Genomics, DNA 2.0, Genewiz, Inc., Life Technologies, and Cambrian Genomics. Further, the DNA can be "encapsulated" to enhance its survivability at downhole reservoir conditions and to otherwise alter its interaction with formation fluids. Additionally, specific DNA sequences may be selected for use based on compatibility with the thermal environment of a specific well.

According to several exemplary embodiments, the coating 104, 204 can be or include a resin material and/or an epoxy resin material. The coating 104, 204 can include any suitable resin material and/or epoxy resin material. According to several exemplary embodiments, the resin material includes any suitable resin. For example, the resin material can include a phenolic resin, such as a phenol-formaldehyde resin. According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present invention, the coating 104, 204 applied to the proppant particulates 106 is an epoxy resin. According to such embodiments, the coating 104, 204 can be or include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to one or more exemplary embodiments, the chemical treatment agent 102 is mixed with or otherwise added to the resin coating 104, 204 prior to coating the proppant particulates 106 with the resin coating 104, 204. For example, the chemical treatment agent 102 can be homogenously mixed with the coating 104, 204 prior to coating the proppant particulates 106 with the coating 104, 204.

According to one or more exemplary embodiments, the proppant particulates 106 are porous ceramic particulates infused with one or more chemical treatment agents 102. Methods for infusing porous ceramic particulates with chemical treatment agents are well known to those of ordinary skill in the art, such as those disclosed in U.S. Pat. Nos. 5,964,291 and 7,598,209, the entire disclosures of which are incorporated herein by reference. According to several exemplary embodiments, the porous ceramic particulates 106 act as a carrier for the chemical treatment agent 102 in a hydraulic fracturing operation.

According to several exemplary embodiments, the coating 104, 204 can be or include a degradable coating. Specifically, as the coating degrades, the chemical treatment agent 102 mixed with the coating 104, 204, disposed between the coating 104, 204 and the proppant particulate 106, and/or infused in the proppant particulate 106 can be released into the fracture. The amount and molecular weight of the degradable coating 104, 204 can be varied to provide for longer or shorter degrade times and tailored release of the chemical treatment agent 102.

According to certain embodiments, the degradable coating 104, 204 can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating 104, 204 includes one or more of water-soluble polymers and cross-linkable water-soluble polymers, the solubility parameters of such polymers can be controlled to adjust the timing of the solubility or degradation of the coating 104, 204. Such parameters can include molecular weight, the hydrophilic/lipophilic balance of the polymers, and the extent of cross-linking of the polymers. According to several exemplary embodiments, the degradable coating 104, 204 includes a degradable polymer such as polylactic acid, cellulose acetate, methyl cellulose or combinations thereof that can degrade inside the hydraulic fracture to allow for the release of the infused chemical treatment agent 102 at different time intervals.

According to one or more exemplary embodiments, the degradable coating 104, 204 can degrade in any suitable manner. For example, the degradable coating 204 can degrade from the outside-in, such that the outer surface of the coating 204 degrades first, resulting in controlled release of chemical treatment agent 102 blended with the coating 204. These degradable coating coatings 204 can include self-polishing coatings. The self-polishing coatings can include self-polishing copolymers having chemical bonds that are gradually hydrolyzed by water, such as produced water, seawater, and/or saltwater. The self-polishing coating can release chemical treatment agents 102 gradually, over time, due to the nature of the degradation of the coating 204 from its outermost surface towards its innermost surface, the degradation caused by the coating being gradually hydrolyzed by water.

According to several exemplary embodiments, the proppant particulates 106 can be coated with a polymeric material that forms a semi-permeable polymeric coating 104, 204 that is substantially non-degradable in the presence of the well fluids but permits the chemical treatment agent to leach, elute, diffuse, bleed, discharge, desorb, dissolve, drain, seep, and leak through the polymeric coating so as to release the chemical treatment agent 102 into the fracture or well area. The amount and molecular weight of the semi-permeable substantially non-degradable polymeric coating 104, 204 can be varied to provide for longer or shorter release times for tailored release of the chemical treatment agents 102. According to several exemplary embodiments, the proppant particulates 106 are coated with a semi-permeable substantially non-degradable polymer such as phenol formaldehyde, polyurethane, cellulose ester, polyamides, vinyl esters, epoxies, or combinations thereof.

The degradable shell 302 can be or include any material suitable to prevent or eliminate separation or release of the chemical treatment agent(s) 106 from the encapsulated proppant 300, 400, 500 until the degradable shell 302 degrades or breaks down. For example, the degradable shell 102 can be impermeable or substantially impermeable to fracturing fluids, reservoir fluids, or the like until the degradable shell 302 degrades to a point that it becomes permeable to the surrounding fluid(s). Once the degradable shell 302 becomes fluid permeable, the chemical treatment agent(s) 106 can separate or elute from the encapsulated proppant 300, 400, 500.

The degradable shell 302 can be or include any water soluble and/or hydrocarbon soluble material. In one or more exemplary embodiments, the degradable shell 302 can be or include the encapsulation materials and/or sustained release compositions described in any one of U.S. Pre-Grant Publication Nos. 2003/0147821, 2005/0002996 and 2005/0129759, each incorporated by reference herein in its entirety. In one or more exemplary embodiments, the degradable shell 302 can be or include fatty alcohols that include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, cetearth-3, and laureth-2. The degradable shell 302 can also be or include $C_8$-$C_{20}$ fatty acids that include, but are not limited to, stearic acid, capric acid, behenic acid, caprylic acid, lauric acid, myristic acid, tallow acid, oleic acid, palmitic acid, and isostearic acid. The degradable shell 302 can also be or include sorbitan derivatives that include, but are not limited to, PEG-10 sorbitan laurate, PEG-20 sorbitan isostearate, PEG-3 sorbitan oleate, polysorbate 40, sorbitan stearate, and sorbitan palmitate. The degradable shell 302 can also be or include one or more waxes that include, but are not limited to, mink wax, montan wax, carnauba wax, and candelilla wax, and synthetic waxes, such as silicone waxes. In one or more exemplary embodiments, the degradable shell 302 can be selected from polyoxymethylene urea (PMU), methoxymethyl methylol melamine (MMM), polysaccharides, collagens, gelatins, alginates, guar, guar gum, gum Arabic, and agar and any combination or mixture thereof. The degradable shell 302 can also be or include any suitable thermoplastic material. In one or more exemplary embodiments, the degradable shell 302 can be selected from polyvinyl alcohol, poly(acrylates and methacrylates), polylactic acid, polyamides, polyethylene, polypropylene, polystyrene, water-soluble polymers, and cross-linkable water-soluble polymers and any combination thereof.

In one or more exemplary embodiments, the degradable shell 302 can be a thermoplastic material that degrades at any suitable time and temperature. For example, the thermoplastic material can degrade at temperatures of at least about 5° C., at least about 10° C., at least about 20° C., at least about 30° C., at least about 50° C., at least about 70° C., or at least about 90° C. The thermoplastic material can also degrade at temperatures of less than 100° C., less than 95° C., less than 90° C., less than 80° C., or less than 70° C. The thermoplastic material can also degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more. In one or more exemplary embodiments, the thermoplastic material can degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more within a time period ranging from about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more.

According to one or more exemplary embodiments, the degradable shell 302 can degrade in any suitable manner. For example, the degradable shell 302 can degrade from the outside-in, such that the outer surface of the degradable shell 302 degrades first, resulting in controlled release of chemical treatment agent 106. The degradable shell 302 can also be a self-polishing coating as disclosed herein.

The degradable shell 302 can prevent the leaching, elution, diffusion, bleeding, discharging, desorption, dissolution, draining, seeping, or leaking of the chemical treatment agent 106 from the non-degraded encapsulated proppant, or encapsulated proppant particulates 300, 400, 500. According to one or more exemplary embodiments, the chemical treatment agents 106 can leach, elute, diffuse, bleed, discharge, desorb, dissolve, drain, seep, or leak from the encapsulated proppant particulates 300, 400, 500 at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days after being admixed with a hydraulic fracturing fluid. According to one or more exemplary embodiments, the chemical treatment agent 106 can leach, elute, diffuse, bleed, discharge, desorb, dissolve, drain, seep, or leak from the encapsulated proppant particulates 300, 400, 500 at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days after contacting a subterranean formation. For example, the degradable shell 302 can limit the amount of leaching, elution, diffusion, bleeding, discharging, desorption, dissolution, draining, seeping, or leaking of the chemical treatment agent 106 from the encapsulated proppant particulates 1300, 400, 500 to less than 10 ppm/gram, less than less than 5 ppm/gram, less than 1 ppm/gram, less than 0.5 ppm/gram, less than 0.1 ppm/gram, or less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after being admixed with a hydraulic fracturing fluid and/or a gravel-pack fluid. For example, the degradable shell 302 can limit the amount of leaching, elution, diffusion, bleeding, discharging, desorption, dissolution, draining, seeping, or leaking of the chemical treatment agent 106 from the encapsulated proppant particulates 300, 400, 500 to less than 10 ppm/gram, less than less than 5 ppm/gram, less than 1 ppm/gram, less than 0.5 ppm/gram, less than 0.1 ppm/gram, or less than less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after contacting a subterranean formation. In one or more exemplary embodiments, the degradable shell 302 can prevent any leaching, elution, diffusion, bleeding, discharging, desorption, dissolution, draining, seeping, or leaking of the chemical treatment agent 106 from the encapsulated proppant particulates 300, 400, 500 after being admixed with a hydraulic fracturing fluid and/or prior to contacting a subterranean formation.

According to several exemplary embodiments, the chemical treatment agent 102 is released from the proppant particulates 106 for a period of up to about one year, up to about five years, or up to about ten years after the proppant particulates 106 are placed in a fracture in a subterranean formation.

According to several exemplary embodiments, the proppant particulates 106 can be coated or encapsulated with one or more water-soluble chemical treatment agents 102 such as a scale inhibitor, a salt inhibitor, or combinations or mixtures thereof, and then further coated or encapsulated with one or more hydrocarbon-soluble chemical treatment agents 102 such as a paraffin inhibitor or asphaltene inhibitor, to provide the coated proppant particulates 100, 200 and/or the encapsulated proppant particulates 300, 400, 500. The coating of hydrocarbon-soluble chemical treatment agents 102 can be mixed with or disposed or layered around the coating of water-soluble chemical treatment agents. According to such embodiments, the coated proppant particulates 100, 200 and/or the encapsulated proppant particulates 300, 400, 500 are placed in a fracture in a subterranean formation and once hydrocarbon production begins, the presence of the hydrocarbons causes leaching, elution, diffusion, bleeding, discharging, desorbing, dissolving, draining, seeping, or leaking of the hydrocarbon-soluble chemical treatment agent 102 from the coated proppant particulates 100, 200 and/or the encapsulated proppant particulates 300, 400, 500. After a certain period of time, when water production begins, then the water-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

According to several exemplary embodiments, the proppant particulates 106 can be coated or encapsulated with one or more hydrocarbon-soluble chemical treatment agents 102 such as a paraffin inhibitor or asphaltene inhibitor, and then further coated or encapsulated with one or more water-soluble chemical treatment agents 102 such as a scale inhibitor, a salt inhibitor, or combinations or mixtures thereof, to provide the coated proppant particulates 100, 200 and/or the encapsulated proppant particulates 300, 400, 500. The coating of water-soluble chemical treatment agents 102 can be mixed with or disposed or layered around the coating of the hydrocarbon-soluble chemical treatment agents 102. According to such embodiments, the coated proppant particulates 100, 200 and/or the encapsulated proppant particulates 300, 400, 500 are placed in a fracture in a subterranean formation and once water production begins, the presence of water causes leaching, elution, diffusion, bleeding, discharging, desorbing, dissolving, draining, seeping, or leaking of the water-soluble chemical treatment agent 102 from the coated proppant particulates 100, 200 and/or the encapsulated proppant particulates 300, 400, 500. After a certain period of time, when hydrocarbon production begins, then the hydrocarbon-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

According to several exemplary embodiments, the proppant particulates 106 are porous ceramic proppant particulates that can be infused with one or more water-soluble chemical treatment agents 102 such as a scale inhibitor, a salt inhibitor, or combinations or mixtures thereof, and then coated or encapsulated with one or more hydrocarbon-soluble chemical treatment agents 102 such as a paraffin inhibitor or asphaltene inhibitor, to provide the coated proppant particulates 100, 200 and/or the encapsulated proppant particulates 300, 400, 500. According to such embodiments, the coated proppant particulates 100, 200 and/or the encapsulated proppant particulates 300, 400, 500 are placed in a fracture in a subterranean formation and once hydrocarbon production begins, the presence of the hydrocarbons causes leaching, elution, diffusion, bleeding, discharging, desorbing, dissolving, draining, seeping, or leaking of the hydrocarbon-soluble chemical treatment agent 102 from the coated proppant particulates 100, 200 and/or the encapsulated proppant particulates 300, 400, 500. After a certain period of time, when water production begins, then the water-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

According to several exemplary embodiments, the proppant particulates 106 are porous ceramic proppant particulates that can be infused with one or more hydrocarbon-soluble chemical treatment agents 102 such as a paraffin inhibitor or asphaltene inhibitor, and then coated or encapsulated with one or more water-soluble chemical treatment agents 102 such as a scale inhibitor, a salt inhibitor, or combinations or mixtures thereof, to provide the coated proppant particulates 100, 200 and/or the encapsulated proppant particulates 300, 400, 500. According to such embodiments, the coated proppant particulates 100, 200 and/or the encapsulated proppant particulates 300, 400, 500 are placed in a fracture in a subterranean formation and once water production begins, the presence of water causes leaching, elution, diffusion, bleeding, discharging, desorbing, dissolving, draining, seeping, or leaking of the water-soluble chemical treatment agent 102 from the coated proppant particulates 100, 200 and/or the encapsulated proppant particulates 300, 400, 500. After a certain period of time, when hydrocarbon production begins, then the hydrocarbon-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

The chemical treatment agents 102 can leach, elute, diffuse, bleed, discharge, desorb, dissolve, drain, seep, or leak from the coated proppant particulates 100, 200 at any suitable rate. The chemical treatment agents 102 can also leach, elute, diffuse, bleed, discharge, desorb, dissolve, drain, seep, or leak from the encapsulated proppant particulates 300, 400, 500 at any suitable rate once the degradable shell 302 becomes fluid permeable. For example, the chemical treatment agents 102 can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the chemical treatment agents can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

According to one or more exemplary embodiments, the scale inhibitor can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the scale inhibitor can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

According to one or more exemplary embodiments, the paraffin inhibitor can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the paraffin inhibitor can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

The coated proppant particulates 100, 200 and/or the encapsulated proppant particulates 300, 400, 500 can also be coated and/or infused with a surfactant and/or nanoparticle dispersion as disclosed herein so that the proppant particulates 106 act as a carrier for the surfactant and/or nanoparticle dispersion in a hydraulic fracturing operation. The use of a surfactant and/or nanoparticle dispersion that is coated onto the proppant itself, rather than simply pumped into a formation, as discussed above, offers improved wetting characteristics. The selection of a specific nanoparticle dispersion or surfactant to be coated on and/or infused into the proppant particulates 106 depends on the necessary adjustment in wetting characteristics of the proppant for the desired production enhancement. According to several exemplary embodiments, the nanoparticle dispersions or surfactants can be released from the coated proppant particulates 100, 200 and/or the encapsulated proppant particulates 300, 400, 500 when the degradable coating 104 and/or degradable shell 302 dissolves in aqueous or hydrocarbon fluids. According to such embodiments, upon degradation of the coating 104 and/or shell 302, some of the nanoparticle dispersions or surfactants are released upon exposure to passing fluids, and therefore improve the wettability of formation surfaces. The portion of the nanoparticle dispersions or surfactants remaining in the proppant would improve the wettability of the proppant itself.

Modifying wettability of the proppant can also reduce conductivity loss caused by fracturing fluids, control the relative permeability to flow of fluids which can be encountered in the reservoir, to "lubricate" the proppant to allow more efficient proppant arrangement when the fracture closes, and to reduce eventual scale buildup on proppant. Modifying wettability of the proppant can also provide significant flow benefits under multiphase flow as evidenced by trapped gas saturation, altered surface tension/contact angles, and electrostatic charges on the proppant. Proppant particulates 106 modified to have an "oil-wet" surface can be ideal in a gas well producing water, while proppant particulates 106 with a different wettability can give preferential flow to oil and reduce watercut.

The surfactant and/or nanoparticle dispersion can also leach, elute, diffuse, bleed, discharge, desorb, dissolve, drain, seep, or leak from the coated proppant particulates 100, 200 and/or the encapsulated proppant particulates 300, 400, 500 at any suitable rate. According to one or more exemplary embodiments, the surfactant and/or nanoparticle dispersion can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the surfactant and/or nanoparticle dispersion can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

In an exemplary method of fracturing a subterranean formation, a hydraulic fluid is injected into the formation at a rate and pressure sufficient to open a fracture therein, and a fluid containing a proppant composition including one or more coated proppant particulates 100, 200 and/or encapsulated proppant particulates 300, 400, 500 containing the one or more chemical treatment agents 102, as described herein and having one or more of the properties as described herein is injected into the fracture to prop the fracture in an open condition.

According to several exemplary embodiments, a method of diagnostic evaluation of a hydraulic fracturing operation is provided, the method including: 1) injecting a hydraulic fluid into the subterranean formation at a rate and pressure sufficient to open a fracture therein, and 2) injecting a proppant composition into the subterranean formation, wherein the proppant composition includes coated proppant particulates 100, 200 and/or encapsulated proppant particulates 300, 400, 500, 3) wherein the chemical treatment agent 102 separates from the proppant particulate 106 over an extended period of time, 4) wherein the chemical treatment agent 102 returns to the surface with the produced fluids, and 5) wherein the chemical treatment agent 102 is recovered and identified. According to several exemplary embodiments, the chemical treatment agent 102 is a biological marker, or biological tag.

According to several exemplary embodiments, in order to add porous, chemically infused ceramic proppant to standard non-porous ceramic proppant in a hydraulic fracture in a way that does not impair the permeability or conductivity of the standard non-porous ceramic proppant alone, requires the use of a combination of different types of ceramic proppants for the standard non-porous and porous portions of the total ceramic proppant mass utilized in the fracturing operation. For instance, according to several exemplary embodiments of the present invention, if the standard non-porous particulate selected is a light weight ceramic proppant, the porous ceramic particulate can be either an intermediate density ceramic proppant or a high density ceramic proppant. Also, according to several exemplary embodiments of the present invention, if the standard non-porous particulate selected is an intermediate density proppant, the porous ceramic particulate can be a high density ceramic proppant.

For example, the fraction of intermediate density porous ceramic proppant to be added to a standard non-porous light weight ceramic proppant will dictate the maximum porosity that the intermediate density porous ceramic may have and not negatively impact permeability. In this example, if a 10% fraction of intermediate density porous proppant is to be added to a standard light weight ceramic proppant then the maximum porosity of the intermediate density porous proppant may be 12% in order to not reduce the permeability of the proppant as compared to the permeability of the standard light weight ceramic proppant alone whereas adding a 10% fraction of an intermediate density porous proppant having 20% porosity may be detrimental to proppant permeability.

Figure 6:
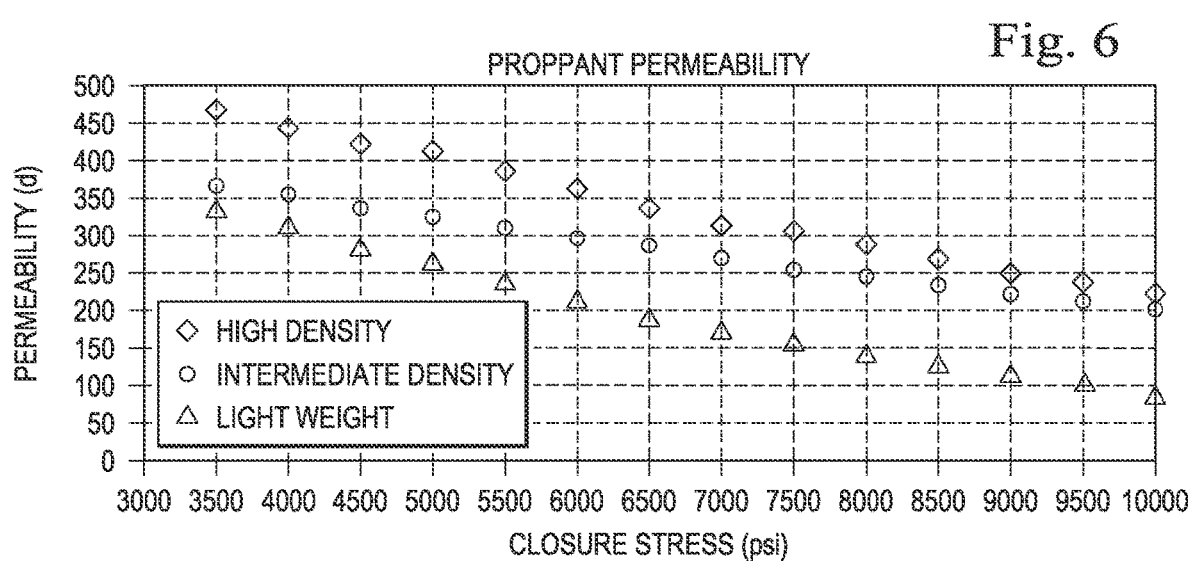
FIG. 6 is a graphical representation of a comparison of proppant permeability for lightweight ceramic proppant, intermediate density ceramic proppant, and high density ceramic proppant.
Figure 7:
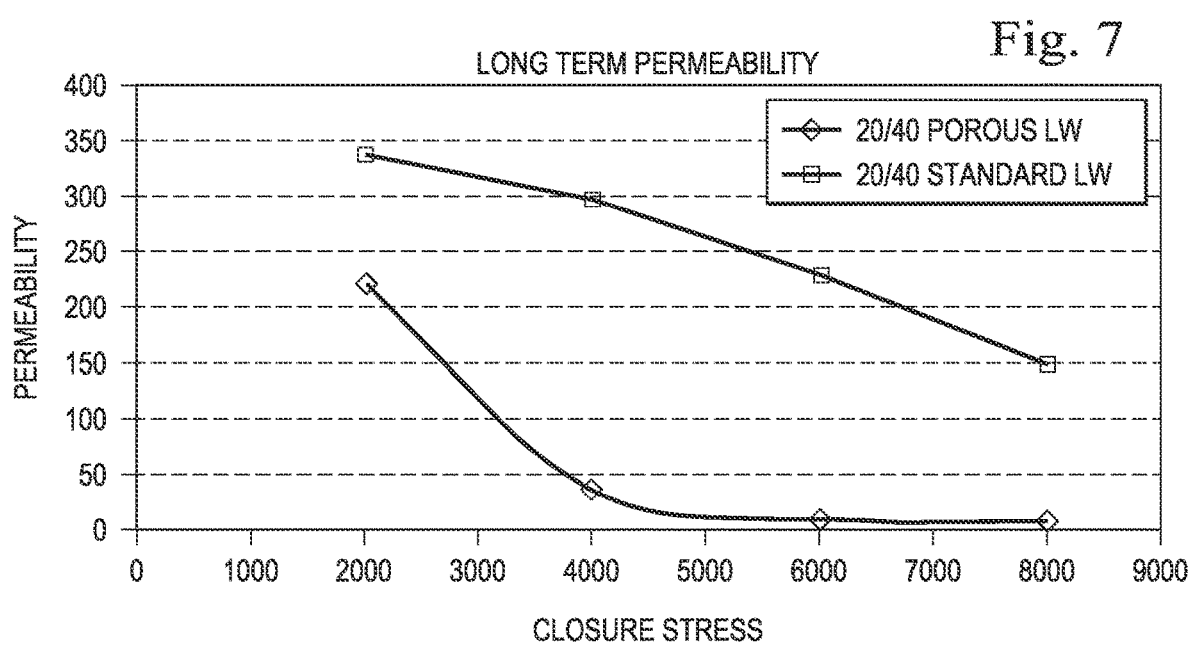
FIG. 7 is a graphical representation of the long term permeability of a standard non-porous light weight ceramic proppant and a light weight porous ceramic proppant (at 25% porosity).

FIG. 6 is a graphical comparison of the permeability of light weight ceramic proppant, intermediate density ceramic proppant, and high density ceramic proppant. As shown in FIG. 6, a high density ceramic proppant has a higher permeability than an intermediate density ceramic proppant which in turn has a higher permeability than a light weight ceramic proppant. This variability results from the crystalline structure differences arising from the difference in composition of the starting raw materials. FIG. 7 is a graphical representation of the long term permeability of a standard non-porous light weight ceramic proppant and a light weight porous ceramic proppant (at 25% porosity). Standard ceramic proppants are generally manufactured so as to eliminate as much porosity as is practically possible in the individual particulates in order to maximize the inherent strength of the particles. This is consistent with the nature of ceramic bodies in that they tend to fail as a function of the size of the largest internal flaw and in this context an internal open pore space is a flaw. Consequently, in a general sense, the lower the internal porosity with small pore sizes, the stronger the ceramic body. Conversely, in a general sense, the greater the overall amount of internal porosity and large pore size of a ceramic particulate the weaker will be its inherent strength. Thus, the conductivity of a light weight ceramic proppant in which there is 10% porosity in the particle will be lower than the conductivity of a lightweight ceramic proppant having 5% porosity which in turn will be lower than a non-porous light weight ceramic proppant.

Further, the comparison shown in FIG. 6 for non-porous ceramic particulates can be duplicated for porous ceramic particulates. Specifically, a high density porous ceramic proppant that has a porosity of the particulate of 12% will have a higher permeability than an intermediate density ceramic proppant with 12% particulate porosity, which in turn will have a higher permeability than a light weight ceramic proppant with 12% particulate porosity.

According to several exemplary embodiments, the porous, chemically infused porous ceramic proppant may have a similar alumina content as the standard non-porous ceramic proppant and can be added to the standard non-porous ceramic proppant in a hydraulic fracture in a way that does not impair the permeability or conductivity of the standard non-porous ceramic proppant alone. According to several exemplary embodiments, the porous, chemically infused porous ceramic proppant may have a higher alumina concentration compared to that of the standard non-porous ceramic proppant and can be added to the standard non-porous ceramic proppant in a hydraulic fracture in a way that does not impair the permeability or conductivity of the standard non-porous ceramic proppant alone. According to such embodiments, the porous and non-porous proppants can be processed in different ways such that the mechanical properties of the chemically infused porous ceramic proppant is approximately the same as or better that the mechanical properties of the standard non-porous ceramic proppant.

A ceramic proppant composition containing a mixture of porous ceramic proppant and non-porous ceramic proppant can have a conductivity that is at least about 10%, at least about 20%, at least about 30%, at least about 40%, at least about 50%, at least about 60%, at least about 70%, at least about 80%, at least about 90%, at least about 95%, or at least about 99% of the conductivity of the non-porous ceramic proppant. For example, the ceramic proppant composition containing a mixture of porous ceramic proppant and non-porous ceramic proppant can have a conductivity from about 25% to about 125%, about 55% to about 115%, about 65% to about 112%, about 75% to about 108%, about 85% to about 105%, about 95% to about 105%, or about 99.99% to about 102% of the conductivity of the non-porous ceramic proppant.

As noted above, ceramic proppants can be manufactured to a range of apparent specific gravities and such range of specific gravities reflects the range of internal porosity present in the ceramic pellets. The internal porosity of commercial ceramic proppant is oftentimes low (generally less than 5% and this internal porosity is not interconnected). As disclosed in U.S. Pat. No. 7,036,591, however, the processing of ceramic proppants can be altered to generate within the individual ceramic pellet a porosity exceeding 30%. As pellet porosity exceeds about 5%, the porosity of the pellet becomes interconnected. According to several exemplary embodiments, the internal interconnected porosity in the porous ceramic proppant can be infused with a chemical treatment agent. Methods for infusing a porous ceramic proppants are well known to those of ordinary skill in the art, for instance see U.S. Pat. Nos. 5,964,291 and 7,598,209, and similar processes such as vacuum infusion, thermal infusion, capillary action, ribbon blending at room or elevated temperature, microwave blending or pug mill processing can be utilized to infuse porous ceramic proppants with chemical treatment agents according to several exemplary embodiments of the present invention.

As noted above, the internal porosity in porous ceramic proppant particulates 106 can be infused with a chemical treatment agent 102 such as a tracer material so that the porous ceramic particulates 106 act as a carrier for the tracer in a hydraulic fracturing operation. By tailoring the type of porous ceramic particulates 106 used as a carrier, according to the methods discussed above, any potential impact to proppant conductivity by using the porous ceramic particulates 106 can be avoided. According to certain embodiments of the present invention, the tracer material includes metallic or non-metallic nano-particles while in other embodiments, the tracer material includes a chemical tracer.

In one or more exemplary embodiments, the chemical treatment agents 102 include one or more radio-frequency identification (RFID) tags. The RFID tag can be included on and/or in any of the proppant particulates 106 disclosed herein in any manner disclosed herein. The RFID tag can be coated on and/or infused into the porosity of the proppant, for example the porous ceramic proppant particulates 106. The RFID tags can have any suitable size. For example, the RFID tag can have a size suitable for infusing the RFID tag into one or more pores of the porous ceramic proppant particulates 106. In one or more exemplary embodiments, the RFID tag can have a size range from about 10 nm to about 2 mm, measured in its largest dimension. In one or more exemplary embodiments, the infused RFID tags can elute from the porous ceramic proppant particulates 106 located in a subterranean environment and reliably carried to the surface in produced fluid. The produced fluid can be water or a hydrocarbon and RFID tracer can be infused with the water-soluble or hydrocarbon-soluble resin materials disclosed herein so that the RFID tags elute in the presence of produced water or produced hydrocarbons. The RFID tags can be passive RFID tags or active RFID tags. For example, a passive RFID tag can elute from the proppant particulate as disclosed above and activated at or near the surface by a power source located at or near the surface to cause a signal to emit from the RFID tag. After activation, the RFID tag can emit a signal that can be recorded, decoded, and/or analyzed at or near the surface to determine which zone(s) are producing and whether water or hydrocarbons are being produced from the respective zone(s).

According to several exemplary embodiments, the chemical treatment agents 102 can be or include chemical tracer materials, such as the biological tags described in International Patent Publication No. WO2007/132137, various dyes, fluorescent materials, as well as biological markers, such as DNA. Other chemical tracers can include fluorine substituted compounds. According to several exemplary embodiments, in order to ensure the tracer is reliably carried to the surface in produced fluid, the tracer is soluble in the produced fluid. The produced fluid can be water or a hydrocarbon and there are available tracers that are only soluble in water or only soluble in liquid hydrocarbon or only soluble in hydrocarbon gases. This variable solubility allows for more definitive diagnostic capabilities. For example hydraulic fracturing is often performed in stages. That is, the entire hydrocarbon bearing interval to be hydraulically fractured is not stimulated at one time but rather in stages. In the case of a horizontal well, as many as forty separate hydraulic fracturing operations, or stages, can be conducted in the horizontal section. Because each stage of hydraulic fracturing entails additional cost, it is of interest to determine how many of the stages are contributing to production from the well and further which contributing stages are producing hydrocarbons and which are producing water. The use of distinctive tracer materials can accomplish this objective. For example, if a well is hydraulically fractured in five stages and it is of diagnostic importance to determine which of the stages are producing liquid hydrocarbons and which of the stages are producing water, then there can be introduced into the proppant for stage 1 a fraction thereof containing a unique liquid hydrocarbon-soluble Tracer 1H. Also, there can be added to this stage, a fraction of the proppant that contains a unique water-soluble Tracer 1W. For the second stage of the hydraulic fracturing operation, then there can be introduced into the proppant for stage 2 a fraction containing a unique liquid hydrocarbon soluble Tracer 2H. Also, there can be added to this stage a fraction of the proppant containing a unique water-soluble Tracer 2W. This method of adding uniquely distinguishable hydrocarbon-soluble and water-soluble tracers contained within and/or on the proppant particulates can continue for all or a portion of the subsequent stages. When the well is then placed on production following the completion of the hydraulic fracturing operations, samples of the produced water and hydrocarbons can then be captured at different points in time following the start of production and analyzed for the presence of the unique tracer materials. By determining the presence and relative concentration of each of the tracer materials, diagnostic determinations can be made of effectiveness of the stimulation and the hydrocarbon content of the stimulated formation. This diagnostic information can then be utilized to optimize subsequent hydraulic fracturing operations in nearby wells.

Coating the biological marker onto the proppant particulates and/or infusing the biological marker into the proppant particulates 106, rather than adding the biological marker directly to the fracture fluids, permits a long term diagnostic capability not otherwise available. When the marker is added directly to the fracture fluid it will flow back immediately with the fluid when the well is placed on production because there is no mechanism for the marker to remain in the well. Thus, the diagnostic benefits of adding the marker directly to the fracture fluid are limited. Conversely, when the biological marker is coated onto and/or infused into proppant particulates 106, the elution of the marker is slow and can be controlled by one or both of the characteristics of the porosity of the proppant grain or by the addition of a permeable coating on the proppant particulates 106 to delay the release of the biological marker.

In order for the biological marker to be reliably carried to the surface in produced fluid, the biological marker must be capable of eluting from the proppant particulate 106 and partitioning into the produced fluid which may be a water-based or hydrocarbon-based fluid. According to several exemplary embodiments, the biological marker can be encapsulated to preferentially partition into either or both water and hydrocarbon phases, depending on the diagnostic goals. This variable partitioning allows for more definitive diagnostic capabilities. For example, as mentioned above, hydraulic fracturing is often performed in stages. That is, the entire hydrocarbon bearing interval to be hydraulically fractured is not stimulated at one time but rather in stages. In the case of a horizontal well as many as 40 separate hydraulic fracturing operations may be conducted in the horizontal well. Because each stage of hydraulic fracturing entails additional cost, it is of interest to determine how many of the stages are contributing to production from the well and further which contributing stages are producing hydrocarbons and which are producing water.

According to several exemplary embodiments, the biological marker(s) disclosed herein can be used to accomplish this objective. For example, according to several exemplary embodiments, if a well is hydraulically fractured in five stages and it is of diagnostic importance to determine which of the stages are producing hydrocarbons and which of the stages are producing water, then the proppant particulates 106 can contain for the first stage a unique hydrocarbon-partitioning biological marker, such as an encapsulated synthetic DNA with a known sequence. Also, there can be added to the first stage one or more proppant particulates 106 containing a unique water-partitioning biological marker. For the second stage of the hydraulic fracturing operation, then the proppant particulates 106 can contain a different unique hydrocarbon-partitioning biological marker. Also, there can be added to the second stage one or more proppant particulates 106 can contain a different, unique water-partitioning biological marker. According to several exemplary embodiments, this method of utilizing different uniquely distinguishable hydrocarbon- and water-partitioning biological markers that are contained on and/or in the proppant particulates 106 can continue for all or a portion of the subsequent stages. In addition to determining which stages of a hydraulically fractured well are producing hydrocarbons and/or water it may be desirable to determine the fraction of the created fracture that is contributing to the flow of fluids. Estimates of the length and heights of the created fracture are possible by various means well known to those of ordinary skill in the art. Fracture lengths of several hundred feet and heights of 50 feet or more are common. Further it is also well established that the entire length and height of the created fracture may not contribute to production from the well. This lack of contribution can be determined by a number of methods well known to those of ordinary skill in the art. To the extent the entire fracture does not contribute to flow, the cost to create the non-contributing portion is wasted or conversely failure of a portion of the fracture to contribute may result in a reduction of produced hydrocarbons from the well. Thus, it is valuable to assess the fraction of the created fracture contributing to flow. Such knowledge can lead to optimization of the design of subsequent hydraulic fracturing operations. This can be accomplished by incorporating one or more proppant particulates 106 containing a unique water and/or hydrocarbon partitioning biological marker within a segment of the proppant being pumped in a particular stage and then incorporating one or more proppant particulates 106 containing a different unique water and/or hydrocarbon partitioning biological marker within a second a segment of the proppant being pumped in the same stage. This method can be replicated for as many segments of the stage one desires to interrogate. In the case of a 40 stage hydraulic fracturing operation where it is desirable to determine the contribution of both hydrocarbons and water from each stage as well as the hydrocarbon and water contribution from 5 segments of each stage, then 400 unique biological markers are required.

According to several exemplary embodiments, when the well is placed on production following the completion of the hydraulic fracturing operations, the biological marker will elute from the proppant particulates 106 and will partition into one or both of the produced hydrocarbons and water. Samples of the produced water and hydrocarbons are then captured at different points in time and analyzed for the presence of the unique biological markers. By identifying the presence and relative concentration of each of the biological markers, diagnostic determinations can be made of the effectiveness of the stimulation and the hydrocarbon or water productivity of the stimulated formation. This diagnostic information can then be utilized to optimize subsequent hydraulic fracturing operations in nearby wells.

In order to accomplish this, and according to several exemplary embodiments, the biological marker separates from the proppant particulates 106 after the proppant particulates are injected into the fracture. In several exemplary embodiments, separation of the biological marker from the proppant particulates 106 can be accomplished by the biological marker leaching, eluting, diffusing, bleeding, discharging, draining, seeping, or leaking out of the proppant, or any combination thereof. Further, this leaching, eluting, diffusing, bleeding, discharging, draining, seeping, or leaking out of the proppant, or any combination thereof can be further controlled by a permeable coating 104.

As mentioned above, the partitioning of the biological marker, i.e., whether into the hydrocarbon or water phase, can be tailored based on the needs of the fracturing operation by tailoring the encapsulation material. If, for example, diagnostic information is needed about a hydrocarbon-producing section of the well, a proppant particulate 106 can be infused and/or coated with an encapsulated hydrocarbon-partitioning biological marker, which will then separate from the proppant into the surrounding hydrocarbon fluids. Conversely, if diagnostic information is needed about a water-producing section of the well, a proppant particulate can be infused and/or coated with an encapsulated water-partitioning biological marker, which will then separate from the proppant into the water.

The biological marker 102 can leach, elute, diffuse, bleed, discharge, desorb, dissolve, drain, seep, or leak from the coated proppant particulates 100, 200 and/or the encapsulated proppant particulates 300, 400, 500 at any suitable rate. According to one or more exemplary embodiments, the biological marker can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 4 ppm/(gram*day), at least about 6 ppm/(gram*day), or at least about 8 ppm/(gram*day) for at least about 2 weeks, at least about 1 month, at least about 2 months, at least about 6 months, at least about 9 months, at least about 1 year, or at least about 2 years. For example, the biological marker 102 can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), or about 75 ppm/(gram*day) for at least about 2 weeks, at least about 1 month, at least about 2 months, at least about 6 months, at least about 9 months, at least about 1 year, or at least about 2 years.

According to several exemplary embodiments, after the chemical treatment agent 102, such as a biological marker separates from the proppant and partitions into a production fluid, the production fluid will then transport the biological marker to the surface. Once the production fluids reach the surface, the fluids can be analyzed for the presence of the biological marker.

According to several exemplary embodiments, the chemical treatment agent 102 includes one or more biological markers having unique identifiers and the unique identifier of the one or more biological markers is logged before the one or more markers is injected into the fracture. In several exemplary embodiments when multiple biological markers are used across one or all of the stages of a fracture, this log will enable the well operator to match the biological marker in the production fluid to the section of the fracture where it was produced. For example, if three unique DNA markers are injected into stages 1, 2, and 3, respectively, of a hydraulic fracturing stimulation operation, the unique identifying base sequence of each DNA marker injected into stages 1, 2, and 3 will be recorded. If DNA is detected in the production fluids at the surface, the sequence of the returned DNA can be compared to the log to determine which stage produced the DNA. Relative amounts of each marker can be used to quantitatively estimate the relative volumes of the produced fluids from each of the stages. Identification and detection of DNA sequences is well known in the art and many companies manufacture "off-the-shelf" identification and detection assays. For example, DNA detection and identification assays and kits are available commercially from Molecular Devices, L L C and Illumina, Inc. Further, DNA replication methodologies are well known to those of ordinary skill in the art. This permits extremely low levels of DNA present in the produced fluids, which may be below detection limits, to be identified by first employing a replication procedure to increase the concentration of the DNA beyond detection limits. Because the replication methods proportionally increase all DNA present, the relative amount of the individual DNA markers present is not altered.

According to several exemplary embodiments, once the biological markers are recovered from the production fluids and identified, a comparative analysis of the amount of biological marker from each stage or stage segment in the sample can then be related to the amount of hydrocarbon or water produced from that section. For example, the relative hydrocarbon or water volume contribution of a stage or stages of the formation can be estimated based on the amount of biological markers recovered, i.e. with more hydrocarbon or water produced from that stage resulting in more biological detection from that stage. Additionally, the relative hydrocarbon or water volume contribution of a segment of a stage can be estimated based on the amount of biological markers recovered from the segment of the stage. Based on this analysis, a diagnostic log across multiple stages of a fractured formation can be developed, giving a well operator detailed knowledge about the production volume (or lack thereof) of the entire fractured formation. This analysis can likewise be repeated periodically over an extended timeframe to establish trends in the production performance of the well providing diagnostic information that is not now available with existing technologies.

According to several exemplary embodiments, the coated proppant particulates 100, 200 are prepared according to a two-step process. In the first step, a chemical treatment agent 102 is infused into the porous ceramic proppant particulates 106. In the second step, the infused porous ceramic proppant particulates 106 are coated with a semi-permeable substantially non-degradable polymer coating 104, 204. In several exemplary embodiments, the chemical treatment agent 102 is infused into the porous ceramic proppant particulates 106 by vacuum infusion. In other exemplary embodiments, the chemical treatment agent 102 is infused into the porous ceramic proppant particulates 106 using a thermal infusion process whereby the porous ceramic proppant particulates 106 are heated and wetted with a solution containing the chemical treatment agent 102. As the porous ceramic proppant particulates 106 cool, capillary action causes the chemical treatment agent 102 to infuse into the porous ceramic proppant particulates 106. In one or more exemplary embodiments, the chemical treatment agent 102 can be infused into the porous ceramic particulates 106 using a microwave infusion process. A suitable microwave infusion process is disclosed in U.S. patent application Ser. No. 14/813,452, which is incorporated by reference herein in its entirety.

According to several exemplary embodiments, the chemically infused coated porous ceramic proppant is prepared according to a one step process. According to the one step process, the porous ceramic proppant particulates 106 are infused with a chemical treatment agent 102 using the thermal infusion process described above and coated with a semi-permeable substantially non-degradable polymer coating 104, 204 before the resultant heat from the thermal infusion process dissipates.

According to several exemplary embodiments, the coated proppant particulates 100, 200 can be prepared according to any suitable process. For example, a chemical treatment agent 102 can be coated onto and/or contacted with a proppant particulate 106 to produce a chemical treatment agent containing proppant particulate. The chemical treatment agent containing proppant particulate can be coated with a semi-permeable substantially non-degradable polymer, a degradable polymer, and/or a self-polishing polymer 104, 204. In several exemplary embodiments, additional chemical treatment agent 102 can be mixed with the semi-permeable substantially non-degradable polymer, the degradable polymer, and/or the self-polishing polymer 104, 204 prior to, during, or after coating onto the proppant particulate 106. In other exemplary embodiments, the chemical treatment agent 102 is infused into any porous spaces of the proppant particulate 106 as disclosed herein prior to coating by the chemical treatment agent 102, the semi-permeable substantially non-degradable polymer, the degradable polymer, and/or the self-polishing polymer 104, 204. The coated proppant particulates 100, 200 can be prepared as disclosed herein without the use of a solvent.

According to several exemplary embodiments, the encapsulated proppant particulates 300, 400, 500 are prepared according to a three-step process. In the first step, a chemical treatment agent 102 is infused into the porous ceramic proppant particulates 106. In the second step, the infused porous ceramic proppant particulates 106 are coated with a semi-permeable substantially non-degradable polymer coating 104 to provide a coated proppant particulate. In several exemplary embodiments, the chemical treatment agent 102 is infused into the porous ceramic proppant particulates 106 by vacuum infusion. In other exemplary embodiments, the chemical treatment agent 102 is infused into the porous ceramic proppant particulates 106 using a thermal infusion process whereby the porous ceramic proppant particulates 106 are heated and wetted with a solution containing the chemical treatment agent 102. As the porous ceramic proppant particulates 106 cool, capillary action causes the chemical treatment agent 102 to infuse into the porous ceramic proppant particulates 106. In one or more exemplary embodiments, the chemical treatment agent 102 can be infused into the porous ceramic particulates 106 using a microwave infusion process. A suitable microwave infusion process is disclosed in U.S. patent application Ser. No. 14/813,452, which is incorporated by reference herein in its entirety. In the third step, the degradable shell 302 can be coated onto the proppant particulate 106 containing the chemical treatment agent 102 to provide the encapsulated proppant 300, 400, 500.

According to several exemplary embodiments, the encapsulated proppant 300, 400, 500 is prepared according to a two-step process. In the first step, the porous ceramic proppant particulates 106 are infused with a chemical treatment agent 102 using the thermal infusion process or microwave infusion process described above and coated with a semi-permeable substantially non-degradable polymer coating before the resultant heat from the thermal infusion or microwave infusion process dissipates. In the second step, the degradable shell 302 can be coated onto the proppant particulate 106 containing the chemical treatment agent 102 to provide the encapsulated proppant 300, 400, 500.

According to several exemplary embodiments, the encapsulated proppant particulates 300, 400, 500 can be prepared according to any suitable process. For example, the chemical treatment agent 102 can be coated onto and/or contacted with a proppant particulate 106 to produce a chemical treatment agent containing proppant particulate. In producing the encapsulated proppant 300, 400, 500, the chemical treatment agent containing proppant particulate can be coated with a semi-permeable substantially non-degradable polymer, a degradable polymer, and/or a self-polishing polymer 104. In several exemplary embodiments, additional chemical treatment agent 102 can be mixed with the semi-permeable substantially non-degradable polymer, the degradable polymer, and/or the self-polishing polymer 104 prior to, during, or after coating onto the proppant particulate 106. In other exemplary embodiments, the chemical treatment agent 102 is infused into any porous spaces of the proppant particulate 106 as disclosed herein prior to coating by the chemical treatment agent 102, the semi-permeable substantially non-degradable polymer, the degradable polymer, and/or the self-polishing polymer 104. In one or more exemplary embodiments (not shown), the chemical treatment agent 102 can be mixed with the degradable shell 302 prior to, during, or after coating the degradable shell 302 directly or indirectly onto the proppant particulate 106. The chemical treatment agent 102 can be incorporated into the encapsulated proppant 300, 400, 500, in any manner as disclosed herein without the use of a solvent.

According to several exemplary embodiments, a composite ceramic proppant composition for use in hydraulic fracturing is produced. According to several exemplary embodiments, a composite ceramic proppant composition for use in a frac-pack is produced. According to several exemplary embodiments, a composite ceramic proppant composition for use in a gravel-pack is produced. According to several exemplary embodiments, the composite ceramic proppant composition includes porous ceramic proppant particulates 106 infused with a chemical treatment agent 102 without the use of a solvent. Furthermore, according to several exemplary embodiments, the infused porous ceramic proppant particulates 106 are coated with a semi-permeable substantially non-degradable polymer coating 104, 204. According to several other exemplary embodiments, the infused porous ceramic proppant particulates 106 are coated with a degradable polymer 104, 204. According to several other exemplary embodiments, the infused porous ceramic proppant particulates 106 are coated with a self-polishing polymer 104, 204.

According to several exemplary embodiments, another composite ceramic proppant composition for use in hydraulic fracturing is produced. According to several exemplary embodiments, the composite ceramic proppant composition uncoated sand and sand coated with and/or attached to a chemical treatment agent without the use of a solvent. Furthermore, according to several exemplary embodiments, the chemical treatment agent containing sand is coated with a semi-permeable substantially non-degradable polymer 104, 204. According to several other exemplary embodiments, the chemical treatment agent containing sand is coated with a degradable polymer 104, 204. According to several other exemplary embodiments, the chemical treatment agent containing sand is coated with a self-polishing polymer 104, 204.

According to several exemplary embodiments, the chemical treatment agent 102 is infused into the porous ceramic proppant particulates 106 without the use of a solvent by melting, thawing, heating, softening, or warming the chemical treatment agent 102 to a sufficiently low viscosity to allow infusion into the porous ceramic proppant particulates 106. In several exemplary embodiments, a sufficiently low viscosity to allow infusion into the porous ceramic proppant particulate 106 is from about 1000-10,000 centipoise (cps), from about 1000-5,000 cps, or from about 1000-2500 cps.

According to several exemplary embodiments, after the chemical treatment agent 102 is melted to a sufficiently low viscosity to allow infusion into the porous ceramic proppant particulates 106, the melted chemical treatment agent 102 is infused into the porous ceramic proppant particulates 106 using the infusion methods described above.

According to several exemplary embodiments, a composite proppant composition for use in hydraulic fracturing is produced. According to several exemplary embodiments, the composite proppant composition includes one or more of the coated proppants 100, 200 and/or the encapsulated proppants 300, 400, 500 as disclosed herein. The composite proppant composition can include the coated proppants 100, 200 and/or the encapsulated proppants 300, 400, 500 in any suitable amounts. In one or more exemplary embodiments, the composite proppant composition can include at least about 1 wt %, at least about 2 wt %, at least about 5 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, at least about 95 wt %, at least about 99 wt %, or 100 wt % of the coated proppants 100, 200 and/or the encapsulated proppants 300, 400, 500 based on the total weight of the composite proppant composition. In one or more exemplary embodiments, the composite ceramic proppant composition can have a coated proppant 100, 200 and/or encapsulated proppant 300, 400, 500 concentration of about 1 wt %, about 2 wt %, about 5 wt %, about 10 wt %, about 20 wt %, or about 30 wt % to about 40 wt %, about 50 wt %, about 60 wt %, about 70 wt %, about 80 wt %, about 90 wt %, about 95 wt %, or about 99 wt % or more.

According to several exemplary embodiments, a method of fracturing a subterranean formation includes injecting a hydraulic fluid into the subterranean formation at a rate and pressure sufficient to open a fracture therein, and a fluid containing a proppant composition including one or more of the coated proppants 100, 200 and/or the encapsulated proppants 300, 400, 500 as disclosed herein is injected into the fracture to prop the fracture in an open condition.

The coated proppants 100, 200 and/or the encapsulated proppants 300, 400, 500 can be included in a frac-pack or gravel-pack, according to several exemplary embodiments. In frac-pack or gravel-pack operations, the coated proppants 100, 200 and/or the encapsulated proppants 300, 400, 500 are placed in an annular space between a well casing and an interior screen or liner in a cased-hole frac-pack or gravel-pack, and/or in an annular space in the wellbore outside a screen or liner in open-hole fracturing, frac-packing, or gravel-packing operations. Pack materials are primarily used to filter out solids being produced along with the formation fluids in oil and gas well production operations. This filtration assists in preventing these sand or other particles from being produced with the desired fluids into the borehole and to the surface. Such undesired particles might otherwise damage well and surface tubulars and complicate fluid separation procedures due to the erosive nature of such particles as the well fluids are flowing.

The frac-pack and/or gravel-pack can include the coated proppants 100, 200 and/or the encapsulated proppants 300, 400, 500 in any suitable amounts. In one or more exemplary embodiments, the frac-pack and/or gravel-pack can include at least about 1 wt %, at least about 2 wt %, at least about 5 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, at least about 95 wt %, at least about 99 wt %, or 100 wt % the coated proppant 100, 200 and/or the encapsulated proppant 300, 400, 500.

Figure 8:
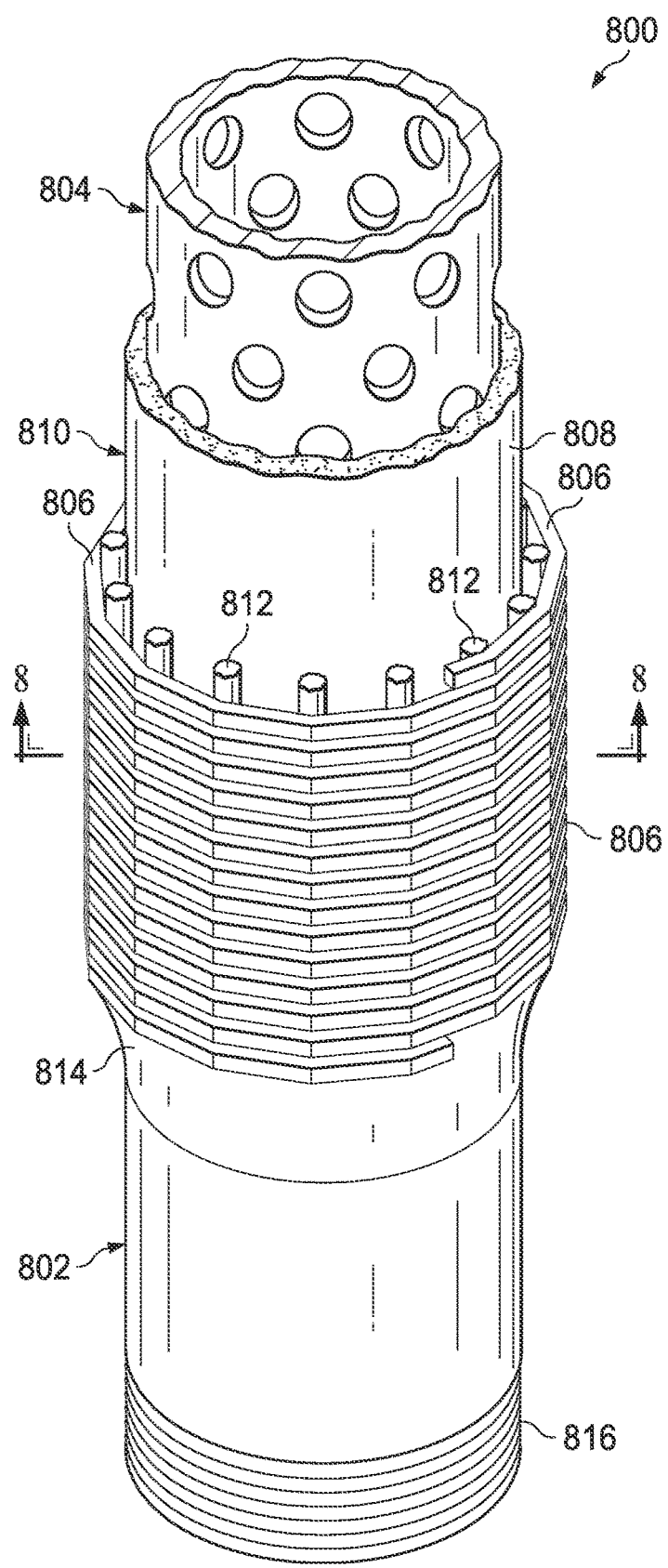
FIG. 8 depicts a perspective view of an illustrative prepack screen assembly containing a proppant pack, according to several exemplary embodiments described herein.

FIG. 8 depicts a perspective view of an illustrative pre-pack screen assembly 800 containing a proppant pack 810 containing the coated proppant 100, 200 and/or the encapsulated proppant 300, 400, 500. The proppant pack 810 can include the coated proppant 100, 200 and/or the encapsulated proppant 300, 400, 500 in any suitable amounts. In one or more exemplary embodiments, the proppant pack 810 can include at least about 1 wt %, at least about 2 wt %, at least about 5 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, at least about 95 wt %, at least about 99 wt %, or 100 wt % the coated proppant 100, 200 and/or the encapsulated proppant 300, 400, 500.

Figure 9:
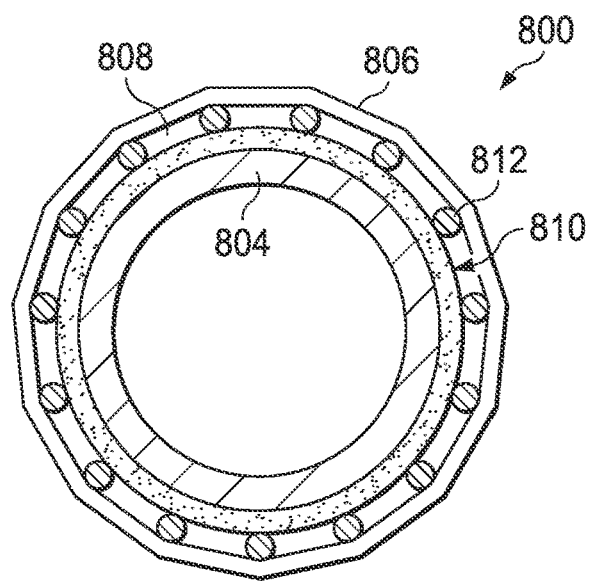
FIG. 9 depicts a cross-sectional view of the prepack screen taken along line 8-8 of FIG. 8.

As shown in FIG. 8, the prepack screen assembly 800 can include a tubular 802 having a perforated section 804. At least a portion of the perforated section 804 can be at least partially surrounded by a screen 806. For example, the screen 806 can be circumferentially disposed about the perforated section 804 and axially aligned with tubular 802. An annulus 808 can be formed between the tubular 802 and the screen 806. The proppant pack 810 can be disposed between the tubular 802 and the screen 806, in the annulus 808. A plurality of longitudinally arranged rods 812 can be disposed about the proppant pack 810 such that the screen 806 is at least partially offset from the proppant pack 810. The rods 812 can be spaced apart from one another and arranged coaxially with the tubular 802. The screen 806 can be wrapped around the rods 812 and welded to the tubular 802 via welds 814. The tubular 802 can include a threaded portion 816 on at least one end thereof for connecting the prepack screen assembly 800 to production tubing (not shown), for example. FIG. 9 depicts a cross-sectional view of the prepack screen taken along line 8-8 of FIG. 8. Examples of prepack screen assemblies can be found in U.S. Pat. Nos. 4,487,259 and 5,293,935, the entire disclosures of which are incorporated herein by reference.

The proppant pack 810 can be fused together and/or consolidated. The proppant pack 810 can be consolidated before, during, or after inclusion of the proppant particulates in the annulus 808. For example, loose, unconsolidated resin-coated proppant particulates can be introduced to the annulus 808 of the prepack screen assembly 800. After introduction of the coated proppant 100, 200 and/or the encapsulated proppant 300, 400, 500 to the annulus 808, a reactive crosslinker can contact the proppant 100, 200 and/or the encapsulated proppant 300, 400, 500 to consolidate the proppant pack 810. After completion of the prepack screen assembly 800 at the surface, the pre-pack assembly 800 can be lowered downhole to a desired depth.

According to several exemplary embodiments, the coated proppant 100, 200 and/or the encapsulated proppant 300, 400, 500 disclosed herein can be placed into any production tubing, such as a riser in order to deliver the chemical treatment agents 102 to any downstream tubing and/or equipment. According to several exemplary embodiments, the coated proppant 100, 200 and/or the encapsulated proppant 300, 400, 500 can be placed into any pipeline or process apparatus, such as a heat exchanger, in order to deliver chemical treatment agents 102 to a pipeline or any downstream process tubing and/or equipment. The coated proppant 100, 200 and/or the encapsulated proppant 300, 400, 500 can be placed in the production tubing, pipelines, and/or process tubing in any suitable manner. In one or more exemplary embodiments, the coated proppant 100, 200 and/or the encapsulated proppant 300, 400, 500 can be placed or contained in a removeable canister that can then be placed into the production tubing, pipelines, and/or process tubing, such as, for example, upstream and proximate to a pump or compressor.

Figure 10:
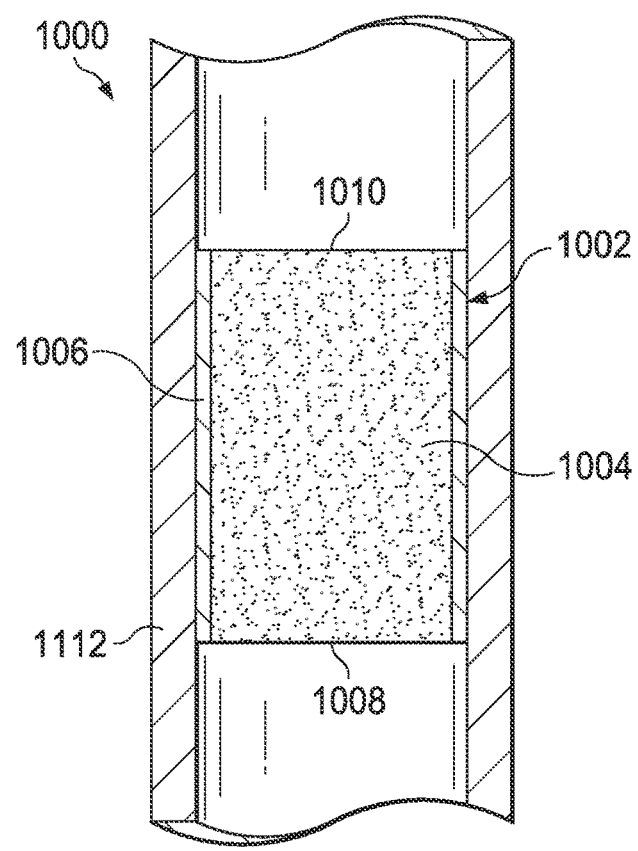
FIG. 10 depicts a cross-sectional side view of an assembly having a canister placed within a tubular.

FIG. 10 depicts a cross-sectional side view of an assembly 1000 having a canister 1002 placed within a tubular 1112. The canister 1002 can include a proppant pack 1004 containing the coated proppant 100, 200 and/or the encapsulated proppant 300, 400, 500. The canister 1002 can have any suitable size and shape. For example, the canister 1002 can have a size and shape corresponding to a size and shape of the tubular 1112. The tubular 1112 can be a component of, attached to, or otherwise in fluid communication with, a heat exchanger, a tubular reactor, a subsea riser, a pipeline, a pump, or any other suitable process equipment. As shown in FIG. 10, the canister 1002 can have a cylindrical body 1006 having an open first end 1008 and an open second end 1010 to permit fluid flow from the first end to the second end. At least a portion of the cylindrical body 1006 can be attached in any suitable manner to an inner wall or surface of the tubular 1112 for securing the canister 1002 to the tubular 1112. For example, the body 1006 can include a threaded section (not shown) that is capable of mating with a corresponding threaded section (not shown) located on or inside the tubular 1112.

Figure 11:
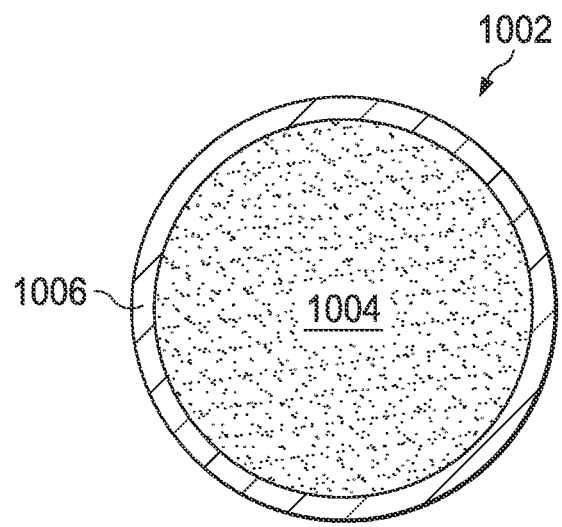
FIG. 11 depicts a cross-sectional end view of the canister shown in FIG. 10.
Figure 12:
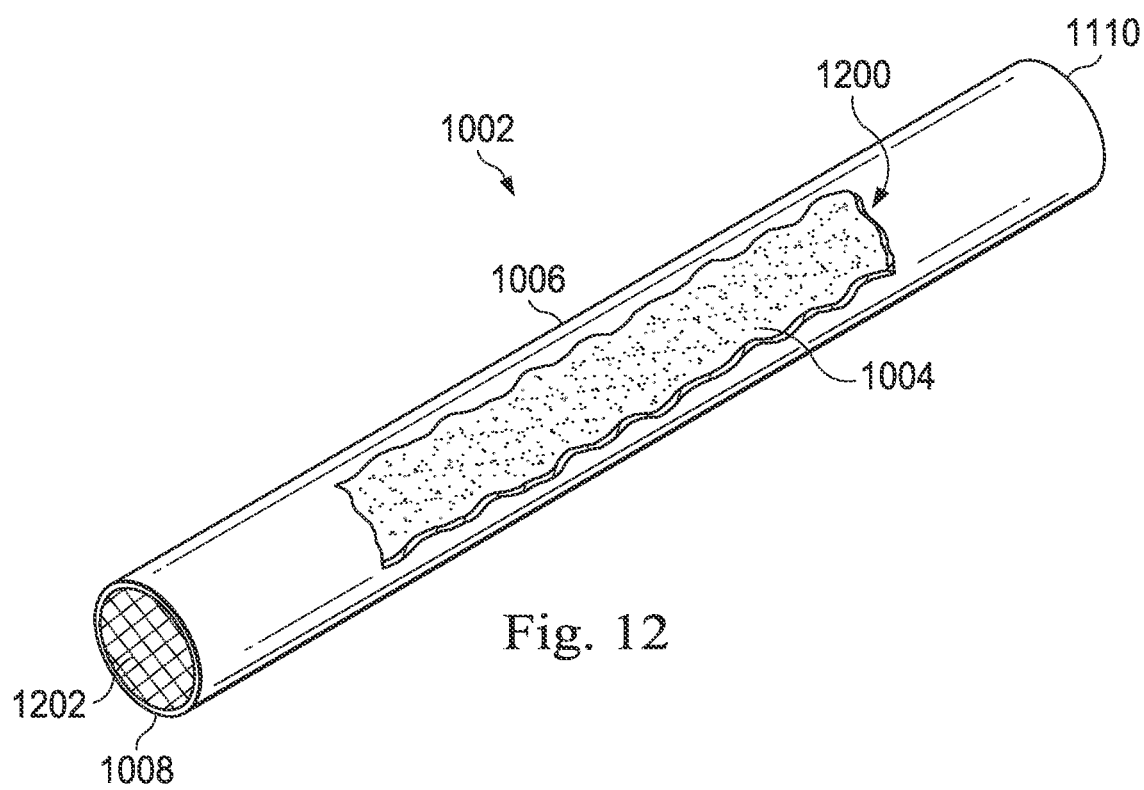
FIG. 12 depicts a perspective view of the canister shown in FIGS. 10 and 11.

FIG. 11 depicts a cross-sectional end view of the canister 1002. The proppant pack 1004 can fill an entire cross section of an inner volume of the body 1006 and/or the canister 1002. In one or more exemplary, embodiments, the proppant pack 1004 at least partially fills the inner volume of the body 1006 of the canister 1002. The proppant pack 1004 can fill at least 10 vol %, at least 25 vol %, at least 50 vol %, at least 75 vol %, at least 90 vol %, at least 95 vol %, or at least 99 vol % or about 100 vol % of the inner volume of the body 1006. In one or more exemplary embodiments, the proppant pack 1004 can occupy from about 10 vol % to about 90 vol %, from about 20 vol % to about 80 vol %, or from about 30 vol % to about 70 vol % of the inner volume of the body 1006. The proppant pack 1004 can have any suitable density of the coated proppant 100, 200 and/or the encapsulated proppant 300, 400, 500. For example, the amount of coated proppant 100, 200 and/or the encapsulated proppant 300, 400, 500 in the proppant pack 1004 can be selected to permit any desirable rate of fluid flow from the first end 1008 to the second end 1010. FIG. 12 depicts a perspective view of the canister 1002 having a cutaway section 1200 showing the proppant pack 1004. The proppant pack can be at least partially contained within the body 1006 by fluid permeable screens 1202 with a first screen 1202 located proximate the first end 1008 and a second screen (not shown) located proximate the second end 1010. The screens 1202 can have any configuration or design suitable for permitting fluid flow through in and out of the canister 1002 and blocking proppant flow from the canister 1002.

The following examples are illustrative of the compositions and methods discussed above.

EXAMPLES

The examples following below were carried out using exemplary materials in order to determine the elution rate of DTPMP (diethylenetriamine penta(methylene phosphonic acid)), a corrosion and scale inhibitor, from porous proppant infused with DTPMP and coated with various polymers and compared to uncoated porous proppant infused with DTPMP. These examples are meant to be illustrative of exemplary embodiments of the present invention and are not intended to be exhaustive.

Example 1

Four 500 gram batches of 20/40 CARBO UltraLite, an ultra-lightweight ceramic proppant having an ASG of 2.71 and having a porosity of 20-25% that is commercially available from CARBO Ceramics, Inc., were each infused with a diethylenetriamine penta(methylene phosphonic acid) ("DTPMP") solution having a solids content of 41%, which is commercially available from Riteks, Inc., and were then coated with a semi-permeable substantially non-degradable polymer in a two-step process as described below.

Each batch of proppant was heated in an oven set to 482° F. (250° C.) for approximately one hour. The heated batches of proppant were then removed from the oven and allowed to cool until they reached a temperature of between 430-440° F. as monitored by a thermocouple. Once the proppant batches reached the desired temperature, 64.2 grams of the DTPMP solution was added to each batch and allowed to infuse into the proppant particulates for approximately three minutes, such that the DTPMP constituted 5% by weight of the infused proppant. After the proppant particulates were infused with DTPMP, each batch was coated with a semi-permeable substantially non-degradable polymer.

The Batch 1 proppant was coated according to the following procedure with a phenol formaldehyde standard reactivity resin that is commercially available from Plastics Engineering Company under the trade name Plenco 14870. Compared to the other phenol formaldehyde resins discussed below, the Plenco 14870 resin had a relatively low viscosity of about 1100 cps at 150° C. After the coating procedure, the Batch 1 proppant included 2% by weight of the polymeric coating.

The Batch 1 proppant was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamethylenetetramine (which is also known as and will be referred to herein as "hexamine"), solution, and which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 2 proppant was coated according to the following procedure with a phenol formaldehyde highly reactive, high viscosity polymer resin that is commercially available from Plastics Engineering Company under the trade name Plenco 14750. Compared to the other phenol formaldehyde resins discussed above and below, the Plenco 14750 resin had a relatively high viscosity of about 34,900 cps at 150° C. After the coating procedure, the Batch 2 proppant included 2% by weight of the polymeric coating.

The Batch 2 proppant was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamine solution, which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 3 proppant was coated according to the following procedure with the phenol formaldehyde highly reactive, high viscosity polymer resin mentioned above that is commercially available from Plastics Engineering Company under the trade name Plenco 14750. As discussed above, the Plenco 14750 resin had a relatively high viscosity of about 34,900 cps at 150° C. After the coating procedure, the Batch 3 proppant included 4% by weight of the polymeric coating.

The Batch 3 proppant was placed in a heated mixing bowl and was monitored with a thermocouple until the proppant reached a temperature of between 410-420° F. When the proppant reached the desired temperature, 17.61 grams of the phenol formaldehyde resin was added to the proppant and allowed to melt and spread over the proppant for approximately 45 seconds. Next, 5.72 grams of a 40% hexamine solution, which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 4 proppant was coated according to the following procedure with a polyurethane polymer that is made by reacting a polyisocyanate resin with a curing agent both of which are commercially available from Air Products, Inc. under the trade names ANCAREZ® ISO HDiT and AMICURE® IC221, respectively. After the coating procedure, the Batch 4 proppant included 4% by weight of the polyurethane polymeric coating.

The Batch 4 proppant was placed in a mixing bowl that was maintained at room temperature. At room temperature, 13.5 grams of the curing agent AMICURE® IC221 was added to the proppant batch and mixed for one minute. After one minute, 7.2 grams of the ANCAREZ® ISO HDiT polyisocyanate resin was added to the proppant batch and mixed with the proppant for approximately 5 minutes.

A fifth proppant batch was then prepared that included 1000 grams of 20/40 CARBO UltraLite ceramic proppant. The Batch 5 proppant was infused with DTPMP and coated in a one-step thermal infusion process with a phenol formaldehyde highly reactive, low viscosity polymer resin that is commercially available from Plastics Engineering Company under the trade name Plenco 14862. Compared to the other phenol formaldehyde resins discussed above and below, the Plenco 14862 resin had a relatively low viscosity of about 1080 cps at 150° C. After the one-step thermal infusion process, the Batch 5 proppant included 2% by weight of the polymeric coating.

The Batch 5 ceramic proppant was heated in an oven set to 482° F. (250° C.) for approximately one hour. The heated batch of proppant was then removed from the oven and allowed to cool until it reached a temperature of between 430-440° F. as monitored by a thermocouple. Once the proppant batch reached the desired temperature, 128.4 grams of the DTPMP solution was added to the batch and allowed to infuse into the proppant particulates for approximately 5 seconds, such that the DTPMP constituted 5% by weight of the infused proppant. After 5 seconds had elapsed, 17.35 grams of the phenol formaldehyde, high reactivity, low viscosity polymer resin (Plenco 14862) was added to the proppant batch. After another 5 seconds had elapsed, 5.64 grams of a 40% hexamine solution, which is commercially available from The Chemical Company, was added to crosslink and cure the phenol formaldehyde resin and was allowed to mix for 10 minutes and 15 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for another 30 seconds.

Finally, a sixth proppant batch was prepared as a control. The Batch 6 control proppant batch, included 1000 grams of 20/40 CARBO UltraLite ceramic proppant and was infused with DTPMP but did not include a polymeric coating.

The Batch 6 ceramic proppant was heated in an oven set to 482° F. (250° C.) for approximately one hour. The heated batch of proppant was then removed from the oven and allowed to cool until it reached a temperature of between 430-440° F. as monitored by a thermocouple. Once the proppant batch reached the desired temperature, 241.8 grams of the DTPMP solution was added to the batch and allowed to infuse into the proppant particulates for approximately 3 minutes, such that the DTPMP constituted 9% by weight of the infused proppant.

Table 1 below represents the 6 batches prepared for Example 1.

TABLE 1

Example 1 Batches

| Batch Number | Infusant/Polymer Coating |
|---|---|
| Batch 1 | 5% by weight DTPMP, 2% by weight phenol formaldehyde, standard reactivity, low viscosity (Plenco 14870) |
| Batch 2 | 5% by weight DTPMP, 2% by weight phenol formaldehyde, high reactivity, high viscosity (Plenco 14750) |
| Batch 3 | 5% by weight DTPMP, 4% by weight phenol formaldehyde, high reactivity, high viscosity (Plenco 14750) |
| Batch 4 | 5% by weight DTPMP, 4% by weight polyurethane |
| Batch 5 | 5% by weight DTPMP, 2% by weight phenol formaldehyde, high reactivity, low viscosity (Plenco 14862) |
| Batch 6 | 9% by weight DTPMP, no coating |

Proppant Batches 1-6 were then placed in a seawater eluent for one hour. The seawater eluent was prepared according to the ASTM D1141-98(2013) procedure and had the composition shown below in Table 2.

TABLE 2

| ION & SALT | ION CONC. (mg/L) |
|---|---|
| $K^+$ as KCl | 403.0 |
| $Mg^{2+}$ as $MgCl_2 \cdot 6H_2O$ | 657.0 |
| $Na^+$ as NaCl | 10025.6 |
| $HCO_3^-$ as $NaHCO_3$ | 159.0 |
| $Na^+$ as $NaHCO_3$ | 59.9 |
| $SO_4^{2-}$ as $Fe_2SO_4 \cdot 7H_2O$ | 0.0 |
| $SO_4^{2-}$ as $Na_2SO_4 \cdot 10H_2O$ | 1308.0 |
| $Na^+$ as $Na_2SO_4 \cdot 10H_2O$ | 626.1 |
| $Ca^{2+}$ as $CaCl_2 \cdot 2H_2O$ | 329.0 |
| $Sr^{2+}$ as $SrCl_2 \cdot 6H_2O$ | 7.0 |
| $Ba^{2+}$ as $BaCl_2 \cdot 2H_2O$ | 0.0 |
| Fe(II) as $FeCl_2 \cdot 4H_2O$ | 0.0 |
| Fe(II) as $FeSO_4 \cdot 7H_2O$ | 0.0 |
| $CH_3COO^-$ as $CH_3COONa \cdot 3H_2O$ | 1.0 |
| $Na^+$ as $CH_3COONa$ | 0.4 |
| Total $SO_4^{2-}$ | 1308.0 |
| Total $Na^+$ | 10712.0 |
| $Cl^-$ from analysis (mg/L) = | 18330.0 |
| $Cl^-$ from calculation (mg/L) = | 18330.0 |
| Error (%) = | 0.00% |
| Total Salt Weight (mg/L) = | 37591 |
| Salt Concentration (%) = | 3.76% |

After one hour, the eluent was tested for the amount of DTPMP (in parts per million, ppm) present. For each of proppant Batches 1-5, the eluent was subsequently tested for the presence of DTPMP at 2, 3, 6, 25, 27.5, 29.5, and 97.5 hours, respectively. For proppant Batch 1, the eluent was additionally tested for the presence of DTPMP at 100, 102, 104.5 and 120.5 hours. For Batch 6, the eluent was subsequently tested for the presence of DTPMP at 2, 3, 4, 5, 21, 22, 23, 24, 26, 27, 28, 29, 44, 47, 49, 53, 70 and 74 hours.

Figure 13:
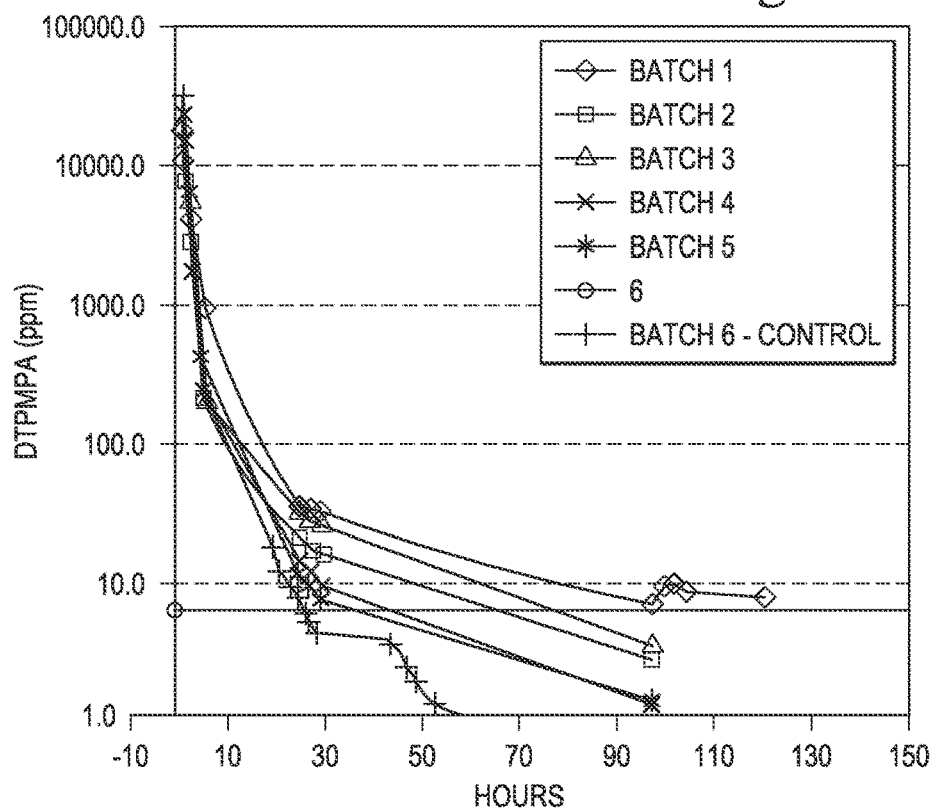
FIG. 13 is a graph of an elution profile for Example 1 in terms of DTPMP (diethylenetriamine penta(methylene phosphonic acid)) in parts per million (ppm) released as a function of time for porous ceramic proppant infused with DTPMP and encapsulated with various coatings.

The amount of DTPMP in ppm detected in the eluent was plotted as a function of time to obtain the elution profile curves shown in FIG. 13. In FIG. 13, a line has been drawn at 6 ppm which represents the minimum effective concentration of DTPMP as a corrosion and scale inhibitor. By plotting the amount of detected DTPMP in the eluent versus time for proppant Batches 1-6 and comparing these results with the 6 ppm line, the length of time a particular proppant batch elutes an effective amount of DTPMP can be determined.

FIG. 13 clearly shows that proppant Batches 1-5 which included a semi-permeable substantially non-degradable polymeric coating eluted an effective amount of DTPMP for a longer period of time compared to proppant Batch 6 which did not include a semi-permeable substantially non-degradable polymeric coating. FIG. 13 also clearly shows that for the three proppant batches that were infused with 5% by weight of DTPMP and coated with 2% by weight of phenol formaldehyde according to the two-step process, namely proppant Batches 1-3, the lower the viscosity of the resin used to make the phenol formaldehyde polymeric coating, the longer the period of time in which an effective amount of DTPMP was eluted. In addition, FIG. 13 shows that when phenol formaldehyde resins having relatively low viscosity are used to prepare the polymeric coating, the proppant coated according to the two-step process (Batch 1) eluted an effective amount of DTPMP for a longer period of time compared to proppant coated according to the one-step process (Batch 5). Finally, FIG. 13 shows that for the three proppant batches that were infused with 5% by weight of DTPMP and coated with 2% or 4% by weight of phenol formaldehyde according to the two-step process, namely proppant Batches 1-3, an effective amount of DTPMP was eluted for a longer period of time compared to proppant that was infused with 5% by weight of DTPMP and coated with 2% by weight of polyurethane according to the two-step process.

Example 2

Three 1000 pound plant batches of 20/40 CARBO Ultra-Lite, referred to below as Batches 7-9, were infused with the DTPMP solution mentioned above in Example 1 and were then coated according to the following procedure with a phenol formaldehyde standard reactivity resin that is commercially available from Plastics Engineering Company under the trade name Plenco 14941. Compared to the other phenol formaldehyde resins discussed above, the Plenco 14941 resin had a relatively medium viscosity of about 1850 cps at 150° C.

Each of Batches 7-9 were infused with 183.6 pounds of the DTPMP solution, such that the DTPMP constituted 7% by weight of the infused proppant. The proppant of Batches 7-9 was then coated with the phenol formaldehyde standard reactivity, medium viscosity polymer resin (Plenco 14941), in a two-step process. After the two-step process, the Batch 7 proppant included 0.5% by weight of the polymeric coating, the Batch 8 proppant included 1.0% by weight of the polymeric coating and the Batch 9 proppant included 2.0% by weight of the polymeric coating.

After the proppant particulates were infused with 7% DTPMP, each batch was coated with a different amount of the same semi-permeable substantially non-degradable polymer. The Batch 7 proppant was heated to 415° F. When the proppant reached the desired temperature, 6.6 pounds of the phenol formaldehyde, standard reactivity, medium viscosity polymer resin (Plenco 14941) was added to the proppant and allowed to melt and spread over the proppant for approximately 45 seconds. Next, 2.8 pounds of a 30% hexamine solution, and which is commercially available from The Chemical Company, was added to crosslink and cure the phenol formaldehyde resin and was allowed to mix for 25 seconds. Finally, 0.5 pound of a 50-60% cocoamidopropyl hydroxysultaine surfactant, which is commercially available from The Lubrizol Corporation under the trade name "Chembetaine™ CAS" was added and allowed to mix.

The Batch 8 proppant was heated to 415° F. When the proppant reached the desired temperature, 12.3 pounds of the phenol formaldehyde, standard reactivity, medium viscosity polymer resin (Plenco 14941) was added to the proppant and allowed to melt and spread over the proppant for approximately 45 seconds. Next, 5.2 pounds of a 30% hexamine solution, and which is commercially available from The Chemical Company, was added to crosslink and cure the phenol formaldehyde resin and was allowed to mix for 25 seconds. Finally, 0.5 pound of a 50-60% cocoamidopropyl hydroxysultaine surfactant, which is commercially available from The Lubrizol Corporation under the trade name "Chembetaine™ CAS" was added and allowed to mix.

The Batch 9 proppant was heated to 415° F. When the proppant reached the desired temperature, 22.7 pounds of the phenol formaldehyde, standard reactivity, medium viscosity polymer resin (Plenco 14941) was added to the proppant and allowed to melt and spread over the proppant for approximately 45 seconds. Next, 9.7 pounds of a 30% hexamine solution, and which is commercially available from The Chemical Company, was added to crosslink and cure the phenol formaldehyde resin and was allowed to mix for 25 seconds. Finally, 0.5 pounds of a 50-60% cocoamidopropyl hydroxysultaine surfactant, which is commercially available from The Lubrizol Corporation under the trade name "Chembetaine™ CAS" was added and allowed to mix.

Proppant Batches 7-9 of Example 2 were compared with proppant Batches 1, 2 and 6 from Example 1, as indicated in Table 3 below.

Proppant Batches 7-9 were then placed in a seawater eluent for one hour. The seawater eluent was prepared according to the ASTM D1141-98(2013) procedure and had the composition shown above in Table 2. After one hour, the eluent was tested for the amount of DTPMP present. The eluent was subsequently tested for the presence of DTPMP at 2, 3, 4, 5, 6, 7, 8, 25, 29, 33, and 48.5 hours, respectively. For proppant Batch 9, the eluent was additionally tested for the presence of DTPMP at 53.5 and 55.5 hours. For Batches 1, 2 and 6, the eluent was subsequently tested for the presence of DTPMP as described above in Example 1.

Figure 14:
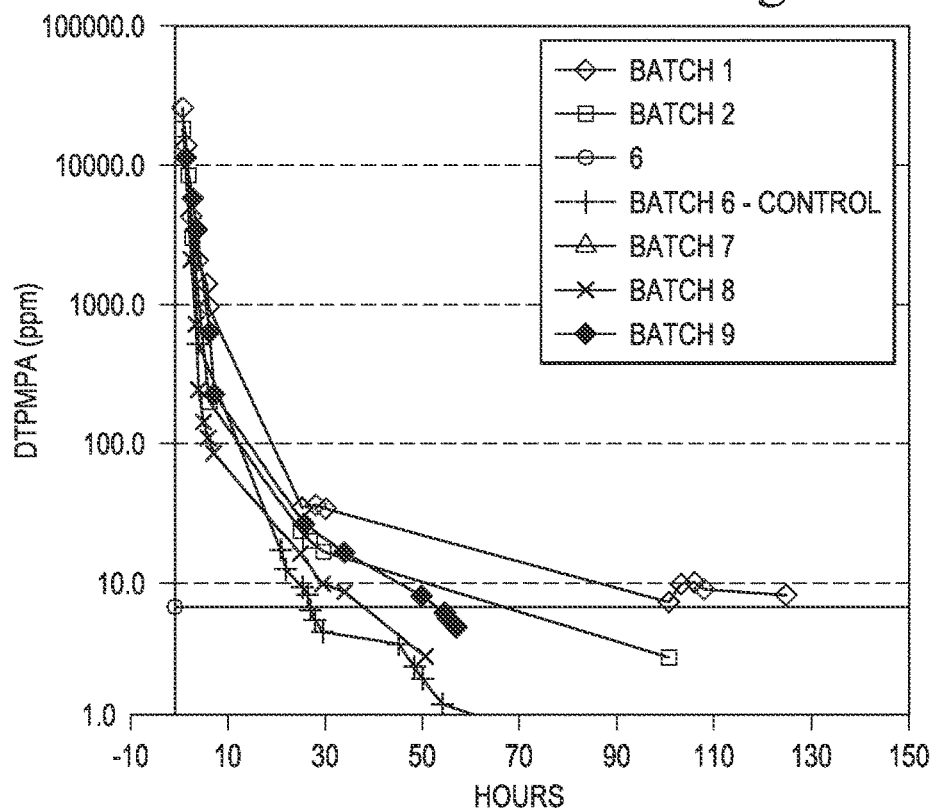
FIG. 14 is a graph of the elution profile for Example 2 in terms of the ppm of DTPMP released as a function of time for porous ceramic proppant infused with DTPMP and encapsulated with various coatings.

The amount of DTPMP in ppm detected in the eluent for Batches 7-9 was plotted with the data from Batches 1, 2 and 6 from Example 1 as a function of time to obtain the elution profile curves shown in FIG. 14. In FIG. 14, a line has been drawn at 6 ppm which represents the minimum effective concentration of DTPMP as a corrosion and scale inhibitor. By plotting the amount of detected DTPMP in the eluent versus time for proppant Batches 1-2 and 6-9 and comparing these results with the 6 ppm line, the length of time a particular proppant batch elutes an effective amount of DTPMP can be determined.

FIG. 14 clearly shows that proppant Batches 7-9 which included a semi-permeable substantially non-degradable polymeric coating eluted an effective amount of DTPMP for a longer period of time compared to proppant Batch 6 which did not include a semi-permeable substantially non-degradable polymeric coating. In addition, FIG. 14 clearly shows that for the three proppant batches that were infused with 7% by weight of DTPMP and coated with 0.5%, 1.0% and 2.0% by weight of phenol formaldehyde according to the two-step process, namely proppant Batches 7-9, an effective amount of DTPMP was eluted for a longer period of time the higher the percent by weight of the phenol formaldehyde polymeric coating.

Example 3

A 500 gram batch of 20/40 CARBO UltraLite, referred to below as Batch 10 was infused with 64.2 grams of the DTPMP solution mentioned above in Example 1, such that the DTPMP constituted 5% by weight of the infused proppant and was then coated with polylactic acid such that the final product included 2% by weight of the polylactic acid coating in a two-step thermal process. Polylactic acid is a degradable polymeric coating that is commercially available from Danimer under the trade name of "92938". 500 grams

TABLE 3

| Example 2 Batches | |
| --- | --- |
| Batch Number | Infusant/Polymer Coating |
| Batch 1 (from Example 1) | 5% by weight DTPMP, 2% by weight phenol formaldehyde, standard reactivity, low viscosity (Plenco 14870) |
| Batch 2 (from Example 1) | 5% by weight DTPMP, 2% by weight phenol formaldehyde, high reactivity, high viscosity (Plenco 14750) |
| Batch 6 (from Example 1) | 9% by weight DTPMP, no coating |
| Batch 7 | 7% by weight DTPMP, 0.5% by weight phenol formaldehyde, standard reactivity, medium viscosity (Plenco 14941) |
| Batch 8 | 7% by weight DTPMP, 1.0% by weight phenol formaldehyde, standard reactivity, medium viscosity (Plenco 14941) |
| Batch 9 | 7% by weight DTPMP, 2.0% by weight phenol formaldehyde, standard reactivity, medium viscosity (Plenco 14941) | of the 20/40 CARBO UltraLite was heated in an oven set at 250° C. for one hour. 64.2 grams of the DTPMP solution was added to the heated proppant and allowed to mix for 3 minutes. The infused proppant was then heated to 193° C. and 51.0 grams of the polylactic acid polymer resin was added to the batch and allowed to mix for approximately ten minutes.

A 500 gram batch of 20/40 CARBO UltraLite, referred to below as Batch 11 was infused with DTPMP and coated with a polyurethane coating according to the procedure discussed above, except that 3.6 grams of the Ancarez ISO HDiT polyisocyanate polymer resin was used to result in a 2% by weight coating of polyurethane.

Proppant Batches 10 and 11 were compared with proppant Batches 1 and 6 from Example 1, as indicated in Table 4 below.

TABLE 4

Example 3 Batches

| Batch Number | Infusant/Polymer Coating |
|---|---|
| Batch 1 | 5% by weight DTPMP, 2% by weight phenol formaldehyde, standard reactivity, low viscosity (Plenco 14870) |
| Batch 6 | 5% by weight DTPMP, no coating |
| Batch 10 | 5% by weight DTPMP, 2% by weight polylactic acid |
| Batch 11 | 5% by weight DTPMP, 2% by weight polyurethane |

Proppant Batches 1, 6, 10 and 11 were then placed in a seawater eluent for one hour. The seawater eluent was prepared according to the ASTM D1141-98(2013) procedure and had the composition shown above in Table 2. After one hour, the eluent was tested for the amount of DTPMP present. The eluent was subsequently tested for the presence of DTPMP at 2, 3, 4, 5, 21, 22, 23, 24, 26, 27, 28, 29, 44, 47, 49, 53, 70 and 74 hours, respectively. For proppant Batch 1, the eluent was additionally tested for the presence of DTPMP at 93, 98, 165, 173, 189.5, 197.5 and 218 hours.

Figure 15:
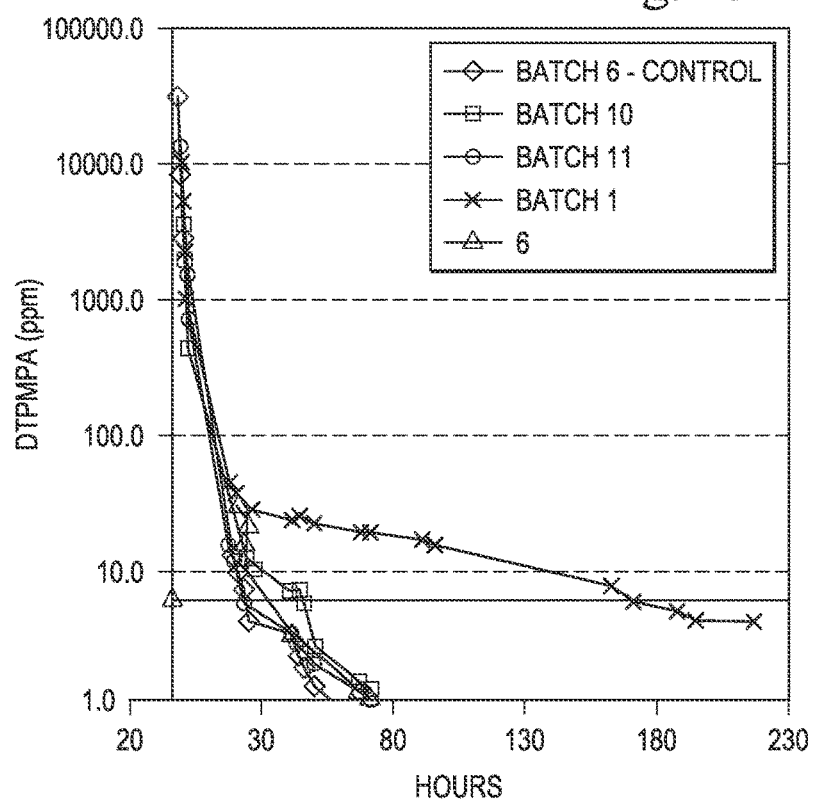
FIG. 15 is a graph of the elution profile for Example 3 in terms of the ppm of DTPMP released as a function of time for porous ceramic proppant infused with DTPMP and encapsulated with various coatings.

The amount of DTPMP in ppm detected in the eluent was plotted as a function of time to obtain the elution profile curves shown in FIG. 15. In FIG. 15, a line has been drawn at 6 ppm which represents the minimum effective concentration of DTPMP as a corrosion and scale inhibitor. By plotting the amount of detected DTPMP in the eluent versus time for proppant Batches 1, 6, 10 and 11 and comparing these results with the 6 ppm line, the length of time a particular proppant batch elutes an effective amount of DTPMP can be determined.

FIG. 15 clearly shows that proppant Batch 1 which was infused with 5% by weight of DTPMP and coated with 2% by weight of phenol formaldehyde according to the two-step process eluted an effective amount of DTPMP for a longer period of time compared to proppant Batches 10 and 11 which were infused with 5% by weight of DTPMP and coated with 2.0% by weight of polylactic acid and polyurethane, respectively. In addition, FIG. 15 shows that proppant Batches 10 and 11 which included a degradable and a semi-permeable substantially non-degradable polymeric coating, respectively, eluted an effective amount of DTPMP for a longer period of time compared to proppant Batch 6 which did not include a semi-permeable substantially non-degradable polymeric coating. FIG. 15 also shows that substantially similar results were obtained for proppant Batch 10, that was infused with 5% by weight of DTPMP and coated with 2.0% by weight of polylactic acid, a degradable polymer and proppant Batch 11 that was infused with 5% by weight of DTPMP and coated with 2.0% by weight of polyurethane, a semi-permeable substantially non-degradable polymer.

The above results show that infused proppant particulates coated with a semi-permeable substantially non-degradable polymer, like phenol formaldehyde and polyurethane, release effective amounts of chemical treatment agents like DTPMP for a longer period of time than typical degradable coatings or proppant without any coating at all.

Example 4

The example following below was carried out using exemplary materials in order to determine the elution rate of DTPMP from coated porous proppant infused with DTPMP and further coated with various amounts of degradable coatings and compared to coated porous proppant infused with DTPMP and not containing a degradable coating.

Three 500 gram batches of 20/40 CARBO UltraLite, an ultra-lightweight ceramic proppant having an ASG of 2.71 and having a porosity of 20-25% that is commercially available from CARBO Ceramics Inc., were each infused with a diethylenetriamine penta(methylene phosphonic acid) ("DTPMP") solution having a solids content of 41%, which is commercially available from Riteks, Inc., and were then coated with a semi-permeable substantially non-degradable polymer in a two-step process as described below.

Each batch of proppant was heated in an oven set to 482° F. (250° C.) for approximately one hour. The heated batches of proppant were then removed from the oven and allowed to cool until they reached a temperature of between 430-440° F. as monitored by a thermocouple. Once the proppant batches reached the desired temperature, 64.2 grams of the DTPMP solution was added to each batch and allowed to infuse into the proppant particulates for approximately three minutes, such that the DTPMP constituted 5% by weight of the infused proppant. After the proppant particulates were infused with DTPMP, each batch was coated with a semi-permeable substantially non-degradable polymer.

Each batch of proppant containing the 5% by weight DTPMP was then coated according to the following procedure with a phenol formaldehyde highly reactive, high viscosity polymer resin that is commercially available from Plastics Engineering Company under the trade name Plenco 14750. Each batch was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamine solution made from a pure hexamine powder commercially available from Bossco Industries, Inc., was added to crosslink and cure the phenol formaldehyde resin and was allowed to mix for 1 minute and 25 seconds. After the phenol formaldehyde coating procedures, each batch of proppant included 2% by weight of the polymeric coating.

Only batches 1 and 2 of the proppant containing 2% by weight of the polymeric coating were subjected to a simultaneous application of degradable coating and water quench by applying the hot batches at a temperature of between 250-300° F. to a degradable shell solution, containing approximately 50% polyolefin and approximately 50% water, that is commercially available from Danimer Scientific under the trade name of "MHG-00254." Batch 1 was subjected to the MHG-00254 solution for 2 minutes and batch 2 was subjected to the MHG-00254 solution for 2 minutes, until Batch 1 had 2% by weight degradable shell and Batch 2 had 4% by weight degradable shell.

Finally, 1.2 grams of a 50-60% cocoamidopropyl hydroxysultaine surfactant, which is commercially available from The Lubrizol Corporation under the trade name "Chembetaine™ CAS", was added to each batch and allowed to mix for 1 minute.

Table 5 below represents the 3 batches prepared for this Example 4.

TABLE 5

Example 4 Batches

| Batch Number | Infusant/Polymer Coating/Degradable Shell |
|---|---|
| Batch 1 | 5% by weight DTPMP, 2% by weight phenol formaldehyde, high reactivity, high viscosity (Plenco 14750), 2% by weight polyolefin shell (MHG-00254) |
| Batch 2 | 5% by weight DTPMP, 2% by weight phenol formaldehyde, high reactivity, high viscosity (Plenco 14750), 4% by weight polyolefin shell (MHG-00254) |
| Batch 3 | 5% by weight DTPMP, 2% by weight phenol formaldehyde, high reactivity, high viscosity (Plenco 14750) |

Proppant Batches 1-6 were then placed in a seawater eluent for one hour. The seawater eluent was prepared according to the ASTM D1141-98(2013) procedure and had the composition shown below in Table 2, above.

After one hour, the eluent was tested for the amount of DTPMP (in parts per million, ppm) present. For Batches 1 and 2, the eluent was subsequently tested for the presence of DTPMP at 20 minutes, 40 minutes, and 60 minutes. For proppant Batch 3, the eluent was additionally tested for the presence of DTPMP at 10 minutes, 30 minutes, and 50 minutes.

Figure 16:
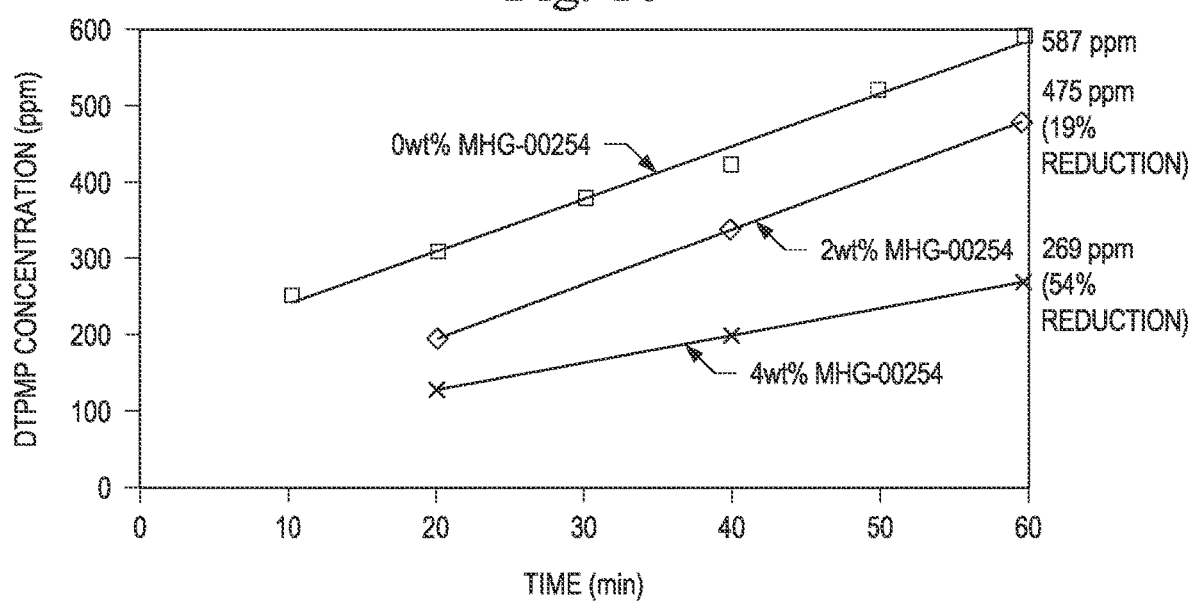
FIG. 16 is a graph of the elution profile for Example 4 in terms of the ppm of DTPMP released as a function of time for porous ceramic infused with DTPMP and encapsulated with and without a degradable shell of varied thickness.

The amount of DTPMP in ppm detected in the eluent was plotted as a function of time to obtain the elution profile curves shown in FIG. 16. FIG. 16 clearly shows that proppant Batches 1 and 2, which included the degradable shell, reduced the rate of initial elution of DTPMP compared to that of proppant Batch 3, which did not include a degradable shell. FIG. 16 also unexpectedly shows that doubling the amount of degradable coating (from 2 wt % to 4 wt %) almost tripled the reduction of DTPMP elution (from 19% to 54%, respectively).

Exemplary embodiments of the present disclosure further relate to any one or more of the following paragraphs:

1. A ceramic proppant composition for use in hydraulic fracturing, the composition comprising: non-porous particulates having a permeability and a conductivity; porous ceramic particulates wherein the porous ceramic particulates are infused with a chemical treatment agent; wherein the composition has a permeability that is at least equal to the permeability of the non-porous particulates; and wherein the composition has a conductivity that is at least about 70% of the conductivity of the non-porous particulates.

2. The composition according to paragraph 1, wherein at least one of the non-porous particulates and the porous particulates have an apparent specific gravity that is less than 3.1 g/cm$^3$.

3. The composition according to paragraph 1, wherein at least one of the non-porous particulates and the porous ceramic particulates have an apparent specific gravity of from 3.1 to 3.4 g/cm$^3$.

4. The composition according to paragraph 1, wherein at least one of the non-porous particulates and the porous ceramic particulates has an apparent specific gravity that is greater than 3.4 g/cm$^3$.

5. The composition according to any one of paragraphs 1 to 4, wherein the composition has a conductivity that is at least equal to the conductivity of the non-porous particulates.

6. The composition according to any one of paragraphs 1 to 5, wherein the non-porous particulate is selected from the group consisting of light weight ceramic non-porous proppant, intermediate density ceramic non-porous proppant and high density ceramic porous proppant.

7. The composition according to any one of paragraphs 1 to 6, wherein the porous particulate is selected from the group consisting of light weight ceramic porous proppant, intermediate density ceramic porous proppant and high density ceramic porous proppant.

8. The composition according to any one of paragraphs 1 to 7, wherein the chemical treatment agent is selected from the group consisting of scale inhibitors, tracer materials, hydrate inhibitors, hydrogen sulfide scavenging materials, corrosion inhibitors, wax inhibitors, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants and combinations thereof.

9. The composition according to paragraph 8, wherein the tracer material comprises a chemical tracer.

10. The composition according to paragraph 9, wherein the chemical tracer comprises a biological marker.

11. The composition according to paragraph 10, wherein the biological marker comprises DNA.

12. The composition according to paragraph 8, wherein the tracer material comprises at least one of metallic and non-metallic nanoparticles.

13. The composition according to paragraph 8, wherein the nanoparticle dispersions alters wettability of the ceramic proppant composition in a hydraulic fracture environment.

14. The composition according to paragraph 8, wherein the surfactant alters wettability of the ceramic proppant composition in a hydraulic fracture environment.

15. The composition according to any one of paragraphs 1 to 14, wherein the porous ceramic composition further comprises a degradable coating or a non-degradable coating, and wherein the degradable coating degrades inside the fracture.

16. The composition according to paragraph 15, wherein the degradable coating is selected from the group consisting of polylactic acid, water-soluble polymers and cross-linkable water-soluble polymers.

17. The composition according to paragraphs 15 or 16, wherein the chemical treatment agent is selected from the group consisting of scale inhibitors, tracer materials, hydrate inhibitors, hydrogen sulfide scavenging materials, corrosion inhibitors, wax inhibitors, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants and combinations thereof.

18. A method of hydraulic fracturing a subterranean formation, comprising: injecting a hydraulic fluid into a subterranean formation at a rate and pressure sufficient to open a fracture therein; and injecting a fluid containing a proppant composition, wherein the proppant composition comprises non-porous particulates and porous ceramic particulates infused with a chemical treatment agent; wherein the non-porous particulates have a permeability and a conductivity; wherein the proppant composition has a permeability that is at least equal to the permeability of the non-porous particulates; and wherein the composition has a conductivity that is at least about 70% of the conductivity of the non-porous particulates.

19. The method according to paragraph 18, wherein the non-porous particulates are selected from the group consisting of light weight ceramic non-porous proppant, intermediate density ceramic non-porous proppant and high density ceramic porous proppant and wherein the porous particulates are selected from the group consisting of light weight ceramic porous proppant, intermediate density ceramic non-porous proppant and high density ceramic porous proppant.

20. The method according to paragraphs 18 or 19, wherein the chemical treatment agent is selected from the group consisting of tracers, scale inhibitors, hydrate inhibitors, hydrogen sulfide scavenging materials, corrosion inhibitors, wax inhibitors, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants and any other oil field treatment chemical.

21. The method according to paragraph 20, wherein the tracer comprises a chemical tracer.

22. The method according to paragraph 21, wherein the chemical tracer comprises a biological marker.

23. The method according to paragraph 22, wherein the chemical tracer comprises DNA.

24. The method according to paragraph 20, wherein the tracer is selected from the group consisting of metallic nano particles and non-metallic nano particles.

25. The method according to paragraph 20, wherein the nanoparticle dispersions alter wettability of the ceramic proppant composition in a hydraulic fracture environment.

26. The method according to paragraph 20, wherein the surfactant alters wettability of the ceramic proppant composition in a hydraulic fracture environment.

27. The method according to any one of paragraphs 18 to 26, wherein the porous ceramic particulates further comprises a degradable coating or a non-degradable coating and wherein the degradable coating degrades inside the fracture.

28. The method according to paragraph 27, wherein the degradable coating is selected from the group consisting of polylactic acid, water-soluble polymers and cross-linkable water-soluble polymers.

29. The method according to paragraphs 27 or 28, wherein the chemical treatment agent is selected from the group consisting of scale inhibitors, tracer materials, hydrate inhibitors, hydrogen sulfide scavenging materials, corrosion inhibitors, wax inhibitors, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants and combinations thereof.

30. The method according to any one of paragraphs 18 to 29, wherein the composition has a conductivity that is at least equal to the conductivity of the non-porous particulates.

31. A method of diagnostic evaluation of a hydraulic fracturing stimulation of a subterranean formation, comprising: injecting a hydraulic fluid into at least one stage of the subterranean formation at a rate and pressure sufficient to open a fracture therein, the subterranean formation comprising one or more formation fluids and the hydraulic fluid comprising a proppant composition comprising porous particulates infused with a biological marker; wherein the biological marker separates from the proppant composition continuously over a period of time; wherein the biological marker returns to the surface with the formation fluids; and wherein the biological marker is recovered and identified.

32. The method according to paragraph 31, wherein the biological marker is DNA.

33. The method according to paragraphs 31 or 32, wherein the porous particulate is a porous ceramic proppant.

34. The method according to any one of paragraphs 31 to 33, wherein the biological marker is encapsulated.

35. The method according to paragraph 32, wherein the DNA comprises a specific sequence of nitrogenous bases that exhibits thermal stability qualities that are compatible with the thermal properties of the subterranean formation.

36. The method according to paragraph 35, wherein the DNA exhibits thermal stability at a temperature up to about 186 to 221° F., up to about 222 to 250° F., or up to about 269 to about 292° F.

37. The method according to any one of paragraphs 31 to 36, wherein the hydraulic fracturing stimulation of the subterranean formation is performed in a plurality of stages and the proppant composition injected into each such stage comprises porous particulates infused with a unique biological marker, such that no two stages of the subterranean formation are injected with a proppant composition comprising porous particulates infused with the same biological marker.

38. The method according to paragraph 36, further comprising injecting a proppant composition including porous particulates infused with an uniquely identifiable biological marker into different segments of a stage of the subterranean formation, such that no two segments of a stage of the subterranean formation are injected with proppant compositions including porous particulates infused with the same biological marker.

39. The method according to any one of paragraphs 31 to 38, wherein the biological marker separates from the proppant composition by at least one of leaching, eluting, diffusing, bleeding, discharging, dissolving, desorbing, draining, seeping, and leaking out of the proppant composition.

40. The method according to any one of paragraphs 31 to 39, wherein the formation fluids have an aqueous phase and wherein the biological marker separates into the aqueous phase of the formation fluids when separating from the porous particulate.

41. The method according to any one of paragraphs 31 to 40, wherein the formation fluids have a hydrocarbon phase and wherein the biological marker separates into the hydrocarbon phase of the formation fluids when separating from the porous particulate.

42. The method according to any one of paragraphs 31 to 41, wherein the biological marker separates from the proppant composition over a period of up to about one year after placement of the proppant composition in the subterranean formation.

43. The method according to any one of paragraphs 31 to 42, wherein the biological marker separates from the proppant composition over a period of up to about five years after placement of the proppant composition in the subterranean formation.

44. The method according to any one of paragraphs 31 to 43, wherein the biological marker separates from the proppant composition over a period of up to about ten years after placement of the proppant composition in the subterranean formation.

45. The method according to any one of paragraphs 31 to 44, wherein multiple uniquely identifiable biological markers from different stages of the subterranean formation are simultaneously recovered and identified.

46. The method according to any one of paragraphs 31 to 45, further comprising, estimating the relative hydrocarbon or water volume contribution of a stage or stages of the subterranean formation based on the relative amounts of uniquely identifiable biological markers recovered from the stage or stages of the subterranean formation.

47. The method according to any one of paragraphs 31 to 46, further comprising, estimating the relative hydrocarbon or water volume contribution from each segment of a stage of the subterranean formation based on the amount of uniquely identifiable biological markers recovered from each segment of a stage of the subterranean formation.

48. The method according to paragraph 34, wherein the biological marker is encapsulated by a polymer.

49. The method according to paragraph 48, wherein the polymer is at least one member selected from the group consisting of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels and silicas.

50. The method according to any one of paragraphs 31 to 49, wherein the proppant composition further comprises non-porous particulates and wherein the porous particulates of the proppant composition have an internal interconnected porosity of from about 5 to about 15% or from about 15 to about 35%.

51. The method according to any one of paragraphs 31 to 50, wherein the porous particulates of the proppant composition include a permeable coating.

52. A proppant composition for use in hydraulic fracturing, the composition comprising: porous particulates infused with a biological marker; wherein the porous particulates have an internal interconnected porosity; and wherein the biological marker separates from the porous particulates after a period of time.

53. The proppant composition according to paragraph 52, wherein the porous particulates are selected from the group consisting of light weight porous ceramic proppant, intermediate density porous ceramic proppant and high density porous ceramic proppant.

54. The proppant composition according to paragraphs 52 or 53, wherein the biological marker is DNA.

55. The proppant composition according to paragraph 54, wherein the DNA comprises a specific sequence of nitrogenous bases that exhibits thermal stability qualities that are compatible with the thermal properties of the subterranean formation.

56. The proppant composition according to paragraphs 54 or 55, wherein the DNA exhibits thermal stability at a temperature up to about 186 to 221° F., up to about 222 to 250° F., or up to about 269 to about 292° F.

57. The proppant composition according to any one of paragraphs 52 to 56, wherein the biological marker is encapsulated by a polymer.

58. The proppant composition according to paragraph 57, wherein the polymer is at least one member selected from the group consisting of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels and silicas.

59. The proppant composition according to any one of paragraphs 52 to 58, wherein the proppant composition further comprises non-porous particulates and wherein the porous particulates have an internal interconnected porosity of from about 5-15% or from about 15-35%.

60. The proppant composition according to any one of paragraphs 52 to 59, wherein the proppant composition is injected into a hydraulically created fracture in a subterranean formation.

61. The proppant composition according to paragraph 60, wherein the biological marker separates from the porous particulates over a period of up to about one year after injection of the proppant composition in the hydraulically created fracture in the subterranean formation.

62. The proppant composition according to paragraph 60, wherein the biological marker separates from the porous particulates over a period of up to about five years after injection of the proppant composition in the hydraulically created fracture in the subterranean formation.

63. The proppant composition according to paragraph 60, wherein the biological marker separates from the porous particulates over a period of up to about ten years after injection of the proppant composition in the hydraulically created fracture in the subterranean formation.

64. A ceramic proppant composition for use in hydraulic fracturing, the composition comprising: porous ceramic particulates; a chemical treatment agent infused in the porous ceramic particulates; and a semi-permeable substantially non-degradable polymeric coating.

65. The composition according to paragraph 64, wherein the porous particulate is selected from the group consisting of light weight ceramic porous proppant, intermediate density ceramic porous proppant and high density ceramic porous proppant.

66. The composition according to paragraphs 64 or 65, wherein the chemical treatment agent is selected from the group consisting of scale inhibitors, tracer materials, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

67. The composition according to paragraph 66, wherein the tracer material comprises a chemical tracer selected from the group consisting of dyes, fluorescent materials, metallic nano-particles, non-metallic nano-particles and biological markers.

68. The composition according to paragraph 67, wherein the chemical tracer comprises DNA.

69. The composition according to any one of paragraphs 64 to 68, further comprising non-porous ceramic particulates.

70. The composition according to paragraph 67, wherein the tracer material comprises at least one of metallic nano-particles and non-metallic nano-particles.

71. The composition according to any one of paragraphs 64 to 70, wherein the semi-permeable substantially non-degradable polymeric coating is selected from the group consisting of phenol formaldehyde, polyurethane, cellulose esters, polyamides, vinyl esters, epoxies and combinations thereof.

72. A ceramic proppant composition for use in hydraulic fracturing, the composition comprising: porous ceramic particulates; and a chemical treatment agent infused in the porous ceramic particulates, wherein the chemical treatment agent is infused into the porous ceramic particulates without the use of a solvent.

73. The composition according to paragraph 72, further comprising non-porous ceramic particulates and wherein the porous ceramic particulates are selected from the group consisting of light weight ceramic porous proppant, intermediate density ceramic porous proppant and high density ceramic porous proppant.

74. The composition according to paragraphs 72 or 73, wherein the chemical treatment agent is selected from the group consisting of scale inhibitors, tracer materials, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

75. The composition according to paragraph 74, wherein the chemical treatment agent comprises at least one of a paraffin inhibitor and a wax inhibitor.

76. The composition according to paragraph 75, wherein the at least one of a paraffin inhibitor and a wax inhibitor comprises an ethylene vinyl acetate copolymer.

77. The composition according to any one of paragraphs 72 to 75, wherein the porous ceramic particulates further comprise a semi-permeable substantially non-degradable polymeric coating.

78. The composition according to paragraph 77, wherein the semi-permeable substantially non-degradable polymeric coating is selected from the group consisting of phenol formaldehyde, polyurethane, cellulose esters, polyamides, vinyl esters, epoxies and combinations thereof.

79. The composition according to paragraph 73, wherein the porous ceramic particulates further comprise a degradable polymeric coating selected from the group consisting of polylactic acid, cellulose esters, methyl cellulose and combinations thereof.

80. A method of hydraulically fracturing a subterranean formation, comprising: injecting a hydraulic fluid into a subterranean formation at a rate and pressure sufficient to open a fracture therein; infusing porous ceramic particulates with a chemical treatment agent; coating the infused porous ceramic particulates with a semi-permeable substantially non-degradable polymer; and injecting a fluid containing the coated infused porous ceramic particulates into the subterranean formation, wherein the infused chemical treatment agent is released into the subterranean formation over a period of time.

81. The method according to paragraph 80, wherein the fluid further contains non-porous ceramic particulates and wherein the porous ceramic particulates are selected from the group consisting of light weight ceramic porous proppant, intermediate density ceramic non-porous proppant and high density ceramic porous proppant.

82. The method according to paragraphs 80 or 81, wherein the chemical treatment agent is selected from the group consisting of tracers, scale inhibitors, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

83. The method according to paragraph 82, wherein the tracer material comprises a chemical tracer selected from the group consisting of dyes, fluorescent materials, metallic nano-particles, non-metallic nano-particles and biological markers.

84. The method according to paragraph 83, wherein the chemical tracer comprises DNA.

85. The method according to paragraph 83, wherein the tracer material comprises at least one of metallic nano-particles and non-metallic nano-particles.

86. The method according to any one of paragraphs 80 to 85, wherein the porous ceramic particulates are infused with the chemical treatment agent by at least one of vacuum infusion, thermal infusion, capillary action, ribbon blending at room or elevated temperature, microwave blending and pug mill mixing.

87. The method according to any one of paragraphs 80 to 86, wherein the semi-permeable substantially non-degradable polymer coating is selected from the group consisting of phenol formaldehyde, polyurethane, cellulose esters, polyamides, vinyl esters, epoxies and combinations thereof.

88. The method according to any one of paragraphs 80 to 87, wherein the chemical treatment agent is released into the subterranean formation by at least one of leaching, eluting, diffusing, bleeding, discharging, dissolving, desorbing, draining, seeping, and leaking from the porous ceramic particulates.

89. The method according to paragraph 88, wherein the chemical treatment agent is released from the porous ceramic particulates over a period of up to about ten years after placement of the porous ceramic particulates in the hydraulically created fracture.

90. The method according to paragraph 89, wherein the chemical treatment agent is released from the porous ceramic particulates over a period of up to about five years after placement of the porous ceramic particulates in the hydraulically created fracture.

91. The method according to paragraph 90, wherein the chemical treatment agent is released from the porous ceramic particulates over a period of up to about one year after placement of the porous ceramic particulates in the hydraulically created fracture.

92. A method of hydraulically fracturing a subterranean formation, comprising: injecting a hydraulic fluid into a subterranean formation at a rate and pressure sufficient to open a fracture therein; infusing a porous ceramic particulates with a chemical treatment agent without the use of a solvent; and injecting a fluid containing the infused porous ceramic particulates into the fracture in the subterranean formation, wherein the infused chemical treatment agent is released into the subterranean formation over a period of time.

93. The method according to paragraph 92, wherein the chemical treatment agent is selected from the group consisting of scale inhibitors, tracer materials, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

94. The method according to paragraph 93, wherein the chemical treatment agent is at least one of a paraffin inhibitor and a wax inhibitor.

95. The method according to paragraph 94, wherein the at least one of a paraffin inhibitor and a wax inhibitor comprises an ethylene vinyl acetate copolymer.

96. The method according to paragraph 95, wherein the infused porous ceramic particulates are coated with a semipermeable substantially non-degradable polymer selected from the group consisting of phenol formaldehyde, polyurethane, cellulose ester, polyamides, vinyl esters, epoxies and combinations thereof.

97. The method according to paragraph 96, wherein the chemical treatment agent is released into the subterranean formation by at least one of leaching, eluting, diffusing, bleeding, discharging, dissolving, desorbing, draining, seeping, and leaking from the infused porous ceramic particulates.

98. The method according to paragraph 97, wherein the chemical treatment agent is released from the infused porous ceramic particulates over a period of up to about ten years after placement of the porous ceramic particulates in the hydraulically created fracture.

99. The method according to paragraph 98, wherein the chemical treatment agent is released from the infused porous ceramic particulates over a period of up to about five years after placement of the porous ceramic particulates in the hydraulically created fracture.

100. The method according to paragraph 99, wherein the chemical treatment agent is released from the infused porous ceramic particulates over a period of up to about one year after placement of the porous ceramic particulates in the hydraulically created fracture.

101. A ceramic proppant composition for use in hydraulic fracturing, the composition comprising: porous ceramic particulates; a water-soluble chemical treatment agent infused in the porous ceramic particulates; and a coating comprising a hydrocarbon-soluble chemical treatment agent.

102. The composition according to paragraph 101, further comprising non-porous ceramic particulates and wherein the porous particulate is selected from the group consisting of light weight ceramic porous proppant, intermediate density ceramic porous proppant and high density ceramic porous proppant.

103. The composition according to paragraph 102, wherein the water-soluble chemical treatment agent comprises a scale inhibitor and the hydrocarbon-soluble chemical treatment agent comprises a paraffin inhibitor.

104. A proppant composition for use in hydraulic fracturing, the composition comprising: a plurality of particulates; and at least one particulate of the plurality of particulates comprising a chemical treatment agent, the at least one particulate having a long term permeability measured in accordance with ISO 13503-5 at 7,500 psi of at least about 10 Darcies; wherein the at least one chemical treatment agent separates from the at least one particulate when located inside a fracture of a subterranean formation after a period of time.

105. The composition according to paragraph 104, wherein the plurality of particulates comprises non-porous particulates and porous particulates.

106. The composition according to paragraph 105, wherein the plurality of particulates has a permeability that is at least equal to the permeability of the non-porous particulates.

107. The composition according to paragraph 106, wherein the plurality of particulates has a conductivity that is at least about 70% of the conductivity of the non-porous particulates.

108. The composition according to paragraph 105, wherein the porous particulates contain the chemical treatment agent.

109. The composition according to paragraph 105, wherein the non-porous particulates contain the chemical treatment agent.

110. The composition according to paragraph 105, wherein at least one of the non-porous particulates and the porous particulates have an apparent specific gravity that is less than 3.1 g/cm$^3$.

111. The composition according to paragraph 105, wherein at least one of the non-porous particulates and the porous particulates have an apparent specific gravity of from 3.1 to 3.4 g/cm$^3$.

112. The composition according to paragraph 105, wherein at least one of the non-porous particulates and the porous particulates has an apparent specific gravity that is greater than 3.4 g/cm$^3$.

113. The composition according to paragraph 105, wherein the non-porous particulate is selected from the group consisting of light weight ceramic non-porous proppant, intermediate density ceramic non-porous proppant and high density porous ceramic proppant.

114. The composition according to paragraph 105, wherein the porous particulate is selected from the group consisting of light weight porous ceramic proppant, intermediate density porous ceramic proppant and high density porous ceramic proppant.

115. The composition according to any one of paragraphs 104 to 114, wherein the chemical treatment agent is selected from the group consisting of scale inhibitors, tracer materials, hydrate inhibitors, hydrogen sulfide scavenging materials, corrosion inhibitors, wax inhibitors, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants and combinations thereof.

116. The composition according to paragraph 115, wherein the tracer material comprises a chemical tracer.

117. The composition according to paragraph 116, wherein the chemical tracer comprises a biological marker.

118. The composition according to paragraph 117, wherein the biological marker comprises DNA.

119. The composition according to paragraph 115, wherein the tracer material comprises at least one of metallic and non-metallic nanoparticles.

120. The composition according to paragraph 115, wherein the nanoparticle dispersions alter wettability of the proppant composition in a hydraulic fracture environment.

121. The composition according to paragraph 115, wherein the surfactant alters wettability of the proppant composition in a hydraulic fracture environment.

122. The composition according to any one of paragraphs 105 to 121, wherein the proppant composition further comprises a degradable coating or a non-degradable coating, and wherein the degradable coating degrades inside the fracture.

123. The composition according to paragraph 122, wherein the degradable coating is selected from the group consisting of polylactic acid, water-soluble polymers, and cross-linkable water-soluble polymers and any combination thereof.

124. The composition according to paragraph 122, wherein the degradable coating is a self-polishing coating.

125. The composition according to paragraph 122, wherein the non-degradable coating is selected from the group consisting of phenol formaldehyde, polyurethane, cellulose ester, polyamides, vinyl esters, and epoxies, and any combination thereof.

126. The composition according to any one of paragraphs 122 to 125, wherein the chemical treatment agent is contained in the non-degradable coating or the degradable coating.

127. The composition according to any one of paragraphs 122 to 126, wherein the chemical treatment agent is disposed between the at least one particulate and the non-degradable coating or the degradable coating.

128. A method of hydraulic fracturing a subterranean formation, comprising: injecting a hydraulic fluid into a subterranean formation at a rate and pressure sufficient to open a fracture therein; and injecting a fluid containing a proppant composition into the fracture, the proppant composition comprising: a plurality of particulates; and at least one particulate of the plurality of particulates comprising a chemical treatment agent, the at least one particulate having a long term permeability measured in accordance with ISO 13503-5 at 7,500 psi of at least about 10 Darcies; eluting the chemical treatment agent from the at least one particulate located inside the fracture over a period of time.

129. The method according to paragraph 128, wherein the chemical treatment agent is selected from the group consisting of tracers, scale inhibitors, hydrate inhibitors, hydrogen sulfide scavenging materials, corrosion inhibitors, wax inhibitors, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants and any other oil field treatment chemical.

130. The method according to paragraph 129, wherein the tracer comprises a chemical tracer.

131. The method according to paragraph 130, wherein the chemical tracer comprises a biological marker.

132. The method according to paragraph 130, wherein the chemical tracer comprises DNA.

133. The method according to any one of paragraphs 129 to 132, wherein the nanoparticle dispersions alter wettability of the proppant composition in a hydraulic fracture environment.

134. The method according to any one of paragraphs 129 to 133, wherein the surfactant alters wettability of the proppant composition in a hydraulic fracture environment.

135. The method according to any one of paragraphs 129 to 134, wherein the proppant composition further comprises a degradable coating or a non-degradable coating and wherein the degradable coating degrades inside the fracture.

136. The method according to paragraph 135, wherein the degradable coating is selected from the group consisting of polylactic acid, water-soluble polymers and cross-linkable water-soluble polymers.

137. The composition according to paragraph 135, wherein the degradable coating is a self-polishing coating.

138. The composition according to paragraph 135, wherein the non-degradable coating is selected from the group consisting of phenol formaldehyde, polyurethane, cellulose ester, polyamides, vinyl esters, and epoxies, and any combination thereof.

139. The composition according to any one of paragraphs 135 to 138, wherein the chemical treatment agent is contained in the non-degradable coating or the degradable coating.

140. The composition according to any one of paragraphs 135 to 139, wherein the chemical treatment agent is disposed between the at least one particulate and the non-degradable coating or the degradable coating.

141. The method according to any one of paragraphs 128 to 140, wherein the chemical treatment agent elutes from the at least one particulate at a rate of at least about 0.1 ppm/(gram*day) for at least 6 months.

142. A method of diagnostic evaluation of a hydraulic fracturing stimulation of a subterranean formation, comprising: injecting a hydraulic fluid into at least one stage of the subterranean formation at a rate and pressure sufficient to open a fracture therein, the subterranean formation comprising one or more formation fluids and the hydraulic fluid comprising a proppant composition comprising at least one particulate containing a biological marker; wherein the biological marker separates from the at least one particulate continuously over a period of time; wherein the biological marker returns to the surface with the formation fluids; and wherein the biological marker is recovered and identified.

143. The method according to paragraph 142, wherein the biological marker is DNA.

144. The method according to paragraphs 142 or 143, wherein the at least one particulate is selected from the group consisting of sand, non-porous ceramic proppant, and porous ceramic proppant and any mixture thereof.

145. The method according to any one of paragraphs 142 to 144, wherein the biological marker is encapsulated.

146. The method according to paragraph 143, wherein the DNA comprises a specific sequence of nitrogenous bases that exhibits thermal stability qualities that are compatible with the thermal properties of the subterranean formation.

147. The method according to paragraph 146, wherein the DNA exhibits thermal stability at a temperature up to about 186 to 221° F., up to about 222 to 250° F., or up to about 269 to about 292° F.

148. The method according to any one of paragraphs 142 to 147, wherein the hydraulic fracturing stimulation of the subterranean formation is performed in a plurality of stages and the proppant composition injected into each such stage comprises two or more particulates each containing a unique biological marker, such that no two stages of the subterranean formation are injected with a proppant composition comprising particulates containing the same biological marker.

149. The method according to paragraph 148, further comprising injecting a proppant composition including particulates containing an uniquely identifiable biological marker into different segments of a stage of the subterranean formation, such that no two segments of a stage of the subterranean formation are injected with proppant compositions including particulates containing the same biological marker.

150. The method according to any one of paragraphs 142 to 149, wherein the biological marker separates from the proppant composition by at least one of leaching, eluting, diffusing, bleeding, discharging, dissolving, desorbing, draining, seeping, and leaking out of the proppant composition.

151. The method according to any one of paragraphs 142 to 150, wherein the formation fluids have an aqueous phase and wherein the biological marker separates into the aqueous phase of the formation fluids when separating from the at least one particulate.

152. The method according to any one of paragraphs 142 to 151, wherein the formation fluids have a hydrocarbon phase and wherein the biological marker separates into the hydrocarbon phase of the formation fluids when separating from the at least one particulate.

153. The method according to any one of paragraphs 142 to 152, wherein the biological marker separates from the proppant composition over a period of up to about one year after placement of the proppant composition in the subterranean formation.

154. The method according to any one of paragraphs 142 to 153, wherein the biological marker separates from the proppant composition over a period of up to about five years after placement of the proppant composition in the subterranean formation.

155. The method according to any one of paragraphs 142 to 154, wherein the biological marker separates from the proppant composition over a period of up to about ten years after placement of the proppant composition in the subterranean formation.

156. The method according to any one of paragraphs 142 to 155, wherein multiple uniquely identifiable biological markers from different stages of the subterranean formation are simultaneously recovered and identified.

157. The method according to any one of paragraphs 142 to 156, further comprising, estimating the relative hydrocarbon or water volume contribution of a stage or stages of the subterranean formation based on the relative amounts of uniquely identifiable biological markers recovered from the stage or stages of the subterranean formation.

158. The method according to any one of paragraphs 142 to 157, further comprising, estimating the relative hydrocarbon or water volume contribution from each segment of a stage of the subterranean formation based on the amount of uniquely identifiable biological markers recovered from each segment of a stage of the subterranean formation.

159. The method according to any one of paragraphs 142 to 158, wherein the biological marker is encapsulated by a polymer.

160. The method according to paragraph 159, wherein the polymer is at least one member selected from the group consisting of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels and silicas.

161. The method according to any one of paragraphs 142 to 160, wherein the proppant composition comprises porous particulates and non-porous particulates and wherein the porous particulates of the proppant composition have an internal interconnected porosity of from about 5 to about 15% or from about 15 to about 35%.

162. The method according to paragraph 161, wherein the porous particulates of the proppant composition comprise the biological marker and include a permeable coating.

163. A proppant composition for use in hydraulic fracturing, the composition comprising: particulates containing a biological marker; wherein the particulates have a long term permeability measured in accordance with ISO 13503-5 at 7,500 psi of at least about 10 Darcies; and wherein the biological marker separates from the particulates after a period of time.

164. The proppant composition according to paragraph 163, wherein the particulates are selected from the group consisting of sand, non-porous ceramic proppant, light weight porous ceramic proppant, intermediate density porous ceramic proppant and high density porous ceramic proppant.

165. The proppant composition according to paragraphs 163 or 164, wherein the biological marker is DNA.

166. The proppant composition according to paragraph 165, wherein the DNA comprises a specific sequence of nitrogenous bases that exhibits thermal stability qualities that are compatible with the thermal properties of the subterranean formation.

167. The proppant composition according to paragraph 166, wherein the DNA exhibits thermal stability at a temperature up to about 186 to 221° F., up to about 222 to 250° F., or up to about 269 to about 292° F.

168. The proppant composition according to any one of paragraphs 163 to 167, wherein the biological marker is encapsulated by a polymer.

169. The proppant composition according to paragraph 168, wherein the polymer is at least one member selected from the group consisting of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels and silicas.

170. The proppant composition according to any one of paragraphs 163 to 169, wherein the proppant composition comprises porous particulates and non-porous particulates and wherein the porous particulates have an internal interconnected porosity of from about 5-15% or from about 15-35%.

171. The proppant composition according to any one of paragraphs 163 to 170, wherein the proppant composition is injected into a hydraulically created fracture in a subterranean formation.

172. The proppant composition according to paragraph 171, wherein the biological marker separates from the particulates over a period of up to about one year after injection of the proppant composition in the hydraulically created fracture in the subterranean formation.

173. The proppant composition according to paragraph 171, wherein the biological marker separates from the particulates over a period of up to about five years after injection of the proppant composition in the hydraulically created fracture in the subterranean formation.

174. The proppant composition according to paragraph 171, wherein the biological marker separates from the particulates over a period of up to about ten years after injection of the proppant composition in the hydraulically created fracture in the subterranean formation.

175. A method of hydraulically fracturing a subterranean formation, comprising: injecting a hydraulic fluid into a subterranean formation at a rate and pressure sufficient to open a fracture therein; coating one or more proppant particulates with a chemical treatment agent to provide one or more chemical treatment agent containing proppant particulates; coating the chemical treatment agent containing proppant particulates with a semi-permeable substantially non-degradable polymer to provide one or more coated proppant particulates; and injecting a fluid containing the coated proppant particulates into the subterranean formation, wherein the chemical treatment agent is released into the subterranean formation over a period of time.

176. The method according to paragraph 175, further comprising infusing the one or more proppant particulates with the chemical treatment agent prior to coating the one or more proppant particulates with the chemical treatment agent.

177. The method according to paragraphs 175 or 176, wherein the one or more proppant particulates are selected from the group consisting of sand, non-porous ceramic particulates, light weight porous ceramic proppant, intermediate density porous ceramic proppant and high density porous ceramic proppant.

178. The method according to any one of paragraphs 175 to 177, wherein the chemical treatment agent is selected from the group consisting of tracers, scale inhibitors, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

179. The method according to paragraph 178, wherein the tracer material comprises a chemical tracer selected from the group consisting of dyes, fluorescent materials, metallic nano-particles, non-metallic nano-particles and biological markers.

180. The method according to paragraph 179, wherein the chemical tracer comprises DNA.

181. The method according to paragraph 176, wherein the porous ceramic particulates are infused with the chemical treatment agent by at least one of vacuum infusion, thermal infusion, capillary action, ribbon blending at room or elevated temperature, microwave blending, and pug mill mixing.

182. The method according to any one of paragraphs 175 to 181, wherein the semi-permeable substantially non-degradable polymer coating is selected from the group consisting of phenol formaldehyde, polyurethane, cellulose esters, polyamides, vinyl esters, epoxies and combinations thereof.

183. The method according to any one of paragraphs 175 to 182, wherein the chemical treatment agent is released into the subterranean formation by at least one of leaching, eluting, diffusing, bleeding, discharging, dissolving, desorbing, draining, seeping, and leaking from the coated proppant particulates.

184. The method according to paragraph 183, wherein the chemical treatment agent is released from the coated proppant particulates over a period of up to about ten years after placement of the coated proppant particulates in the hydraulically created fracture.

185. The method according to paragraph 184, wherein the chemical treatment agent is released from the coated proppant particulates over a period of up to about five years after placement of the coated proppant particulates in the hydraulically created fracture.

186. The method according to paragraph 185, wherein the chemical treatment agent is released from the coated proppant particulates over a period of up to about one year after placement of the coated proppant particulates in the hydraulically created fracture.

187. A method of hydraulically fracturing a subterranean formation, comprising: injecting a hydraulic fluid into a subterranean formation at a rate and pressure sufficient to open a fracture therein; infusing one or more proppant particulates with a first chemical treatment agent to provide one or more infused proppant particulates. coating the infused proppant particulates with a second chemical treatment agent to provide one or more second chemical treatment agent containing proppant particulates; coating the second chemical treatment agent containing proppant particulates with a semi-permeable substantially non-degradable polymer to provide one or more coated proppant particulates; and injecting a fluid containing the coated proppant particulates into the subterranean formation, wherein the first and second chemical treatment agents are released into the subterranean formation over a period of time.

188. The method according to paragraph 187, wherein the one or more proppant particulates are selected from the group consisting of sand, non-porous ceramic particulates, light weight porous ceramic proppant, intermediate density porous ceramic proppant and high density porous ceramic proppant.

189. The method according to paragraphs 187 or 188, wherein the first chemical treatment agent is selected from the group consisting of tracers, scale inhibitors, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

190. The method according to any one of paragraphs 187 to 189, wherein the second chemical treatment agent is selected from the group consisting of tracers, scale inhibitors, hydrate inhibitors, hydrogen sulfide scavenging materials, corrosion inhibitors, paraffin inhibitors, wax inhibitors, asphaltene inhibitors, organic deposition inhibitors, biocides, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, demulsifiers and combinations thereof.

191. The method according to any one of paragraphs 187 to 190, wherein the one or more proppant particulates are infused with the first chemical treatment agent by at least one of vacuum infusion, thermal infusion, capillary action, ribbon blending at room or elevated temperature, microwave blending, and pug mill mixing.

192. The method according to any one of paragraphs 187 to 191, wherein the semi-permeable substantially non-degradable polymer coating is selected from the group consisting of phenol formaldehyde, polyurethane, cellulose esters, polyamides, vinyl esters, epoxies and combinations thereof.

While the present invention has been described in terms of several exemplary embodiments, those of ordinary skill in the art will recognize that the invention can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A proppant composition, the composition comprising:
   a proppant particulate;
   a non-degradable coating disposed onto the proppant particulate, the non-degradable coating comprising a phenol-formaldehyde resin having a molar ratio of formaldehyde to phenol of about 1:1 to about 2.4:1;
   a degradable shell encapsulating at least a portion of the non-degradable coating; and
   a chemical treatment agent, wherein a first portion of the chemical treatment agent is blended with the non-degradable coating.

2. The composition of claim 1, wherein the proppant particulate has an internal interconnected porosity of about 5% to about 75%.

3. The composition of claim 1, wherein the chemical treatment agent comprises a hydrocarbon soluble chemical treatment agent.

4. The composition of claim 1, wherein the non-degradable coating is phenol formaldehyde resin.

5. The composition of claim 1, wherein a second portion of the chemical treatment agent is blended with the degradable shell.

6. The composition of claim 1, wherein the degradable shell comprises one or more water-soluble polymers.

7. A proppant composition, the composition comprising:
   a proppant particulate;
   a hydrocarbon-soluble chemical treatment agent;
   a semi-permeable substantially non-degradable coating disposed onto the proppant particulate and surrounding the hydrocarbon-soluble chemical treatment agent, wherein the semi-permeable substantially non-degradable coating comprises a phenol-formaldehyde resin having a molar ratio of formaldehyde to phenol of about 1:1 to about 2.4:1;
   a degradable shell encapsulating at least a portion of the semi-permeable substantially non-degradable coating and the hydrocarbon-soluble chemical treatment agent, wherein the degradable shell is hydrocarbon-soluble; and
   wherein the hydrocarbon-soluble chemical treatment agent is configured to separate from the proppant particulate and to elute through the semi-permeable substantially non-degradable coating upon degradation of the degradable shell.

8. The composition of claim 7, wherein the proppant particulate has an internal interconnected porosity of about 5% to about 75% and wherein at least a portion of the hydrocarbon-soluble chemical treatment agent is disposed in the internal interconnected porosity of the proppant particulate.

9. The composition of claim 3, wherein the hydrocarbon-soluble chemical treatment agent comprises an asphaltene inhibitor.

10. The composition of claim 9, wherein the hydrocarbon-soluble chemical treatment agent elutes from the proppant composition at a rate of less than 1 ppm/(gram*day) for at least about 2 hours after contacting a subterranean formation and at a rate of at least about 0.1 ppm/(gram*day) for at least 2 weeks after contacting an aqueous phase solution and/or a hydrocarbon phase solution in the subterranean formation.

11. The composition of claim 1, wherein the hydrocarbon-soluble chemical treatment agent is mixed with the semi-permeable substantially non-degradable coating.

12. The composition of claim 7, wherein the degradable shell comprises one or more C8-C20 fatty acids.

13. A proppant composition, the composition comprising:
   a proppant particulate;
   a non-degradable coating disposed onto the proppant particulate, the non-degradable coating comprising a phenol-formaldehyde resin having a molar ratio of formaldehyde to phenol of about 1:1 to about 2.4:1;
   a degradable shell encapsulating at least a portion of the non-degradable coating; and
   a chemical treatment agent, wherein a first portion of the chemical treatment agent is blended with the non-degradable coating, a second portion of the chemical treatment agent is disposed between the non-degradable coating and the degradable shell, and a third portion of the chemical treatment agent is blended with the degradable shell.

14. The composition of claim 13, wherein the proppant particulate has an internal interconnected porosity of about 5% to about 75% and a fourth portion of the chemical treatment agent is disposed in the internal interconnected porosity.

15. The composition of claim 13, wherein the chemical treatment agent comprises a scale inhibitor, a salt inhibitor, a hydrogen sulfide scavenger, an iron sulfide scavenger, or any combination thereof.

16. The composition of claim 13, wherein the scale inhibitor comprises diethylenetriamine penta(methylene phosphonic acid) or one or more potassium salts of maleic acid copolymers and the salt inhibitor comprises potassium ferricyanide.

17. The composition of claim 13, wherein the degradable shell comprises one or more water-soluble polymers.

18. The composition of claim 1, wherein the particulate is a ceramic proppant.

19. The composition of claim 1, wherein the chemical treatment agent is disposed in the internal interconnected porosity of the proppant particulate.

20. The composition of claim 9, wherein the asphaltene inhibitor comprises fatty esters of acrylic polymers.

21. The composition of claim 1, wherein the degradable shell comprises a hydrocarbon soluble degradable shell comprising $C_8$-$C_{20}$ fatty acids.

* * * * *